(12) United States Patent
Parsons et al.

(10) Patent No.: US 12,417,495 B2
(45) Date of Patent: *Sep. 16, 2025

(54) OFFLOAD PROCESSING OF DATA PACKETS CONTAINING FINANCIAL MARKET DATA

(71) Applicant: Exegy Incorporated, St. Louis, MO (US)

(72) Inventors: Scott Parsons, St. Charles, MO (US); David E. Taylor, St. Louis, MO (US); Ronald S. Indeck, St. Louis, MO (US)

(73) Assignee: Exegy Incorporated, St. Louis, MO (US)

( * ) Notice: Subject to any disclaimer, the term of this patent is extended or adjusted under 35 U.S.C. 154(b) by 162 days.

This patent is subject to a terminal disclaimer.

(21) Appl. No.: 17/215,469

(22) Filed: Mar. 29, 2021

(65) Prior Publication Data

US 2021/0217088 A1 Jul. 15, 2021

Related U.S. Application Data

(60) Continuation of application No. 16/180,377, filed on Nov. 5, 2018, now Pat. No. 10,963,962, which is a division of application No. 13/833,098, filed on Mar. 15, 2013, now Pat. No. 10,121,196.

(60) Provisional application No. 61/616,181, filed on Mar. 27, 2012.

(51) Int. Cl.
*G06Q 40/04* (2012.01)
(52) U.S. Cl.
CPC ................................ *G06Q 40/04* (2013.01)

(58) Field of Classification Search
None
See application file for complete search history.

(56) References Cited

U.S. PATENT DOCUMENTS

| | | |
|---|---|---|
| 2,046,381 A | 7/1936 | Hicks et al. |
| 3,082,402 A | 3/1963 | Scantlin |
| 3,296,597 A | 1/1967 | Scantlin et al. |
| 3,573,747 A | 4/1971 | Adams et al. |

(Continued)

FOREIGN PATENT DOCUMENTS

| | | |
|---|---|---|
| EP | 0573991 | 12/1993 |
| EP | 0880088 | 11/1996 |

(Continued)

OTHER PUBLICATIONS

Jones et al., "A Probabilistic Model of Information Retrieval: Development and Status", Information Processing and Management, Aug. 1998, 76 pages.

(Continued)

*Primary Examiner* — Matthew S Gart
*Assistant Examiner* — Liz P Nguyen
(74) *Attorney, Agent, or Firm* — Thompson Coburn LLP

(57) ABSTRACT

Various techniques are disclosed for offloading the processing of data packets that contain financial market data. For example, data packets that contain financial market data can be processed through an offload processor deployed in a network element of a data distribution network to link the data packets with appropriate parsing metadata for the data packets. The network element can be an intelligent switch, such as an intelligent switch upstream or downstream from an electronic trading platform.

19 Claims, 21 Drawing Sheets

(56) References Cited

U.S. PATENT DOCUMENTS

| | | |
|---|---|---|
| 3,581,072 A | 5/1971 | Nymeyer |
| 3,601,808 A | 8/1971 | Vlack |
| 3,611,314 A | 10/1971 | Pritchard, Jr. et al. |
| 3,729,712 A | 4/1973 | Glassman |
| 3,824,375 A | 7/1974 | Gross et al. |
| 3,848,235 A | 11/1974 | Lewis et al. |
| 3,906,455 A | 9/1975 | Houston et al. |
| 4,044,334 A | 8/1977 | Bachman et al. |
| 4,081,607 A | 3/1978 | Vitols et al. |
| 4,298,898 A | 11/1981 | Cardot |
| 4,300,193 A | 11/1981 | Bradley et al. |
| 4,314,356 A | 2/1982 | Scarbrough |
| 4,385,393 A | 5/1983 | Chaure et al. |
| 4,412,287 A | 10/1983 | Braddock, III |
| 4,464,718 A | 8/1984 | Dixon et al. |
| 4,550,436 A | 10/1985 | Freeman et al. |
| 4,674,044 A | 6/1987 | Kalmus et al. |
| 4,811,214 A | 3/1989 | Nosenchuck et al. |
| 4,823,306 A | 4/1989 | Barbic et al. |
| 4,868,866 A | 9/1989 | Williams, Jr. |
| 4,903,201 A | 2/1990 | Wagner |
| 4,941,178 A | 7/1990 | Chuang |
| 5,023,910 A | 6/1991 | Thomson |
| 5,038,284 A | 8/1991 | Kramer |
| 5,050,075 A | 9/1991 | Herman et al. |
| 5,063,507 A | 11/1991 | Lindsey et al. |
| 5,077,665 A | 12/1991 | Silverman et al. |
| 5,101,353 A | 3/1992 | Lupien et al. |
| 5,101,424 A | 3/1992 | Clayton et al. |
| 5,126,936 A | 6/1992 | Champion et al. |
| 5,140,692 A | 8/1992 | Morita |
| 5,161,103 A | 11/1992 | Kosaka et al. |
| 5,163,131 A | 11/1992 | Row et al. |
| 5,179,626 A | 1/1993 | Thomson |
| 5,226,165 A | 7/1993 | Martin |
| 5,243,655 A | 9/1993 | Wang |
| 5,249,292 A | 9/1993 | Chiappa |
| 5,255,136 A | 10/1993 | Machado et al. |
| 5,258,908 A | 11/1993 | Hartheimer et al. |
| 5,265,065 A | 11/1993 | Turtle |
| 5,267,148 A | 11/1993 | Kosaka et al. |
| 5,270,922 A | 12/1993 | Higgins |
| 5,297,032 A | 3/1994 | Trojan et al. |
| 5,313,560 A | 5/1994 | Maruoka et al. |
| 5,315,634 A | 5/1994 | Tanaka et al. |
| 5,319,776 A | 6/1994 | Hile et al. |
| 5,327,521 A | 7/1994 | Savic et al. |
| 5,339,411 A | 8/1994 | Heaton, Jr. |
| 5,347,634 A | 9/1994 | Herrell et al. |
| 5,371,794 A | 12/1994 | Diffie et al. |
| 5,375,055 A | 12/1994 | Togher et al. |
| 5,388,259 A | 2/1995 | Fleischman et al. |
| 5,396,253 A | 3/1995 | Chia |
| 5,404,488 A | 4/1995 | Kerrigan et al. |
| 5,418,951 A | 5/1995 | Damashek |
| 5,421,028 A | 5/1995 | Swanson |
| 5,432,822 A | 7/1995 | Kaewell, Jr. |
| 5,461,712 A | 10/1995 | Chelstowski et al. |
| 5,465,353 A | 11/1995 | Hull et al. |
| 5,481,735 A | 1/1996 | Mortensen et al. |
| 5,488,725 A | 1/1996 | Turtle et al. |
| 5,497,317 A | 3/1996 | Hawkins et al. |
| 5,497,488 A | 3/1996 | Akizawa et al. |
| 5,500,793 A | 3/1996 | Deming, Jr. et al. |
| 5,517,642 A | 5/1996 | Bezek et al. |
| 5,544,352 A | 8/1996 | Egger |
| 5,546,578 A | 8/1996 | Takada et al. |
| 5,596,569 A | 1/1997 | Madonna et al. |
| 5,619,574 A | 4/1997 | Johnson et al. |
| 5,651,125 A | 7/1997 | Witt et al. |
| 5,680,634 A | 10/1997 | Estes |
| 5,684,980 A | 11/1997 | Casselman |
| 5,701,464 A | 12/1997 | Aucsmith |
| 5,712,942 A | 1/1998 | Jennings et al. |
| 5,721,898 A | 2/1998 | Beardsley et al. |
| 5,740,244 A | 4/1998 | Indeck et al. |
| 5,740,466 A | 4/1998 | Geldman et al. |
| 5,774,835 A | 6/1998 | Ozawa et al. |
| 5,774,839 A | 6/1998 | Shlomot |
| 5,781,772 A | 7/1998 | Wilkinson, III et al. |
| 5,781,921 A | 7/1998 | Nichols |
| 5,802,290 A | 9/1998 | Casselman |
| 5,805,832 A | 9/1998 | Brown et al. |
| 5,809,483 A | 9/1998 | Broka et al. |
| 5,813,000 A | 9/1998 | Furlani |
| 5,819,273 A | 10/1998 | Vora et al. |
| 5,819,290 A | 10/1998 | Fujita et al. |
| 5,826,075 A | 10/1998 | Bealkowski et al. |
| 5,845,266 A | 12/1998 | Lupien et al. |
| 5,857,176 A | 1/1999 | Ginsberg |
| 5,864,738 A | 1/1999 | Kessler et al. |
| 5,870,730 A | 2/1999 | Furuya et al. |
| 5,873,071 A | 2/1999 | Ferstenberg et al. |
| 5,884,286 A | 3/1999 | Daughtery, III |
| 5,905,974 A | 5/1999 | Fraser et al. |
| 5,913,211 A | 6/1999 | Nitta |
| 5,930,753 A | 7/1999 | Potamianos et al. |
| 5,943,421 A | 8/1999 | Grabon |
| 5,943,429 A | 8/1999 | Händel |
| 5,950,006 A | 9/1999 | Crater et al. |
| 5,963,923 A | 10/1999 | Garber |
| 5,978,801 A | 11/1999 | Yuasa |
| 5,987,432 A | 11/1999 | Zusman et al. |
| 5,991,881 A | 11/1999 | Conklin et al. |
| 5,995,963 A | 11/1999 | Nanba et al. |
| 6,006,264 A | 12/1999 | Colby et al. |
| 6,016,483 A | 1/2000 | Rickard et al. |
| 6,023,755 A | 2/2000 | Casselman |
| 6,023,760 A | 2/2000 | Karttunen |
| 6,028,939 A | 2/2000 | Yin |
| 6,034,538 A | 3/2000 | Abramovici |
| 6,044,407 A | 3/2000 | Jones et al. |
| 6,058,391 A | 5/2000 | Gardner |
| 6,061,662 A | 5/2000 | Makivic |
| 6,064,739 A | 5/2000 | Davis |
| 6,067,569 A | 5/2000 | Khaki et al. |
| 6,070,172 A | 5/2000 | Lowe |
| 6,073,160 A | 6/2000 | Grantham et al. |
| 6,084,584 A | 7/2000 | Nahi et al. |
| 6,096,091 A | 8/2000 | Hartmann |
| 6,105,067 A | 8/2000 | Batra |
| 6,134,551 A | 10/2000 | Aucsmith |
| 6,138,176 A | 10/2000 | McDonald et al. |
| 6,147,976 A | 11/2000 | Shand et al. |
| 6,169,969 B1 | 1/2001 | Cohen |
| 6,173,270 B1 | 1/2001 | Cristofich et al. |
| 6,173,276 B1 | 1/2001 | Kant et al. |
| 6,178,494 B1 | 1/2001 | Casselman |
| 6,195,024 B1 | 2/2001 | Fallon |
| 6,226,676 B1 | 5/2001 | Crump et al. |
| 6,236,980 B1 | 5/2001 | Reese |
| 6,243,753 B1 | 6/2001 | Machin et al. |
| 6,247,060 B1 | 6/2001 | Boucher et al. |
| 6,263,321 B1 | 7/2001 | Daughtery, III |
| 6,272,616 B1 | 8/2001 | Fernando et al. |
| 6,278,982 B1 | 8/2001 | Korhammer et al. |
| 6,279,113 B1 | 8/2001 | Vaidya |
| 6,279,140 B1 | 8/2001 | Slane |
| 6,289,440 B1 | 9/2001 | Casselman |
| 6,295,530 B1 | 9/2001 | Ritchie et al. |
| 6,304,858 B1 | 10/2001 | Mosler et al. |
| 6,309,424 B1 | 10/2001 | Fallon |
| 6,317,728 B1 | 11/2001 | Kane |
| 6,317,795 B1 | 11/2001 | Malkin et al. |
| 6,321,258 B1 | 11/2001 | Stollfus et al. |
| 6,336,150 B1 | 1/2002 | Ellis et al. |
| 6,339,819 B1 | 1/2002 | Huppenthal et al. |
| 6,370,592 B1 | 4/2002 | Kumpf |
| 6,370,645 B1 | 4/2002 | Lee et al. |
| 6,377,942 B1 | 4/2002 | Hinsley et al. |
| 6,388,584 B1 | 5/2002 | Dorward et al. |
| 6,397,259 B1 | 5/2002 | Lincke et al. |
| 6,397,335 B1 | 5/2002 | Franczek et al. |
| 6,412,000 B1 | 6/2002 | Riddle et al. |

(56) References Cited

U.S. PATENT DOCUMENTS

| | | |
|---|---|---|
| 6,415,269 B1 | 7/2002 | Dinwoodie |
| 6,418,419 B1 | 7/2002 | Nieboer et al. |
| 6,430,272 B1 | 8/2002 | Maruyama et al. |
| 6,456,982 B1 | 9/2002 | Pilipovic |
| 6,463,474 B1 | 10/2002 | Fuh et al. |
| 6,484,209 B1 | 11/2002 | Momirov |
| 6,499,107 B1 | 12/2002 | Gleichauf et al. |
| 6,535,868 B1 | 3/2003 | Galeazzi et al. |
| 6,546,375 B1 | 4/2003 | Pang et al. |
| 6,578,147 B1 | 6/2003 | Shanklin et al. |
| 6,581,098 B1 | 6/2003 | Kumpf |
| 6,591,302 B2 | 7/2003 | Boucher et al. |
| 6,594,643 B1 | 7/2003 | Freeny, Jr. |
| 6,597,812 B1 | 7/2003 | Fallon et al. |
| 6,601,094 B1 | 7/2003 | Mentze et al. |
| 6,601,104 B1 | 7/2003 | Fallon |
| 6,604,158 B1 | 8/2003 | Fallon |
| 6,624,761 B2 | 9/2003 | Fallon |
| 6,625,150 B1 | 9/2003 | Yu |
| 6,691,301 B2 | 2/2004 | Bowen |
| 6,704,816 B1 | 3/2004 | Burke |
| 6,710,702 B1 | 3/2004 | Averbuch et al. |
| 6,711,558 B1 | 3/2004 | Indeck et al. |
| 6,765,918 B1 | 7/2004 | Dixon et al. |
| 6,766,304 B2 | 7/2004 | Kemp, II et al. |
| 6,772,132 B1 | 8/2004 | Kemp, II et al. |
| 6,772,136 B2 | 8/2004 | Kant et al. |
| 6,772,345 B1 | 8/2004 | Shetty |
| 6,778,968 B1 | 8/2004 | Gulati |
| 6,785,677 B1 | 8/2004 | Fritchman |
| 6,804,667 B1 | 10/2004 | Martin |
| 6,807,156 B1 | 10/2004 | Veres et al. |
| 6,820,129 B1 | 11/2004 | Courey, Jr. |
| 6,839,686 B1 | 1/2005 | Galant |
| 6,847,645 B1 | 1/2005 | Potter et al. |
| 6,850,906 B1 | 2/2005 | Chadha et al. |
| 6,870,837 B2 | 3/2005 | Ho et al. |
| 6,877,044 B2 | 4/2005 | Lo et al. |
| 6,886,103 B1 | 4/2005 | Brustoloni et al. |
| 6,901,461 B2 | 5/2005 | Bennett |
| 6,931,408 B2 | 8/2005 | Adams et al. |
| 6,931,545 B1 | 8/2005 | Ta et al. |
| 6,944,168 B2 | 9/2005 | Paatela et al. |
| 6,978,223 B2 | 12/2005 | Milliken |
| 6,981,054 B1 | 12/2005 | Krishna |
| 7,003,488 B2 | 2/2006 | Dunne et al. |
| 7,024,384 B2 | 4/2006 | Daughtery, III |
| 7,046,848 B1 | 5/2006 | Olcott |
| 7,058,735 B2 | 6/2006 | Spencer |
| 7,065,475 B1 | 6/2006 | Brundobler |
| 7,065,482 B2 | 6/2006 | Shorey et al. |
| 7,089,206 B2 | 8/2006 | Martin |
| 7,089,326 B2 | 8/2006 | Boucher et al. |
| 7,093,023 B2 | 8/2006 | Lockwood et al. |
| 7,099,838 B1 | 8/2006 | Gastineau et al. |
| 7,101,188 B1 | 9/2006 | Summers et al. |
| 7,103,569 B1 | 9/2006 | Groveman et al. |
| 7,117,280 B2 | 10/2006 | Vasudevan |
| 7,124,106 B1 | 10/2006 | Stallaert et al. |
| 7,127,424 B2 | 10/2006 | Kemp, II et al. |
| 7,130,913 B2 | 10/2006 | Fallon |
| 7,139,743 B2 | 11/2006 | Indeck et al. |
| 7,149,715 B2 | 12/2006 | Browne et al. |
| 7,161,506 B2 | 1/2007 | Fallon |
| 7,167,980 B2 | 1/2007 | Chiu |
| 7,177,833 B1 | 2/2007 | Marynowski et al. |
| 7,181,437 B2 | 2/2007 | Indeck et al. |
| 7,181,608 B2 | 2/2007 | Fallon et al. |
| 7,191,233 B2 | 3/2007 | Miller |
| 7,212,998 B1 | 5/2007 | Muller et al. |
| 7,219,125 B1 | 5/2007 | Day |
| 7,222,114 B1 | 5/2007 | Chan et al. |
| 7,224,185 B2 | 5/2007 | Campbell et al. |
| 7,225,188 B1 | 5/2007 | Gai et al. |
| 7,228,289 B2 | 6/2007 | Brumfield et al. |
| 7,249,118 B2 | 7/2007 | Sandler et al. |
| 7,251,629 B1 | 7/2007 | Marynowski et al. |
| 7,257,842 B2 | 8/2007 | Barton et al. |
| 7,277,887 B1 | 10/2007 | Burrows et al. |
| 7,287,037 B2 | 10/2007 | An et al. |
| 7,305,383 B1 | 12/2007 | Kubesh et al. |
| 7,305,391 B2 | 12/2007 | Wyschogrod et al. |
| 7,321,937 B2 | 1/2008 | Fallon |
| 7,356,498 B2 | 4/2008 | Kaminsky et al. |
| 7,363,277 B1 | 4/2008 | Dutta et al. |
| 7,372,875 B2 | 5/2008 | Hadzic et al. |
| 7,376,755 B2 | 5/2008 | Pandya |
| 7,378,992 B2 | 5/2008 | Fallon |
| 7,386,046 B2 | 6/2008 | Fallon et al. |
| 7,406,444 B2 | 7/2008 | Eng et al. |
| 7,415,723 B2 | 8/2008 | Pandya |
| 7,417,568 B2 | 8/2008 | Fallon et al. |
| 7,420,931 B2 | 9/2008 | Nanda et al. |
| 7,447,788 B2 | 11/2008 | Ahmed et al. |
| 7,454,418 B1 | 11/2008 | Wang |
| 7,457,834 B2 | 11/2008 | Jung et al. |
| 7,461,064 B2 | 12/2008 | Fontoura et al. |
| 7,472,237 B1 | 12/2008 | Herbst et al. |
| 7,478,431 B1 | 1/2009 | Nachenberg |
| 7,480,253 B1 | 1/2009 | Allan |
| 7,487,264 B2 | 2/2009 | Pandya |
| 7,487,327 B1 | 2/2009 | Chang et al. |
| 7,496,108 B2 | 2/2009 | Biran et al. |
| 7,536,462 B2 | 5/2009 | Pandya |
| 7,539,845 B1 | 5/2009 | Wentzlaff et al. |
| 7,558,753 B2 | 7/2009 | Neubert et al. |
| 7,558,925 B2 | 7/2009 | Bouchard et al. |
| 7,565,525 B2 | 7/2009 | Vorbach et al. |
| 7,580,719 B2 | 8/2009 | Karmarkar |
| 7,587,476 B2 | 9/2009 | Sato |
| 7,603,303 B1 | 10/2009 | Kraus et al. |
| 7,606,267 B2 | 10/2009 | Ho et al. |
| 7,606,968 B2 | 10/2009 | Branscome et al. |
| 7,617,291 B2 | 11/2009 | Fan et al. |
| 7,627,693 B2 | 12/2009 | Pandya |
| 7,631,107 B2 | 12/2009 | Pandya |
| 7,636,703 B2 | 12/2009 | Taylor |
| 7,660,761 B2 | 2/2010 | Zhou et al. |
| 7,668,849 B1 | 2/2010 | Narancic et al. |
| 7,685,121 B2 | 3/2010 | Brown et al. |
| 7,685,254 B2 | 3/2010 | Pandya |
| 7,698,338 B2 | 4/2010 | Hinshaw et al. |
| 7,701,945 B2 | 4/2010 | Roesch et al. |
| 7,714,747 B2 | 5/2010 | Fallon |
| 7,715,436 B1 | 5/2010 | Eiriksson et al. |
| 7,760,733 B1 | 7/2010 | Eiriksson et al. |
| 7,761,459 B1 | 7/2010 | Zhang et al. |
| 7,788,293 B2 | 8/2010 | Pasztor et al. |
| 7,827,190 B2 | 11/2010 | Pandya |
| 7,831,606 B2 | 11/2010 | Pandya |
| 7,831,607 B2 | 11/2010 | Pandya |
| 7,831,720 B1 | 11/2010 | Noureddine et al. |
| 7,840,482 B2 | 11/2010 | Singla et al. |
| 7,856,545 B2 | 12/2010 | Casselman |
| 7,856,546 B2 | 12/2010 | Casselman et al. |
| 7,869,442 B1 | 1/2011 | Kamboh et al. |
| 7,870,217 B2 | 1/2011 | Pandya |
| 7,890,692 B2 | 2/2011 | Pandya |
| 7,899,976 B2 | 3/2011 | Pandya |
| 7,899,977 B2 | 3/2011 | Pandya |
| 7,899,978 B2 | 3/2011 | Pandya |
| 7,908,213 B2 | 3/2011 | Monroe et al. |
| 7,908,259 B2 | 3/2011 | Branscome et al. |
| 7,912,808 B2 | 3/2011 | Pandya |
| 7,913,022 B1 | 3/2011 | Baxter |
| 7,917,299 B2 | 3/2011 | Buhler et al. |
| 7,921,046 B2 | 4/2011 | Parsons et al. |
| 7,944,920 B2 | 5/2011 | Pandya |
| 7,945,528 B2 | 5/2011 | Cytron et al. |
| 7,949,650 B2 | 5/2011 | Indeck et al. |
| 7,953,743 B2 | 5/2011 | Indeck et al. |
| 7,954,114 B2 | 5/2011 | Chamberlain et al. |
| 7,991,667 B2 | 8/2011 | Kraus et al. |
| 7,996,348 B2 | 8/2011 | Pandya |

(56) References Cited

U.S. PATENT DOCUMENTS

| | | |
|---|---|---|
| 8,005,966 B2 | 8/2011 | Pandya |
| 8,015,099 B2 | 9/2011 | Reid |
| 8,024,253 B2 | 9/2011 | Peterffy et al. |
| 8,027,893 B1 | 9/2011 | Burrows et al. |
| 8,032,440 B1 | 10/2011 | Hait |
| 8,046,283 B2 | 10/2011 | Burns et al. |
| 8,051,022 B2 | 11/2011 | Pandya |
| 8,055,601 B2 | 11/2011 | Pandya |
| 8,069,102 B2 | 11/2011 | Indeck et al. |
| 8,073,763 B1 | 12/2011 | Merrin et al. |
| 8,095,508 B2 | 1/2012 | Chamberlain et al. |
| 8,131,697 B2 | 3/2012 | Indeck et al. |
| 8,140,416 B2 | 3/2012 | Borkovec et al. |
| 8,156,101 B2 | 4/2012 | Indeck et al. |
| 8,181,239 B2 | 5/2012 | Pandya |
| 8,200,599 B2 | 6/2012 | Pandya |
| 8,224,800 B2 | 7/2012 | Branscome et al. |
| 8,229,918 B2 | 7/2012 | Branscome et al. |
| 8,234,267 B2 | 7/2012 | Branscome et al. |
| 8,244,718 B2 | 8/2012 | Chamdani et al. |
| 8,260,764 B1 | 9/2012 | Gruber |
| 8,281,026 B2 | 10/2012 | Lankford et al. |
| 8,326,819 B2 | 12/2012 | Indeck et al. |
| 8,374,986 B2 | 2/2013 | Indeck et al. |
| 8,407,122 B2 | 3/2013 | Parsons et al. |
| 8,458,081 B2 | 6/2013 | Parsons et al. |
| 8,478,680 B2 | 7/2013 | Parsons et al. |
| 8,479,124 B1 | 7/2013 | Baxter et al. |
| 8,515,682 B2 | 8/2013 | Buhler et al. |
| 8,549,024 B2 | 10/2013 | Indeck et al. |
| 8,595,104 B2 | 11/2013 | Parsons et al. |
| 8,600,856 B2 | 12/2013 | Parsons et al. |
| 8,601,086 B2 | 12/2013 | Pandya |
| 8,620,881 B2 | 12/2013 | Chamberlain et al. |
| 8,626,624 B2 | 1/2014 | Parsons et al. |
| 8,655,764 B2 | 2/2014 | Parsons et al. |
| 8,660,925 B2 | 2/2014 | Borkovec et al. |
| 8,737,606 B2 | 5/2014 | Taylor et al. |
| 8,751,452 B2 | 6/2014 | Chamberlain et al. |
| 8,762,249 B2 | 6/2014 | Taylor et al. |
| 8,768,805 B2 | 7/2014 | Taylor et al. |
| 8,768,888 B2 | 7/2014 | Chamberlain et al. |
| 8,843,408 B2 | 9/2014 | Singla et al. |
| 8,879,727 B2 | 11/2014 | Taylor et al. |
| 8,880,501 B2 | 11/2014 | Indeck et al. |
| 8,880,551 B2 | 11/2014 | Hinshaw et al. |
| 9,020,928 B2 | 4/2015 | Indeck et al. |
| 9,047,243 B2 | 6/2015 | Taylor et al. |
| 9,166,597 B1 | 10/2015 | Denisenko et al. |
| 9,176,775 B2 | 11/2015 | Chamberlain et al. |
| 9,378,161 B1 | 6/2016 | Dalal et al. |
| 9,961,006 B1 | 5/2018 | Sutardja et al. |
| 10,037,568 B2 | 7/2018 | Taylor et al. |
| 10,121,196 B2 | 11/2018 | Parsons et al. |
| 10,191,974 B2 | 1/2019 | Indeck et al. |
| 10,229,453 B2 | 3/2019 | Taylor et al. |
| 10,572,824 B2 | 2/2020 | Chamberlain et al. |
| 10,650,452 B2 | 5/2020 | Parsons et al. |
| 10,909,623 B2 | 2/2021 | Indeck et al. |
| 10,929,152 B2 | 2/2021 | Chamberlain et al. |
| 10,957,423 B2 | 3/2021 | Buhler et al. |
| 11,275,594 B2 | 3/2022 | Chamberlain et al. |
| 11,416,778 B2 | 8/2022 | Chamberlain et al. |
| 11,436,672 B2 | 9/2022 | Parsons et al. |
| 11,449,538 B2 | 9/2022 | Indeck et al. |
| 11,803,912 B2 | 10/2023 | Taylor et al. |
| 12,148,032 B2 | 11/2024 | Parsons et al. |
| 2001/0003193 A1 | 6/2001 | Woodring et al. |
| 2001/0004354 A1 | 6/2001 | Jolitz |
| 2001/0013048 A1 | 8/2001 | Imbert de Tremiolles et al. |
| 2001/0025315 A1 | 9/2001 | Jolitz |
| 2001/0042040 A1 | 11/2001 | Keith |
| 2001/0044770 A1 | 11/2001 | Keith |
| 2001/0047473 A1 | 11/2001 | Fallon |
| 2001/0052038 A1 | 12/2001 | Fallon et al. |
| 2001/0056547 A1 | 12/2001 | Dixon |
| 2002/0004820 A1 | 1/2002 | Baldwin et al. |
| 2002/0010825 A1 | 1/2002 | Wilson |
| 2002/0019812 A1 | 2/2002 | Board et al. |
| 2002/0023010 A1 | 2/2002 | Rittmaster et al. |
| 2002/0031125 A1 | 3/2002 | Sato |
| 2002/0038276 A1 | 3/2002 | Buhannic et al. |
| 2002/0049841 A1 | 4/2002 | Johnson et al. |
| 2002/0054604 A1 | 5/2002 | Kadambi et al. |
| 2002/0069370 A1 | 6/2002 | Mack |
| 2002/0069375 A1 | 6/2002 | Bowen |
| 2002/0072893 A1 | 6/2002 | Wilson |
| 2002/0080871 A1 | 6/2002 | Fallon et al. |
| 2002/0082967 A1 | 6/2002 | Kaminsky et al. |
| 2002/0091826 A1 | 7/2002 | Comeau et al. |
| 2002/0095512 A1 | 7/2002 | Rana et al. |
| 2002/0095519 A1 | 7/2002 | Philbrick et al. |
| 2002/0100029 A1 | 7/2002 | Bowen |
| 2002/0101425 A1 | 8/2002 | Hamid |
| 2002/0105911 A1 | 8/2002 | Pruthi et al. |
| 2002/0129140 A1 | 9/2002 | Peled et al. |
| 2002/0138376 A1 | 9/2002 | Hinkle |
| 2002/0143521 A1 | 10/2002 | Call |
| 2002/0150248 A1 | 10/2002 | Kovacevic |
| 2002/0156998 A1 | 10/2002 | Casselman |
| 2002/0162025 A1 | 10/2002 | Sutton et al. |
| 2002/0166063 A1 | 11/2002 | Lachman et al. |
| 2002/0169873 A1 | 11/2002 | Zodnik |
| 2002/0180742 A1 | 12/2002 | Hamid |
| 2002/0198813 A1 | 12/2002 | Patterson et al. |
| 2002/0199173 A1 | 12/2002 | Bowen |
| 2003/0009411 A1 | 1/2003 | Ram et al. |
| 2003/0009693 A1 | 1/2003 | Brock et al. |
| 2003/0014521 A1 | 1/2003 | Elson et al. |
| 2003/0014662 A1 | 1/2003 | Gupta et al. |
| 2003/0018630 A1 | 1/2003 | Indeck et al. |
| 2003/0023653 A1 | 1/2003 | Dunlop et al. |
| 2003/0023876 A1 | 1/2003 | Bardsley et al. |
| 2003/0028408 A1 | 2/2003 | RuDusky |
| 2003/0028690 A1 | 2/2003 | Appleby-Alis et al. |
| 2003/0028864 A1 | 2/2003 | Bowen |
| 2003/0033234 A1 | 2/2003 | RuDusky |
| 2003/0033240 A1 | 2/2003 | Balson et al. |
| 2003/0033450 A1 | 2/2003 | Appleby-Alis |
| 2003/0033514 A1 | 2/2003 | Appleby-Allis et al. |
| 2003/0033588 A1 | 2/2003 | Alexander |
| 2003/0033594 A1 | 2/2003 | Bowen |
| 2003/0035547 A1 | 2/2003 | Newton |
| 2003/0037037 A1 | 2/2003 | Adams et al. |
| 2003/0037321 A1 | 2/2003 | Bowen |
| 2003/0041129 A1 | 2/2003 | Appleby-Allis |
| 2003/0043805 A1 | 3/2003 | Graham et al. |
| 2003/0046668 A1 | 3/2003 | Bowen |
| 2003/0051043 A1 | 3/2003 | Wyschogrod et al. |
| 2003/0055658 A1 | 3/2003 | RuDusky |
| 2003/0055769 A1 | 3/2003 | RuDusky |
| 2003/0055770 A1 | 3/2003 | RuDusky |
| 2003/0055771 A1 | 3/2003 | RuDusky |
| 2003/0055777 A1 | 3/2003 | Ginsberg |
| 2003/0061409 A1 | 3/2003 | RuDusky |
| 2003/0065607 A1 | 4/2003 | Satchwell |
| 2003/0065943 A1 | 4/2003 | Geis et al. |
| 2003/0074177 A1 | 4/2003 | Bowen |
| 2003/0074582 A1 | 4/2003 | Patel et al. |
| 2003/0078865 A1 | 4/2003 | Lee |
| 2003/0079060 A1 | 4/2003 | Dunlop |
| 2003/0086300 A1 | 5/2003 | Noyes et al. |
| 2003/0093343 A1 | 5/2003 | Huttenlocher et al. |
| 2003/0093347 A1 | 5/2003 | Gray |
| 2003/0097481 A1 | 5/2003 | Richter |
| 2003/0099254 A1 | 5/2003 | Richter |
| 2003/0105620 A1 | 6/2003 | Bowen |
| 2003/0105721 A1 | 6/2003 | Ginter et al. |
| 2003/0110229 A1 | 6/2003 | Kulig et al. |
| 2003/0115485 A1 | 6/2003 | Milliken |
| 2003/0117971 A1 | 6/2003 | Aubury |
| 2003/0120460 A1 | 6/2003 | Aubury |
| 2003/0121010 A1 | 6/2003 | Aubury |
| 2003/0126065 A1 | 7/2003 | Eng et al. |

(56) References Cited

U.S. PATENT DOCUMENTS

| | | |
|---|---|---|
| 2003/0140337 A1 | 7/2003 | Aubury |
| 2003/0154284 A1 | 8/2003 | Bernardin et al. |
| 2003/0154368 A1 | 8/2003 | Stevens et al. |
| 2003/0163715 A1 | 8/2003 | Wong |
| 2003/0172017 A1 | 9/2003 | Feingold et al. |
| 2003/0177253 A1 | 9/2003 | Schuehler et al. |
| 2003/0184593 A1 | 10/2003 | Dunlop |
| 2003/0187662 A1 | 10/2003 | Wilson |
| 2003/0191876 A1 | 10/2003 | Fallon |
| 2003/0208430 A1 | 11/2003 | Gershon |
| 2003/0221013 A1 | 11/2003 | Lockwood et al. |
| 2003/0233302 A1 | 12/2003 | Weber et al. |
| 2004/0000928 A1 | 1/2004 | Cheng et al. |
| 2004/0010612 A1 | 1/2004 | Pandya |
| 2004/0015502 A1 | 1/2004 | Alexander et al. |
| 2004/0015633 A1 | 1/2004 | Smith |
| 2004/0019703 A1 | 1/2004 | Burton |
| 2004/0028047 A1 | 2/2004 | Hou et al. |
| 2004/0034587 A1 | 2/2004 | Amberson et al. |
| 2004/0049596 A1 | 3/2004 | Schuehler et al. |
| 2004/0054924 A1 | 3/2004 | Chuah et al. |
| 2004/0059666 A1 | 3/2004 | Waelbroeck et al. |
| 2004/0062245 A1 | 4/2004 | Sharp et al. |
| 2004/0064737 A1 | 4/2004 | Milliken et al. |
| 2004/0073703 A1 | 4/2004 | Boucher et al. |
| 2004/0105458 A1 | 6/2004 | Ishizuka |
| 2004/0111632 A1 | 6/2004 | Halperin |
| 2004/0162826 A1 | 8/2004 | Wyschogrod et al. |
| 2004/0170070 A1 | 9/2004 | Rapp et al. |
| 2004/0177340 A1 | 9/2004 | Hsu et al. |
| 2004/0186804 A1 | 9/2004 | Chakraborty et al. |
| 2004/0186814 A1 | 9/2004 | Chalermkraivuth et al. |
| 2004/0190526 A1 | 9/2004 | Kumar et al. |
| 2004/0199448 A1 | 10/2004 | Chalermkraivuth et al. |
| 2004/0199452 A1 | 10/2004 | Johnston et al. |
| 2004/0205149 A1 | 10/2004 | Dillon et al. |
| 2005/0005145 A1 | 1/2005 | Teixeira |
| 2005/0027634 A1 | 2/2005 | Gershon |
| 2005/0033672 A1 | 2/2005 | Lasry et al. |
| 2005/0038946 A1 | 2/2005 | Borden |
| 2005/0044344 A1 | 2/2005 | Stevens |
| 2005/0074033 A1 | 4/2005 | Chauveau |
| 2005/0080649 A1 | 4/2005 | Alvarez et al. |
| 2005/0086520 A1 | 4/2005 | Dharmapurikar et al. |
| 2005/0091142 A1 | 4/2005 | Renton et al. |
| 2005/0097027 A1 | 5/2005 | Kavanaugh |
| 2005/0108518 A1 | 5/2005 | Pandya |
| 2005/0111363 A1* | 5/2005 | Snelgrove ............ H04M 15/00 370/230 |
| 2005/0125551 A1 | 6/2005 | Oh et al. |
| 2005/0131790 A1 | 6/2005 | Benzschawel et al. |
| 2005/0135608 A1 | 6/2005 | Zheng |
| 2005/0187844 A1 | 8/2005 | Chalermkraivuth et al. |
| 2005/0187845 A1 | 8/2005 | Eklund et al. |
| 2005/0187846 A1 | 8/2005 | Subbu et al. |
| 2005/0187847 A1 | 8/2005 | Bonissone et al. |
| 2005/0187848 A1 | 8/2005 | Bonissone et al. |
| 2005/0187849 A1 | 8/2005 | Bollapragada et al. |
| 2005/0190787 A1 | 9/2005 | Kuik et al. |
| 2005/0195832 A1 | 9/2005 | Dharmapurikar et al. |
| 2005/0197916 A1* | 9/2005 | Newell .................. G06Q 40/04 715/225 |
| 2005/0197938 A1 | 9/2005 | Davie et al. |
| 2005/0197939 A1 | 9/2005 | Davie et al. |
| 2005/0197948 A1 | 9/2005 | Davie et al. |
| 2005/0216384 A1 | 9/2005 | Partlow et al. |
| 2005/0228735 A1 | 10/2005 | Duquette |
| 2005/0229254 A1 | 10/2005 | Singh et al. |
| 2005/0240510 A1 | 10/2005 | Schweickert et al. |
| 2005/0243824 A1 | 11/2005 | Abbazia et al. |
| 2005/0267836 A1 | 12/2005 | Crosthwaite et al. |
| 2005/0283423 A1 | 12/2005 | Moser et al. |
| 2005/0283743 A1 | 12/2005 | Mulholland et al. |
| 2006/0020536 A1 | 1/2006 | Renton et al. |
| 2006/0020715 A1 | 1/2006 | Jungck |
| 2006/0026090 A1 | 2/2006 | Balabon |
| 2006/0031154 A1 | 2/2006 | Noviello et al. |
| 2006/0031156 A1 | 2/2006 | Noviello et al. |
| 2006/0039287 A1 | 2/2006 | Hasegawa et al. |
| 2006/0047636 A1 | 3/2006 | Mohania et al. |
| 2006/0053295 A1 | 3/2006 | Madhusudan et al. |
| 2006/0059064 A1 | 3/2006 | Glinberg et al. |
| 2006/0059065 A1 | 3/2006 | Glinberg et al. |
| 2006/0059066 A1 | 3/2006 | Glinberg et al. |
| 2006/0059067 A1 | 3/2006 | Glinberg et al. |
| 2006/0059068 A1 | 3/2006 | Glinberg et al. |
| 2006/0059069 A1 | 3/2006 | Glinberg et al. |
| 2006/0059083 A1 | 3/2006 | Friesen et al. |
| 2006/0109798 A1 | 5/2006 | Yamada |
| 2006/0123425 A1 | 6/2006 | Ramarao et al. |
| 2006/0129745 A1 | 6/2006 | Thiel et al. |
| 2006/0143099 A1 | 6/2006 | Partlow et al. |
| 2006/0146991 A1 | 7/2006 | Thompson et al. |
| 2006/0215691 A1 | 9/2006 | Kobayashi et al. |
| 2006/0242123 A1 | 10/2006 | Williams, Jr. |
| 2006/0259407 A1 | 11/2006 | Rosenthal et al. |
| 2006/0259417 A1 | 11/2006 | Marynowski et al. |
| 2006/0269148 A1 | 11/2006 | Farber et al. |
| 2006/0282281 A1 | 12/2006 | Egetoft |
| 2006/0282369 A1 | 12/2006 | White |
| 2006/0294059 A1 | 12/2006 | Chamberlain et al. |
| 2007/0011183 A1 | 1/2007 | Langseth et al. |
| 2007/0011317 A1 | 1/2007 | Brandyburg et al. |
| 2007/0011687 A1 | 1/2007 | Ilik et al. |
| 2007/0025351 A1 | 2/2007 | Cohen |
| 2007/0061231 A1 | 3/2007 | Kim-E |
| 2007/0061241 A1 | 3/2007 | Jovanovic et al. |
| 2007/0061594 A1 | 3/2007 | Ginter et al. |
| 2007/0067108 A1 | 3/2007 | Buhler et al. |
| 2007/0067481 A1 | 3/2007 | Sharma et al. |
| 2007/0078837 A1 | 4/2007 | Indeck et al. |
| 2007/0094199 A1 | 4/2007 | Deshpande et al. |
| 2007/0112837 A1 | 5/2007 | Houh et al. |
| 2007/0115986 A1 | 5/2007 | Shankara |
| 2007/0118457 A1 | 5/2007 | Peterffy et al. |
| 2007/0118500 A1 | 5/2007 | Indeck et al. |
| 2007/0130140 A1 | 6/2007 | Cytron et al. |
| 2007/0156574 A1 | 7/2007 | Marynowski et al. |
| 2007/0174841 A1 | 7/2007 | Chamberlain et al. |
| 2007/0179935 A1 | 8/2007 | Lee et al. |
| 2007/0198523 A1 | 8/2007 | Hayim |
| 2007/0209068 A1 | 9/2007 | Ansari et al. |
| 2007/0237327 A1 | 10/2007 | Taylor et al. |
| 2007/0244859 A1 | 10/2007 | Trippe et al. |
| 2007/0260602 A1 | 11/2007 | Taylor |
| 2007/0260814 A1 | 11/2007 | Branscome et al. |
| 2007/0277036 A1 | 11/2007 | Chamberlain et al. |
| 2007/0294141 A1 | 12/2007 | Singla et al. |
| 2007/0294162 A1 | 12/2007 | Borkovec |
| 2008/0077793 A1 | 3/2008 | Tan et al. |
| 2008/0082502 A1 | 4/2008 | Gupta |
| 2008/0084573 A1 | 4/2008 | Horowitz et al. |
| 2008/0086274 A1 | 4/2008 | Chamberlain et al. |
| 2008/0097893 A1 | 4/2008 | Walsky et al. |
| 2008/0104542 A1 | 5/2008 | Cohen et al. |
| 2008/0109413 A1 | 5/2008 | Indeck et al. |
| 2008/0114724 A1 | 5/2008 | Indeck et al. |
| 2008/0114725 A1 | 5/2008 | Indeck et al. |
| 2008/0114760 A1 | 5/2008 | Indeck et al. |
| 2008/0126320 A1 | 5/2008 | Indeck et al. |
| 2008/0133453 A1 | 6/2008 | Indeck et al. |
| 2008/0133519 A1 | 6/2008 | Indeck et al. |
| 2008/0162378 A1 | 7/2008 | Levine et al. |
| 2008/0175239 A1 | 7/2008 | Sistanizadeh et al. |
| 2008/0183688 A1 | 7/2008 | Chamdani et al. |
| 2008/0189251 A1 | 8/2008 | Branscome et al. |
| 2008/0189252 A1 | 8/2008 | Branscome et al. |
| 2008/0243675 A1 | 10/2008 | Parsons et al. |
| 2008/0253395 A1 | 10/2008 | Pandya |
| 2008/0275805 A1 | 11/2008 | Hecht |
| 2009/0037514 A1 | 2/2009 | Lankford et al. |
| 2009/0182683 A1 | 7/2009 | Taylor et al. |
| 2009/0262741 A1 | 10/2009 | Jungck et al. |
| 2009/0287628 A1 | 11/2009 | Indeck et al. |

(56) References Cited

U.S. PATENT DOCUMENTS

| | | |
|---|---|---|
| 2010/0005036 A1 | 1/2010 | Kraus et al. |
| 2010/0027545 A1 | 2/2010 | Gomes et al. |
| 2010/0082895 A1 | 4/2010 | Branscome et al. |
| 2010/0106976 A1 | 4/2010 | Aciicmez et al. |
| 2010/0174770 A1 | 7/2010 | Pandya |
| 2010/0198920 A1 | 8/2010 | Wong et al. |
| 2010/0257537 A1 | 10/2010 | Hinshaw et al. |
| 2010/0306479 A1 | 12/2010 | Ezzat |
| 2011/0029471 A1 | 2/2011 | Chakradhar et al. |
| 2011/0040701 A1 | 2/2011 | Singla et al. |
| 2011/0040776 A1 | 2/2011 | Najm et al. |
| 2011/0066832 A1 | 3/2011 | Casselman et al. |
| 2011/0125960 A1 | 5/2011 | Casselman |
| 2011/0145130 A1 | 6/2011 | Glodjo et al. |
| 2011/0167083 A1 | 7/2011 | Branscome et al. |
| 2011/0178911 A1 | 7/2011 | Parsons et al. |
| 2011/0178912 A1 | 7/2011 | Parsons et al. |
| 2011/0178917 A1 | 7/2011 | Parsons et al. |
| 2011/0178918 A1 | 7/2011 | Parsons et al. |
| 2011/0178919 A1 | 7/2011 | Parsons et al. |
| 2011/0178957 A1 | 7/2011 | Parsons et al. |
| 2011/0179050 A1 | 7/2011 | Parsons et al. |
| 2011/0184844 A1 | 7/2011 | Parsons et al. |
| 2011/0199243 A1 | 8/2011 | Fallon et al. |
| 2011/0218987 A1 | 9/2011 | Branscome et al. |
| 2011/0231446 A1 | 9/2011 | Buhler et al. |
| 2011/0246353 A1 | 10/2011 | Kraus et al. |
| 2011/0252008 A1 | 10/2011 | Chamberlain et al. |
| 2011/0289230 A1 | 11/2011 | Ueno |
| 2011/0295967 A1 | 12/2011 | Wang et al. |
| 2012/0065956 A1 | 3/2012 | Irturk et al. |
| 2012/0089496 A1 | 4/2012 | Taylor et al. |
| 2012/0089497 A1 | 4/2012 | Taylor et al. |
| 2012/0095893 A1 | 4/2012 | Taylor et al. |
| 2012/0109849 A1 | 5/2012 | Chamberlain et al. |
| 2012/0110316 A1 | 5/2012 | Chamberlain et al. |
| 2012/0116998 A1 | 5/2012 | Indeck et al. |
| 2012/0117610 A1 | 5/2012 | Pandya |
| 2012/0130922 A1 | 5/2012 | Indeck et al. |
| 2012/0179590 A1 | 7/2012 | Borkovec et al. |
| 2012/0215801 A1 | 8/2012 | Indeck et al. |
| 2012/0246052 A1 | 9/2012 | Taylor et al. |
| 2013/0007000 A1 | 1/2013 | Indeck et al. |
| 2013/0018835 A1 | 1/2013 | Pandya |
| 2013/0086096 A1 | 4/2013 | Indeck et al. |
| 2013/0151458 A1 | 6/2013 | Indeck et al. |
| 2013/0159449 A1 | 6/2013 | Taylor et al. |
| 2013/0202287 A1 | 8/2013 | Joffe |
| 2013/0262287 A1 | 10/2013 | Parsons et al. |
| 2013/0290163 A1 | 10/2013 | Parsons et al. |
| 2014/0025656 A1 | 1/2014 | Indeck et al. |
| 2014/0040109 A1 | 2/2014 | Parsons et al. |
| 2014/0067830 A1 | 3/2014 | Buhler et al. |
| 2014/0089163 A1 | 3/2014 | Parsons et al. |
| 2014/0164215 A1 | 6/2014 | Parsons et al. |
| 2014/0180903 A1 | 6/2014 | Parsons et al. |
| 2014/0180904 A1 | 6/2014 | Parsons et al. |
| 2014/0180905 A1 | 6/2014 | Parsons et al. |
| 2014/0181133 A1 | 6/2014 | Parsons et al. |
| 2014/0310148 A1 | 10/2014 | Taylor et al. |
| 2014/0310717 A1 | 10/2014 | Chamberlain et al. |
| 2016/0070583 A1 | 3/2016 | Chamberlain et al. |
| 2017/0124255 A1 | 5/2017 | Buhler et al. |
| 2018/0276271 A1 | 9/2018 | Parsons et al. |
| 2018/0330444 A1 | 11/2018 | Taylor et al. |
| 2021/0142218 A1 | 5/2021 | Chamberlain et al. |
| 2021/0200559 A1 | 7/2021 | Chamberlain et al. |
| 2021/0304848 A1 | 9/2021 | Buhler et al. |
| 2022/0358592 A1 | 11/2022 | Taylor et al. |
| 2022/0414778 A1 | 12/2022 | Parsons et al. |
| 2024/0037660 A1 | 2/2024 | Taylor et al. |

FOREIGN PATENT DOCUMENTS

| | | |
|---|---|---|
| EP | 09-269901 A | 10/1997 |
| EP | 0851358 A | 7/1998 |
| EP | 0887723 | 12/1998 |
| EP | 0911738 A | 4/1999 |
| JP | 09145544 A | 6/1997 |
| JP | 11-259559 A | 9/1999 |
| JP | 11282912 | 10/1999 |
| JP | 11316765 A | 11/1999 |
| JP | 2000286715 A | 10/2000 |
| JP | 2001268071 A | 9/2001 |
| JP | 2001283000 A | 10/2001 |
| JP | 2002101089 A | 4/2002 |
| JP | 2002269343 A | 9/2002 |
| JP | 2002352070 A | 12/2002 |
| JP | 2003-036360 A | 2/2003 |
| JP | 2003256660 A | 9/2003 |
| JP | 2006059203 A | 3/2006 |
| JP | 2006293852 A | 10/2006 |
| JP | 4180644 B1 | 11/2008 |
| WO | 199010910 | 9/1990 |
| WO | 199409443 A1 | 4/1994 |
| WO | 199737735 | 10/1997 |
| WO | 2000041136 A1 | 7/2000 |
| WO | 2001022425 A | 3/2001 |
| WO | 0135216 A2 | 5/2001 |
| WO | 200172106 A2 | 10/2001 |
| WO | 2001080082 A2 | 10/2001 |
| WO | 2001080558 | 10/2001 |
| WO | 0190890 A1 | 11/2001 |
| WO | 2002061525 | 8/2002 |
| WO | 2003100650 | 4/2003 |
| WO | 2003036845 | 5/2003 |
| WO | 2003100662 | 12/2003 |
| WO | 2003104943 A2 | 12/2003 |
| WO | 2004017604 | 2/2004 |
| WO | 2004042560 A | 5/2004 |
| WO | 2004042561 A | 5/2004 |
| WO | 2004042562 | 5/2004 |
| WO | 2004042574 A | 5/2004 |
| WO | 2005017708 A | 2/2005 |
| WO | 2005026925 | 3/2005 |
| WO | 2005048134 A | 5/2005 |
| WO | 2005081855 A2 | 9/2005 |
| WO | 2005114339 A2 | 12/2005 |
| WO | 2006023948 | 3/2006 |
| WO | 2006060571 A2 | 6/2006 |
| WO | 2006096324 | 9/2006 |
| WO | 2007064685 | 6/2007 |
| WO | 2007/074903 A1 | 7/2007 |
| WO | 2007079095 A2 | 7/2007 |
| WO | 2007087507 | 8/2007 |
| WO | 2007/127336 A2 | 11/2007 |
| WO | 2008022036 | 2/2008 |
| WO | 2008073824 A1 | 6/2008 |
| WO | 2009089467 A2 | 7/2009 |
| WO | 2009140363 A1 | 11/2009 |
| WO | 2010/077829 | 7/2010 |
| WO | 2013090363 A2 | 6/2013 |
| WO | 2013/148693 A1 | 10/2013 |

OTHER PUBLICATIONS

Keutzer et al., "A Survey of Programmable Platforms—Network Proc", University of California-Berkeley, pp. 1-29.

Koloniari et al., "Content-Based Routing of Path Queries in Peer-to-Peer Systems", pp. 1-19, E. Bertino et al. (Eds.): EDBT 2004, LNCS 2992, pp. 29-47, 2004, copyright by Springer-Verlag, Germany.

Krishnamurthy et al., "Biosequence Similarity Search On The Mercury System", Proceedings of the 15th IEEE International Conference on Application-Specific Systems, Architectures, and Processors (ASAP04), Sep. 2004, pp. 365-375.

Kulig et al., "System and Method for Controlling Transmission of Data Packets Over an Information Network", pending U.S. Patent Application.

(56) References Cited

OTHER PUBLICATIONS

Lancaster et al., "Acceleration of Ungapped Extension in Mercury BLAST", Seventh (7th) Workshop on Media and Streaming Processors, Nov. 12, 2005, Thirty-Eighth (38th) International Symposium on Microarchitecture (MICRO-38), Barcelona, Spain.
Li et al., "Large-Scale IP Traceback in High-Speed Internet: Practical Techniques and Theoretical Foundation", Proceedings of the 2004 IEEE Symposium on Security and Privacy, 2004, pp. 1-15.
Lin et al., "Real-Time Image Template Matching Based on Systolic Array Processor", International Journal of Electronics; Dec. 1, 1992; pp. 1165-1176; vol. 73, No. 6; London, Great Britain.
Lockwood et al., "Field Programmable Port Extender (FPX) for Distributed Routing and Queuing", ACM International Symposium on Field Programmable Gate Arrays (FPGA 2000), Monterey, CA, Feb. 2000, pp. 137-144.
Lockwood et al., "Hello, World: A Simple Application for the Field Programmable Port Extender (FPX)", Washington University, Department of Computer Science, Technical Report WUCS-00-12, Jul. 11, 2000.
Lockwood et al., "Parallel FPGA Programming over Backplane Chassis", Washington University, Department of Computer Science, Technical Report WUCS-00-11, Jun. 12, 2000.
Lockwood et al., "Reprogrammable Network Packet Processing on the Field Programmable Port Extender (Fpx)", ACM International Symposium on Field Programmable Gate Arrays (FPGA 2001), Monterey, CA, Feb. 2001, pp. 87-93.
Lockwood, "An Open Platform for Development of Network Processing Modules in Reprogrammable Hardware", IEC DesignCon 2001, Santa Clara, CA, Jan. 2001, Paper WB-19.
Lockwood, "Building Networks with Reprogrammable Hardware", Field Programmable Port Extender: Jan. 2002 Gigabit Workshop Tutorial, Washington University, St. Louis, MO, Jan. 3-4, 2002.
Lockwood, "Evolvable Internet Hardware Platforms", NASA/DoD Workshop on Evolvable Hardware (EHW'01), Long Beach, CA, Jul. 12-14, 2001, pp. 271-279.
Lockwood, "Hardware Laboratory Configuration", Field Programmable Port Extender: Jan. 2002 Gigabit Workshop Tutorial, Washington University, St. Louis, MO, Jan. 3-4, 2002.
Lockwood, "Introduction", Field Programmable Port Extender: Jan. 2002 Gigabit Workshop Tutorial, Washington University, St. Louis, MO, Jan. 3-4, 2002.
Lockwood, "Platform and Methodology for Teaching Design of Hardware Modules in Internet Routers and Firewalls", IEEE Computer Society International Conference on Microelectronic Systems Education (MSE'2001), Las Vegas, NV, Jun. 17-18, 2001, pp. 56-57.
Lockwood, "Protocol Processing on the FPX", Field Programmable Port Extender: Jan. 2002 Gigabit Workshop Tutorial, Washington University, St. Louis, MO, Jan. 3-4, 2002.
Lockwood, "Simulation and Synthesis", Field Programmable Port Extender: Jan. 2002 Gigabit Workshop Tutorial, Washington University, St. Louis, MO, Jan. 3-4, 2002.
Lockwood, "Simulation of the Hello World Application for the Field-Programmable Port Extender (FPX)", Washington University, Applied Research Lab, Spring 2001 Gigabits Kits Workshop.
Madhusudan, "Design of a System for Real-Time Worm Detection", Hot Interconnects, pp. 77-83, Stanford, CA, Aug. 2004, found at http://www.hoti.org/hoti12/program/papers/2004/paper4.2.pdf.
Madhusudan, "Design of a System for Real-Time Worm Detection", Power Point Presentation in Support of Master's Thesis, Washington Univ., Dept. of Computer Science and Engineering, St. Louis, MO, Aug. 2004.
Mao et al., "Cluster-based Online Monitoring System of Web Traffic", Dept. of Computer Science and Technology, Tsinghua Univ., Bejing, 100084 P.R. China.
Mosanya et al., "A FPGA-Based Hardware Implementation of Generalized Profile Search Using Online Arithmetic", ACM/Sigda International Symposium on Field Programmable Gate Arrays (FPGA '99), Feb. 21-23, 1999, pp. 101-111, Monterey, CA, USA.

Moscola et al., "FPGrep and FPSed: Regular Expression Search and Substitution for Packet Streaming in Field Programmable Hardware", Dept. of Computer Science, Applied Research Lab, Washington University, Jan. 8, 2002, unpublished, pp. 1-19, St. Louis, MO.
Moscola et al., "FPSed: A Streaming Content Search-and-Replace Module for an Internet Firewall", Proc. of Hot Interconnects, 11th Symposium on High Performance Interconnects, pp. 122-129, Aug. 20, 2003.
Moscola, "FPGrep and FPSed: Packet Payload Processors for Managing the Flow of Digital Content on Local Area Networks and the Internet", Master's Thesis, Sever Institute of Technology, Washington University, St. Louis, MO, Aug. 2003.
Motwani et al., "Randomized Algorithms", 1995, pp. 215-216, Cambridge University Press.
Mueller, "Upgrading and Repairing PCs, 15th Anniversary Edition", 2004, pp. 63-66, 188, Que.
Navarro, "A Guided Tour to Approximate String Matching", ACM Computing Surveys, vol. 33, No. 1, Mar. 2001, pp. 31-88.
Necker et al., "TCP-Stream Reassembly and State Tracking in Hardware", School of Electrical and Computer Engineering, Georgia Institute of Technology, Atlanta, GA.
Nunez et al., "The X-MatchLITE FPGA-Based Data Compressor", Euromicro Conference 1999, Proceedings, Italy, Sep. 8-10, 1999, pp. 126-132, Los Alamitos, CA.
Nwodoh et al., "A Processing System for Real-Time Holographic Video Computation", Reconfigurable Technology: FPGAs for Computing and Application, Proceedings for the SPIE, Sep. 1999, Boston, pp. 129-140, vol. 3844.
Office Action for EP Application 13767579.9 dated Sep. 6, 2016.
Office Action for U.S. Appl. No. 14/195,550 dated Jun. 27, 2016.
Office Action for U.S. Appl. No. 14/195,462 dated Aug. 10, 2017.
Office Action for U.S. Appl. No. 14/195,462 dated Aug. 26, 2016.
Office Action for U.S. Appl. No. 14/195,462 dated Feb. 12, 2016.
Office Action for U.S. Appl. No. 14/195,462 dated Jan. 27, 2017.
Office Action for U.S. Appl. No. 14/195,510 dated Mar. 10, 2017.
Office Action for U.S. Appl. No. 14/195,510 dated Nov. 30, 2017.
Office Action for U.S. Appl. No. 14/195,531 dated Feb. 24, 2017.
Office Action for U.S. Appl. No. 14/195,531 dated May 18, 2016.
Office Action for U.S. Appl. No. 14/195,531 dated Sep. 7, 2017.
Office Action for U.S. Appl. No. 14/195,550 dated Feb. 10, 2017.
Parsing—(Wikipedia definition) https://en.wikipedia.org/w/index.php?title=Parsing&oldid=475958964.
Prakash et al., "OC-3072 Packet Classification Using BDDs and Pipelined SRAMs", Department of Electrical and Computer Engineering, The University of Texas at Austin.
Pramanik et al., "A Hardware Pattern Matching Algorithm on a Dataflow"; Computer Journal; Jul. 1, 1985; pp. 264-269; vol. 28, No. 3; Oxford University Press, Surrey, Great Britain.
"A Reconfigurable Computing Model for Biological Research Application of Smith-Waterman Analysis to Bacterial Genomes" A White Paper Prepared by Star Bridge Systems, Inc. [retrieved Dec. 12, 2006]. Retrieved from the Internet: <URL: http://www.starbridgesystems.com/resources/whitepapers/Smith%20Waterman%20Whitepaper.pdf.
"ACTIV Financial Announces Hardware Based Market Data Feed Processing Strategy", For Release on Apr. 2, 2007, 2 pages.
"ACTIV Financial Delivers Accelerated Market Data Feed", Apr. 6, 2007, byline of Apr. 2, 2007, downloaded from http://hpcwire.com/hpc.1346816.html on Jun. 19, 2007, 3 pages.
"Curriculum Vitae of Michael Brogioli, Ph.D" for Inter Partes Review Petition re U.S. Pat. No. 10,121,196; pp. 1-19; dated May 28, 2020.
"Declaration of Michael Brogioli, Ph.D" for Inter Partes Review Petition re U.S. Pat. No. 10,121,196; pp. 1-112; dated May 28, 2020.
"DRC, Exegy Announce Joint Development Agreement", Jun. 8, 2007, byline of Jun. 4, 2007; downloaded from http://www.hpcwire.com/hpc/1595644.html on Jun. 19, 2007, 3 pages.
"Lucent Technologies Delivers "PayloadPlus" Network Processors for Programmable, MultiProtocol, OC-48c Processing", Lucent Technologies Press Release, downloaded from http://www.lucent.com/press/1000/0010320.meb.html on Mar. 21, 2002.

(56) References Cited

OTHER PUBLICATIONS

"Overview, Field Programmable Port Extender", Jan. 2002 Gigabit Workshop Tutorial, Washington University, St. Louis, MO, Jan. 3-4, 2002, pp. 1-4.
"Payload Plus™ Agere System Interface", Agere Systems Product Brief, Jun. 2001, downloaded from Internet, Jan. 2002, pp. 1-6.
"Petition for Inter Partes Review" re U.S. Pat. No. 10,121,196; pp. 1-89; dated May 28, 2020.
"RFC793: Transmission Control Protocol, Darpa Internet Program, Protocol Specification", Sep. 1981.
"Technology Overview", Data Search Systems Incorporated, downloaded from the http://www.datasearchsystems.com/tech.htm on Apr. 19, 2004.
"The Field-Programmable Port Extender (FPX)", downloaded from http://www.arl.wustl.edu/arl/ in Mar. 2002.
Aldwairi et al., "Configurable String Matching Hardware for Speeding up Intrusion Detection", SIRARCH Comput. Archit. News, vol. 33, No. 1, pp. 99-107, Mar. 2005.
Amanuma et al., "A FPGA Architecture For High Speed Computation", Proceedings of 60th Convention Architecture, Software Science, Engineering, Mar. 14, 2000, pp. 1-163-1-164, Information Processing Society, Japan.
Anerousis et al., "Using the AT&T Labs PacketScope for Internet Measurement, Design, and Performance Analysis", Network and Distributed Systems Research Laboratory, AT&T Labs-Research, Florham, Park, NJ, Oct. 1997.
Anonymous, "Method for Allocating Computer Disk Space to a File of Known Size", IBM Technical Disclosure Bulletin, vol. 27, No. 10B, Mar. 1, 1985, New York.
Apostolopoulos et al., "Design, Implementaion and Performance of a Content-Based Switch", Proceedings IEEE INFOCOM 2000, The Conference on Computer Communications, 19th Annual Joint Conference of the IEEE Computer and Communications Societes, Tel Aviv, Israel, Mar. 26-30, 2000, pp. 1117-1126.
Arnold et al., "The Splash 2 Processor and Applications", Proceedings 1993 IEEE International Conference on Computer Design: VLSI In Computers and Processors (ICCD '93), Oct. 3, 1993, pp. 482-485, IEEE Computer Society, Cambridge, MA USA.
Artan et al., "Multi-packet Signature Detection using Prefix Bloom Filters", 2005, IEEE, pp. 1811-1816.
Asami et al., "Improvement of DES Key Search on FPGA-Based Parallel Machine "RASH"", Proceedings of Information Processing Society, Aug. 15, 2000, pp. 50-57, vol. 41, No. SIG5 (HPS1), Japan.
Baboescu et al., "Scalable Packet Classification," SIGCOMM'01, Aug. 27-31, 2001, pp. 199-210, San Diego, California, USA; http://www.ecse.rpi.edu/homepages/shivkuma/teaching/sp2001/readings/baboescu-pkt-classification.pdf.
Baer, "Computer Systems Architecture", 1980, pp. 262-265; Computer Science Press, Potomac, Maryland.
Baeza-Yates et al., "New and Faster Filters for Multiple Approximate String Matching", Random Structures and Algorithms (RSA), Jan. 2002, pp. 23-49, vol. 20, No. 1.
Baker et al., "High-throughput Linked-Pattern Matching for Intrusion Detection Systems", ANCS 2005: Proceedings of the 2005 Symposium on Architecture for Networking and Communications Systems, pp. 193-202, ACM Press, 2005.
Barone-Adesi et al., "Efficient Analytic Approximation of American Option Values", Journal of Finance, vol. 42, No. 2 (Jun. 1987), pp. 301-320.
Batory, "Modeling the Storage Architectures of Commercial Database Systems", ACM Transactions on Database Systems, Dec. 1985, pp. 463-528, vol. 10, issue 4.
Behrens et al., "BLASTN Redundancy Filter in Reprogrammable Hardware," Final Project Submission, Fall 2003, Department of Computer Science and Engineering, Washington University.
Berk, "JLex: A lexical analyzer generator for Java™", downloaded from http://www.cs.princeton.edu/~appel/modern/java/Jlex/ in Jan. 2002, pp. 1-18.
Bianchi et al., "Improved Queueing Analysis of Shared Buffer Switching Networks", ACM, Aug. 1993, pp. 482-490.

Bloom, "Space/Time Trade-offs in Hash Coding With Allowable Errors", Communications of the ACM, Jul. 1970, pp. 422-426, vol. 13, No. 7, Computer Usage Company, Newton Upper Falls, Massachusetts, USA.
Braun et al., "Layered Protocol Wrappers for Internet Packet Processing in Reconfigurable Hardware", Proceedings of Hot Interconnects 9 (Hotl-9) Stanford, CA, Aug. 22-24, 2001, pp. 93-98.
Braun et al., "Protocol Wrappers for Layered Network Packet Processing in Reconfigurable Hardware", IEEE Micro, Jan.-Feb. 2002, pp. 66-74.
Brodie et al., "Dynamic Reconfigurable Computing", in Proc. of 9th Military and Aerospace Programmable Logic Devices International Conference, Sep. 2006.
Cavnar et al., "N-Gram-Based Text Categorization", Proceedings of SDAIR-94, 3rd Annual Symposium on Document Analysis and Information Retrieval, Las Vegas, pp. 161-175, 1994.
Celko, "Joe Celko's Data & Databases: Concepts in Practice", 1999, pp. 72-74, Morgan Kaufmann Publishers.
Chamberlain et al., "Achieving Real Data Throughput for an FPGA Co-Processor on Commodity Server Platforms", Proc. of 1st Workshop on Building Block Engine Architectures for Computers and Networks, Oct. 2004, Boston, MA.
Chamberlain et al., "The Mercury System: Embedding Computation Into Disk Drives", 7th High Performance Embedded Computing Workshop, Sep. 2003, Boston, MA.
Chamberlain et al., "The Mercury System: Exploiting Truly Fast Hardware for Data Search", Proc. of Workshop on Storage Network Architecture and Parallel I/Os, Sep. 2003, New Orleans, LA.
Chaney et al., "Design of a Gigabit ATM Switch", Washington University, St. Louis.
Cho et al., "Deep Packet Filter with Dedicated Logic and Read Only Memories", 12th Annual IEEE Symposium on Field-Programmable Custom Computing Machines, Apr. 2004.
Choi et al., "Design of a Flexible Open Platform for High Performance Active Networks", Allerton Conference, 1999, Champaign, IL.
Cholleti, "Storage Allocation in Bounded Time", MS Thesis, Dept. of Computer Science and Engineering, Washington Univeristy, St. Louis, MO (Dec. 2002). Available as Washington University Technical Report WUCSE-2003-2.
Clark et al., "Scalable Pattern Matching for High Speed Networks", Proceedings of the 12th Annual IEEE Symposium on Field-Programmable Custom Computing Machines, 2004; FCCM 2004, Apr. 20-23, 2004; pp. 249-257; IEEE Computer Society; Cambridge, MA USA.
Cloutier et al., "VIP: An FPGA-Based Processor for Image Processing and Neural Networks", Proceedings of Fifth International Conference on Microelectronics for Neural Networks, Feb. 12, 1996, pp. 330-336, Los Alamitos, California.
Compton et al., "Configurable Computing: A Survey of Systems and Software", Technical Report, Northwestern University, Dept. of ECE, 1999.
Compton et al., "Reconfigurable Computing: A Survey of Systems and Software", Technical Report, Northwestern University, Dept. of ECE, 1999, presented by Yi-Gang Tai.
Compton et al., "Reconfigurable Computing: A Survey of Systems and Software", University of Washington, ACM Computing Surveys, Jun. 2, 2002, pp. 171-210, vol. 34 No. 2, <http://www.idi.ntnu.no/emner/tdt22/2011/reconfig.pdf>.
Cong et al., "An Optional Technology Mapping Algorithm for Delay Optimization in Lookup-Table Based FPGA Designs", IEEE, 1992, pp. 48-53.
Crosman, "Who Will Cure Your Data Latency?", Storage & Servers, Jun. 20, 2007, URL: http://www.networkcomputing.com/article/printFullArticleSrc.jhtml?article ID=199905630.
Cuppu and Jacob, "Organizational Design Trade-Offs at the DRAM, Memory Bus and Memory Controller Level: Initial Results," Technical Report UMB-SCA-1999-2, Univ. of Maryland Systems & Computer Architecture Group, Nov. 1999, pp. 1-10.
Currid, "TCP Offload to the Rescue", Networks, Jun. 14, 2004, 16 pages, vol. 2, No. 3.
Data Structure—(Wikipedia definition) https://en.wikipedia.org/wiki/Data_structure (4 pages).

(56) References Cited

OTHER PUBLICATIONS

Denoyer et al., "HMM-based Passage Models for Document Classification and Ranking", Proceedings of ECIR-01, 23rd European Colloquim Information Retrieval Research, Darmstatd, DE, pp. 126-135, 2001.
Dharmapurikar et al., "Deep Packet Inspection Using Parallel Bloom Filters," IEEE Micro, Jan.-Feb. 2004, vol. 24, Issue: 1, pp. 52-61.
Dharmapurikar et al., "Deep Packet Inspection Using Parallel Bloom Filters," Symposium on High Performance Interconnects (Hotl), Stanford, California, 2003, pp. 44-51.
Dharmapurikar et al., "Design and Implementation of a String Matching System for Network Intrusion Detection using FPGA-based Bloom Filters", Proc. of 12th Annual IEEE Symposium on Field Programmable Custom Computing Machines, 2004, pp. 1-10.
Dharmapurikar et al., "Longest Prefix Matching Using Bloom Filters," SIGCOMM, 2003, pp. 201-212.
Dharmapurikar et al., "Robust TCP Stream Reassembly in the Presence of Adversaries", Proc. of the 14th Conference on USENIX Security Symposium—vol. 14, 16 pages, Baltimore, MD, 2005; http://www.icir.org/vern/papers/TcpReassembly/TCPReassembly.pdf.
Dharmapurikar, "Fast and Scalable Pattern Matching for Content Filtering", ACM, ANCS 05, 2005, pp. 183-192.
Ebeling et al., "RaPiD—Reconfigurable Pipelined Datapath", University of Washington, Dept. of Computer Science and Engineering, Sep. 23, 1996, Seattle, WA.
Exegy Inc., "Exegy and HyperFeed to Unveil Exelerate TP at SIA Conference", Release Date: Jun. 20, 2006, downloaded from http://news.thomasnet.com/companystory/488004 on Jun. 19, 2007, 4 pages.
Exegy Inc., "First Exegy Ticker Plant Deployed", Release Date: Oct. 17, 2006, downloaded from http://news.thomasnet.com/companystory/496530 on Jun. 19, 2007, 5 pages.
Extended European Search Report for EP Application 11847815.5 dated Apr. 4, 2014.
Extended European Search Report for EP Application 13767579.9 dated Oct. 22, 2015.
Feldman, "High Frequency Traders Get Boost From FPGA Acceleration", Jun. 8, 2007, downloaded from http://www.hpcwire.com/hpc.1600113.html on Jun. 19, 2007, 4 pages.
Feldmann, "BLT: Bi-Layer Tracing of HTTP and TCP/IP", AT&T Labs-Research, Florham Park, NJ, USA.
Franklin et al., "An Architecture for Fast Processing of Large Unstructured Data Sets." Proc. of 22nd Int'l Conf. on Computer Design, Oct. 2004, pp. 280-287.
Franklin et al., "Assisting Network Intrusion Detection with Reconfigurable Hardware", Symposium on Field-Programmable Custom Computing Machines (FCCM 2002), Apr. 2002, Napa, California.
Fu et al., "The Fpx Kcpsm Module: An Embedded, Reconfigurable Active Processing Module for the Field Programmable Port Extender (FPX)", Washington University, Department of Computer Science, Technical Report WUCS-01-14, Jul. 2001.
Gavrila et al., "Multi-feature Hierarchical Template Matching Using Distance Transforms", IEEE, Aug. 16-20, 1998, vol. 1, pp. 439-444.
Gokhale et al., "Reconfigurable Computing: Accelerating Computation With Field-Programmable Gate Arrays", 2005, pp. 1-3, 7, 11-15, 39, 92-93, Springer.
Gokhale et al., "Reconfigurable Computing: Accelerating Computation with Field-Programmable Gate Arrays", Springer, 2005, pp. 1-36.
Gokhale et al., "Reconfigurable Computing: Accelerating Computation with Field-Programmable Gate Arrays", Springer, 2005, pp. 1-54, 92-96.
Google Search Results Page for "field programmable gate array financial calculation stock market" over dates of Jan. 1, 1990-May 21, 2002, 1 page.
Gunther et al., "Assessing Document Relevance with Run-Time Reconfigurable Machines", IEEE Symposium on FPGAs for Custom Computing Machines, 1996, pp. 10-17, Proceedings, Napa Valley, CA.
Gupta et al., "High-Speed Implementations of Rule-Based Systems," ACM Transactions on Computer Systems, May 1989, pp. 119-146, vol. 7, Issue 2.
Gupta et al., "Packet Classification on Multiple Fields", Computer Systems Laboratory, Stanford University, Stanford, CA.
Gupta et al., "PMM: A Parallel Architecture for Production Systems," Proceedings of the IEEE, Apr. 1992, pp. 693-696, vol. 2.
Gurtov, "Effect of Delays on TCP Performance", Cellular Systems Development, Sonera Corporation, online at http://cs.helsinki.fi/u/gurtov/papers/pwc01.pdf.
Gyang, "NCBI BLASTN Stage 1 in Reconfigurable Hardware," Technical Report WUCSE-2005-30, Aug. 2004, Department of Computer Science and Engineering, Washington University, St. Louis, MO.
Halaas et al., "A Recursive MISD Architecture for Pattern Matching", IEEE Transactions on Very Large Scale Integration, vol. 12, No. 7, pp. 727-734, Jul. 2004.
Harris, "Pete's Blog: Can FPGAs Overcome the FUD?", Low-Latency.com, May 14, 2007, URL: http://www.a-teamgroup.com/article/pete-blog-can-fpgas-overcome-the-fud/.
Hauck et al., "Software Technologies for Reconfigurable Systems", Northwestern University, Dept. of ECE, Technical Report, 1996.
Hayes, "Computer Architecture and Organization", Second Edition, 1988, pp. 448-459, McGraw-Hill, Inc.
Hezel et al., "FPGA-Based Template Matching Using Distance Transforms", Proceedings of the 10th Annual IEEE Symposium on Field-Programmable Custom Computing Machines, Apr. 22, 2002, pp. 89-97, IEEE Computer Society, USA.
Hirsch, "Tech Predictions for 2008", Reconfigurable Computing, Jan. 16, 2008, URL: http://fpgacomputing.blogspot.com/2008_01_01_archive.html.
Hoinville, et al. "Spatial Noise Phenomena of Longitudinal Magnetic Recording Media", IEEE Transactions on Magnetics, vol. 28, No. 6, Nov. 1992.
Hollaar, "Hardware Systems for Text Information Retrieval", Proceedings of the Sixth Annual International ACM Sigir Conference on Research and Development in Information Retrieval, Jun. 6-8, 1983, pp. 3-9, Baltimore, Maryland, USA.
Howe, Data Analysis for Database Design Third Edition, 2001, 335 pages, Butterworth-Heinemann.
Hutchings et al., "Assisting Network Intrusion Detection with Reconfigurable Hardware", FCCM 2002: 10th Annual IEEE Symposium on Field-Programmable Custom Computing Machines, 2002.
Ibrahim et al., "Lecture Notes in Computer Science: Database and Expert Systems Applications", 2000, p. 769, vol. 1873, Springer.
International Preliminary Report on Patentability (Chapter I) for PCT/US2011/064269 issued Jun. 12, 2013.
International Preliminary Report on Patentability (Chapter I) for PCT/US2013/033889 issued Oct. 9, 2014.
International Search Report and Written Opinion for PCT/US2011/064269 dated Apr. 20, 2012.
International Search Report and Written Opinion for PCT/US2012/069142 dated Feb. 22, 2013.
International Search Report and Written Opinion for PCT/US2013/033889 dated Aug. 29, 2013.
Jacobson et al., "RFC 1072: TCP Extensions for Long-Delay Paths", Oct. 1988.
Jacobson et al., "tcpdump—dump traffic on a network", Jun. 30, 1997, online at www.cse.cuhk.edu.hk/~cslui/CEG4430/tcpdump.ps.gz.
Johnson et al., "Pattern Matching in Reconfigurable Logic for Packet Classification", College of Computing, Georgia Institute of Technology, Atlanta, GA.
"Declaration of David E. Taylor" for Inter Partes Review re U.S. Pat. No. 10,121,196; IPR2020-01006, pp. 1-11; dated Sep. 8, 2020.
"Declaration of Robert Zeidman" for Inter Partes Review re U.S. Pat. No. 10,121,196; IPR2020-01006, pp. 1-74; dated Feb. 28, 2021.

(56) References Cited

OTHER PUBLICATIONS

"Deposition Transcript of Michael C. Brogioli, Ph.D." for Inter Partes Review re U.S. Pat. No. 10,121,196; IPR2020-01006, pp. 1-74; dated Feb. 9, 2021.
"Patent Owner's Preliminary Response" for Inter Partes Review re U.S. Pat. No. 10,121,196; IPR2020-01006, pp. 1-28; dated Sep. 8, 2020.
"Patent Owner's Response" for Inter Partes Review re U.S. Pat. No. 10,121,196; IPR2020-01006, pp. 1-74; dated Mar. 1, 2021.
"Second Declaration of David E. Taylor" for Inter Partes Review re U.S. Pat. No. 10,121,196; IPR2020-01006, pp. 1-15; dated Feb. 27, 2021.
Diniz et al., "Data Search and Reorganization Using FPGAs: Application to Spatial Pointer-Based Data Structures", IEEE, 2003, 11 pgs.
Ferguson, "Vector Signal Analysis of Digital Baseband and if Signals within an FPGA", 2005, IEEE, pp. 402-407.
Gokhale et al., "Reconfigurable Computing: Accelerating Computation with Field-Programmable Gate Arrays", Springer, 2005, pp. 1-209.
Prosecution History of U.S. Appl. No. 14/195,531, now U.S. Pat. No. 11,436,672, filed Mar. 3, 2014.
Villasenor et al., "The Flexibility of Configurable Computing", IEEE, 1998, pp. 67-84.
Vuillemin et al., "Programmable Active Memories: Reconfigurable Systems Come of Age", IEEE, 1996, pp. 56-69, vol. 4, No. 1.
Prosecution History for U.S. Appl. No. 14/195,550, now U.S. Pat. No. 9,990,393, filed Mar. 3, 2014.
Prosecution History for U.S. Appl. No. 13/833,098, filed Mar. 15, 2013, now U.S. Pat. No. 10,121,196, issued Nov. 6, 2018.
Ramakrishna et al., "A Performance Study of Hashing Functions for Hardware Applications", Int. Conf. on Computing and Information, May 1994, pp. 1621-1636, vol. 1, No. 1.
Ramakrishna et al., "Efficient Hardware Hashing Functions for High Performance Computers", IEEE Transactions on Computers, Dec. 1997, vol. 46, No. 12.
Ratha et al., "Convolution on Splash 2", Proceedings of IEEE Symposium on FPGAS for Custom Computing Machines, Apr. 19, 1995, pp. 204-213, Los Alamitos, California.
Roberts, "Internet Still Growing Dramatically Says Internet Founder", Press Release, Caspian Networks, Inc.—Virtual Pressroom.
Roesch, "Snort—Lightweight Intrusion Detection for Networks", Proceedings of LISA '99: 13th Systems Administration Conference; Nov. 7-12, 1999; pp. 229-238; USENIX Association, Seattle, WA USA.
Roy, "A bounded search algorithm for segmented channel routing for FPGA's and associated channel architecture issues", IEEE, Nov. 11, 1993, pp. 1695-1705, vol. 12.
Russ et al., Non-Intrusive Built-In Self-Test for FPGA and MCM Applications, Aug. 8-10, 1995, IEEE, 480-485.
Sachin Tandon, "A Programmable Architecture for Real-Time Derivative Trading", Master's Thesis, University of Edinburgh, 2003.
Schmerken, "With Hyperfeed Litigation Pending, Exegy Launches Low-Latency Ticker Plant", in Wall Street & Technology Blog, Mar. 20, 2007, pp. 1-2.
Schmit, "Incremental Reconfiguration for Pipelined Applications", FPGAs for Custom Computing Machines, Proceedings, The 5th Annual IEEE Symposium, Dept. of ECE, Carnegie Mellon University, Apr. 16-18, 1997, pp. 47-55, Pittsburgh, PA.
Schuehler et al., "Architecture for a Hardware Based, TCP/IP Content Scanning System", IEEE Micro, 24(1):62-69, Jan.-Feb. 2004, USA.
Schuehler et al., "TCP-Splitter: A TCP/IP Flow Monitor in Reconfigurable Hardware", Hot Interconnects 10 (Hotl-10), Stanford, CA, Aug. 21-23, 2002, pp. 127-131.
Seki et al., "High Speed Computation of Shogi With FPGA", Proceedings of 58th Convention Architecture, Software Science, Engineering, Mar. 9, 1999, pp. 1-133-1-134.
Shah, "Understanding Network Processors", Version 1.0, University of California-Berkeley, Sep. 4, 2001.
Shalunov et al., "Bulk TCP Use and Performance on Internet 2", ACM SIGCOMM Internet Measurement Workshop, 2001.
Shasha et al., "Database Tuning", 2003, pp. 280-284, Morgan Kaufmann Publishers.
Shirazi et al., "Quantitative Analysis of FPGA-based Database Searching", Journal of VLSI Signal Processing Systems For Signal, Image, and Video Technology, May 2001, pp. 85-96, vol. 28, No. 1/2, Kluwer Academic Publishers, Dordrecht, NL.
Sidhu et al., "Fast Regular Expression Matching Using FPGAs", IEEE Symposium on Field Programmable Custom Computing Machines (FCCM 2001), Apr. 2001.
Sidhu et al., "String Matching on Multicontext FPGAs Using Self-Reconfiguration", FPGA '99: Proceedings of the 1999 ACM/SIGDA 7th International Symposium on Field Programmable Gate Arrays, Feb. 1999, pp. 217-226.
Singh et al., "The EarlyBird System for Real-Time Detection on Unknown Worms", Technical report CS2003-0761, Aug. 2003.
Skiena et al., "Programming Challenges: The Programming Contest Training Manual", 2003, pp. 30-31, Springer.
Sourdis and Pnevmatikatos, "Fast, Large-Scale String Match for a 10Gbps FPGA-based Network Intrusion Detection System", 13th International Conference on Field Programmable Logic and Applications, 2003.
Steinbach et al., "A Comparison of Document Clustering Techniques", KDD Workshop on Text Mining, 2000.
Tan et al., "A High Throughput String Matching Architecture for Intrusion Detection and Prevention", ISCA 2005: 32nd Annual International Symposium on Computer Architecture, pp. 112-122, 2005.
Taylor et al., "Dynamic Hardware Plugins (DHP): Exploiting Reconfigurable Hardware for High-Performance Programmable Routers", Computer Networks, 38(3): 295-310 (16), Feb. 21, 2002, and online at http://www.cc.gatech.edu/classes/AY2007/cs8803hpc_fall/papers/phplugins.pdf.
Taylor et al., "Generalized RAD Module Interface Specification of the Field Programmable Port Extender (FPX) Version 2", Washington University, Department of Computer Science, Technical Report, Jul. 5, 2001, pp. 1-10.
Taylor et al., "Modular Design Techniques for the FPX", Field Programmable Port Extender: Jan. 2002 Gigabit Workshop Tutorial, Washington University, St. Louis, MO, Jan. 3-4, 2002.
Taylor et al., "Scalable Packet Classification using Distributed Crossproducting of Field Labels", Proceedings of IEEE Infocom, Mar. 2005, pp. 1-12, vol. 20, No. 1.
Taylor, "Models, Algorithms, and Architectures for Scalable Packet Classification", doctoral thesis, Department of Computer Science and Engineering, Washington University, St. Louis, MO, Aug. 2004, pp. 1-201.
Thomson Reuters, "Mellanox InfiniBand Accelerates the Exegy Ticker Plant at Major Exchanges", Jul. 22, 2008, URL: http://www.reuters.com/article/pressRelease/idUS125385+22-Jul-2008+BW20080722.
Uluski et al., "Characterizing Antivirus Workload Execution", SIGARCH Comput. Archit. News, vol. 33, No. 1, pp. 90-98, Mar. 2005.
Villasenor et al., "Configurable Computing Solutions For Automatic Target Recognition", FPGAS for Custom Computing Machines, 1996, Proceedings, IEEE Symposium on Napa Valley, CA, Apr. 17-19, 1996, pp. 70-79, 1996 IEEE, Napa Valley, CA, Los Alamitos, CA, USA.
Waldvogel et al., "Scalable High-Speed Prefix Matching", ACM Transactions on Computer Systems, Nov. 2001, pp. 440-482, vol. 19, No. 4.
Ward et al., "Dynamically Reconfigurable Computing: A Novel Computation Technology with Potential to Improve National Security Capabilities", May 15, 2003, A White Paper Prepared by Star Bridge Systems, Inc. [retrieved Dec. 12, 2006]. Retrieved from the Internet: <URL: http://www.starbridgesystems.com/resources/whitepapers/Dynamically%20Reconfigurable%20Computing.pdf.
Weaver et al., "Very Fast Containment of Scanning Worms", Proc. USENIX Security Symposium 2004, San Diego, CA, Aug. 2004, located at http://www.icsi.berkely.edu/~nweaver/containment/containment.pdf.

(56) References Cited

OTHER PUBLICATIONS

Web-Pop (Professional Options Package) (www.pmpublishing.com).

West et al., "An FPGA-Based Search Engine for Unstructured Database", Proc. of 2nd Workshop on Application Specific Processors, Dec. 2003, San Diego, CA.

Wooster et al., "HTTPDUMP Network HTTP Packet Snooper", Apr. 25, 1996.

Worboys, "GIS: A Computing Perspective", 1995, pp. 245-247, 287, Taylor & Francis Ltd.

Yamaguchi et al., "High Speed Homology Search with FPGAs", Proceedings Pacific Symposium on Biocomputing, Jan. 3-7, 2002, pp. 271-282, vol. 7, Online, Lihue, Hawaii, USA.

Yan et al., "Enhancing Collaborative Spam Detection with Bloom Filters", 2006, IEEE, pp. 414-425.

Yoshitani et al., "Performance Evaluation of Parallel vol. Rendering Machine Re Volver/C40", Study Report of Information Processing Society, Mar. 5, 1999, pp. 79-84, vol. 99, No. 21.

Ziv et al., "A Universal Algorithm for Sequential Data Compression", IEEE Trans. Inform. Theory, IT-23(3): 337-343 (1997).

"Decision Granting Institution of Inter Partes Review" for U.S. Pat. No. 10,121,196; IPR2020-01006, dated Dec. 4, 2020, pp. 1-22.

Office Action for U.S. Appl. No. 17/903,236 dated Apr. 11, 2024.

\* cited by examiner

OFFLOAD PROCESSING OF DATA PACKETS CONTAINING FINANCIAL MARKET DATA

CROSS-REFERENCE AND PRIORITY CLAIM TO RELATED PATENT APPLICATIONS

This patent application is a continuation of U.S. patent application Ser. No. 16/180,377, filed Nov. 5, 2018, and entitled "Offload Processing of Data Packets Containing Financial Market Data", now U.S. Pat. No. 10,963,962, which is a divisional of U.S. patent application Ser. No. 13/833,098, filed Mar. 15, 2013, and entitled "Offload Processing of Data Packets Containing Financial Market Data", now U.S. Pat. No. 10,121,196, which claims priority to U.S. provisional patent application Ser. No. 61/616,181, filed Mar. 27, 2012, and entitled "Offload Processing of Data Packets Containing Financial Market Data", the entire disclosures of each of which are incorporated herein by reference.

INTRODUCTION

The process of trading financial instruments may be viewed broadly as proceeding through a cycle as shown in FIG. 1. At the top of the cycle is the exchange which is responsible for matching up offers to buy and sell financial instruments. Exchanges disseminate market information, such as the appearance of new buy/sell offers and trade transactions, as streams of events known as market data feeds. Trading firms receive market data from the various exchanges upon which they trade. Note that many traders manage diverse portfolios of instruments requiring them to monitor the state of multiple exchanges. Utilizing the data received from the exchange feeds, trading systems make trading decisions and issue buy/sell orders to the financial exchanges. Orders flow into the exchange where they are inserted into a sorted "book" of orders, triggering the publication of one or more events on the market data feeds.

In an attempt to promptly deliver financial information to interested parties such as traders, a variety of electronic trading platforms have been developed for the purpose of ostensible "real time" delivery of streaming bid, offer, and trade information for financial instruments to traders. FIG. 2 illustrates an exemplary platform that is currently known in the art. As shown in FIG. 2, the electronic trading platform 200 comprises a plurality of functional units 202 that are configured to carry out data processing operations such as the ones depicted in units 202, whereby traders at workstations 204 have access to financial data of interest and whereby trade information can be sent to various exchanges or other outside systems via output path 210. The purpose and details of the functions performed by functional units 202 are well-known in the art. A stream 206 of financial data arrives at the system 200 from an external source such as the exchanges themselves (e.g., NYSE, NASDAQ, etc.) over private data communication lines or from extranet providers such as Savvis or BT Radians. The financial data source stream 206 comprises a series of messages that individually represent a new offer to buy or sell a financial instrument, an indication of a completed sale of a financial instrument, notifications of corrections to previously-reported sales of a financial instrument, administrative messages related to such transactions, and the like. As used herein, a "financial instrument" refers to a contract representing equity ownership, debt or credit, typically in relation to a corporate or governmental entity, wherein the contract is saleable. Examples of "financial instruments" include stocks, bonds, commodities, currency traded on currency markets, etc. but would not include cash or checks in the sense of how those items are used outside financial trading markets (i.e., the purchase of groceries at a grocery store using cash or check would not be covered by the term "financial instrument" as used herein; similarly, the withdrawal of $100 in cash from an Automatic Teller Machine using a debit card would not be covered by the term "financial instrument" as used herein). Functional units 202 of the system then operate on stream 206 or data derived therefrom to carry out a variety of financial processing tasks. As used herein, the term "financial market data" refers to the data contained in or derived from a series of messages that individually represent a new offer to buy or sell a financial instrument, an indication of a completed sale of a financial instrument, notifications of corrections to previously-reported sales of a financial instrument, administrative messages related to such transactions, and the like. The term "financial market source data" refers to a feed of financial market data directly from a data source such as an exchange itself or a third party provider (e.g., a Savvis or BT Radianz provider). The term "financial market secondary data" refers to financial market data that has been derived from financial market source data, such as data produced by a feed compression operation, a feed handling operation, an option pricing operation, etc.

Financial data applications require fast access to large volumes of financial market data, and latency is an ever present technical problem in need of ever evolving solutions in the field of processing financial market data. As depicted in FIG. 2, the consumption, normalization, aggregation, and distribution of financial market data are key elements in a system that processes financial market data. For a broad spectrum of applications, platform architects seek to minimize the latency of market data processing and distribution, while minimizing the space and power required to host the market data processing and distribution elements. As described in the following patents and patent application, significant performance, efficiency, and scalability improvements can be achieved by leveraging reconfigurable hardware devices and other types of co-processors to integrate and consolidate market data consumption, normalization, aggregation, enrichment, and distribution functions: U.S. Pat. Nos. 7,840,482, 7,921,046, and 7,954,114 as well as the following published patent applications: U.S. Pat. App. Pub. 2007/0174841, U.S. Pat. App. Pub. 2007/0294157, U.S. Pat. App. Pub. 2008/0243675, U.S. Pat. App. Pub. 2009/0182683, U.S. Pat. App. Pub. 2009/0287628, U.S. Pat. App. Pub. 2011/0040701, U.S. Pat. App. Pub. 2011/0178911, U.S. Pat. App. Pub. 2011/0178912, U.S. Pat. App. Pub. 2011/0178917, U.S. Pat. App. Pub. 2011/0178918, U.S. Pat. App. Pub. 2011/0178919, U.S. Pat. App. Pub. 2011/0178957, U.S. Pat. App. Pub. 2011/0179050, U.S. Pat. App. Pub. 2011/0184844, WO Pub. WO 2010/077829, U.S. Pat. App. Pub. 2012/0246052, and U.S. Pat. App. Ser. No. 61/570,670, entitled "Method and Apparatus for Low Latency Data Distribution", filed Dec. 14, 2011, the entire disclosures of each of which are incorporated herein by reference. These concepts can be extended to various market data processing tasks as described in the above-referenced and incorporated patents and patent applications. Similarly, the above-referenced and incorporated Pat. App. Ser. No. 61/570,670 demonstrates how the systems responsible for the distribution of real-time financial data can be greatly enhanced via the use of novel communication protocols implemented in reconfigurable hardware devices and other types of co-processors.

In accordance with various embodiments disclosed herein, the inventors further disclose various methods, apparatuses, and systems for offloading the processing of data packets that contain financial market data. In exemplary embodiments, various processing tasks are offloaded from an electronic trading platform to one or more processors upstream or downstream from the electronic trading platform. It should be understood that the term upstream in this context is meant to identify a directional flow with respect to data that is moving to an electronic trading platform, in which case an offload processor upstream from the electronic trading platform would process financial market data flowing toward the electronic trading platform. Similarly, in this context downstream is meant to identify a directional flow with respect to data that is moving away from an electronic trading platform, in which case an offload processor downstream from the electronic trading platform would process financial market data flowing out of the electronic trading platform.

In some embodiments, the offloaded processing can be moved into the data distribution network for financial market data. For example, one or more of the offloaded financial market data processing tasks described herein can be implemented in one or more network elements of the data distribution network, such as a switch within the data distribution network. Disclosed herein are exemplary embodiments where a number of market data consumption, normalization, aggregation, enrichment, and distribution functions can be embedded within the elements that comprise the market data feed network 214. Conceptually, these embodiments offload processing tasks typically performed by downstream processing elements 202 such as feed handlers and virtual order books. The inventors also disclose a number of market data distribution functions that can be embedded within the network elements that comprise the financial application data network 208. Conceptually, these embodiments effectively offload processing tasks typically performed by ticker plants, messaging middleware, and downstream applications. Offloading these tasks from traditional platform components and embedding them in network elements may obviate some platform components, improve the performance of some components, reduce the total amount of space and power required by the platform, achieve higher system throughput, and deliver lower latency market data to consuming applications.

These and other features and advantages of the present invention will be apparent to those having ordinary skill in the art upon review of the teachings in the following description and drawings.

DETAILED DESCRIPTION

A. Offload Processor:

Thus, in an exemplary embodiment, the inventors disclose that an offload processor can be configured to process incoming data packets, where each of at least a plurality of the incoming data packets contain a plurality of financial market data messages, and wherein the financial market data messages comprise a plurality of data fields describing financial market data for a plurality of financial instruments. Thus, the payload of each incoming data packet can comprise one or more financial market data messages. Such an offload processor can filter and repackage the financial market data into outgoing data packets where the financial market data that is grouped into outgoing data packets is grouped using a criterion different than the criterion upon which financial market data was grouped into the incoming data packets. This permits the offload processor to serve a valuable role in generating a new set of customized outgoing data packets from incoming data packets. In various exemplary embodiments of such an offload processor, the offload processor can alleviate the processing burden on the downstream electronic trading platform(s).

Figure 1:
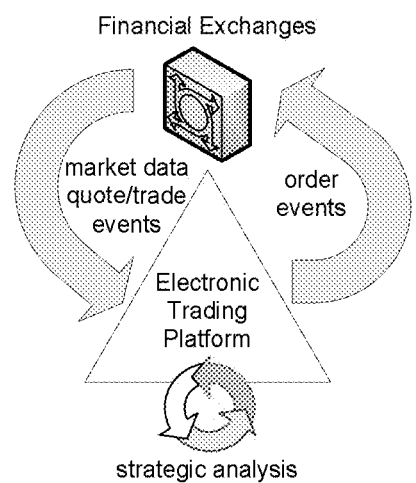
FIG. 1 illustrates an exemplary process cycle for trading financial instruments.
Figure 2:
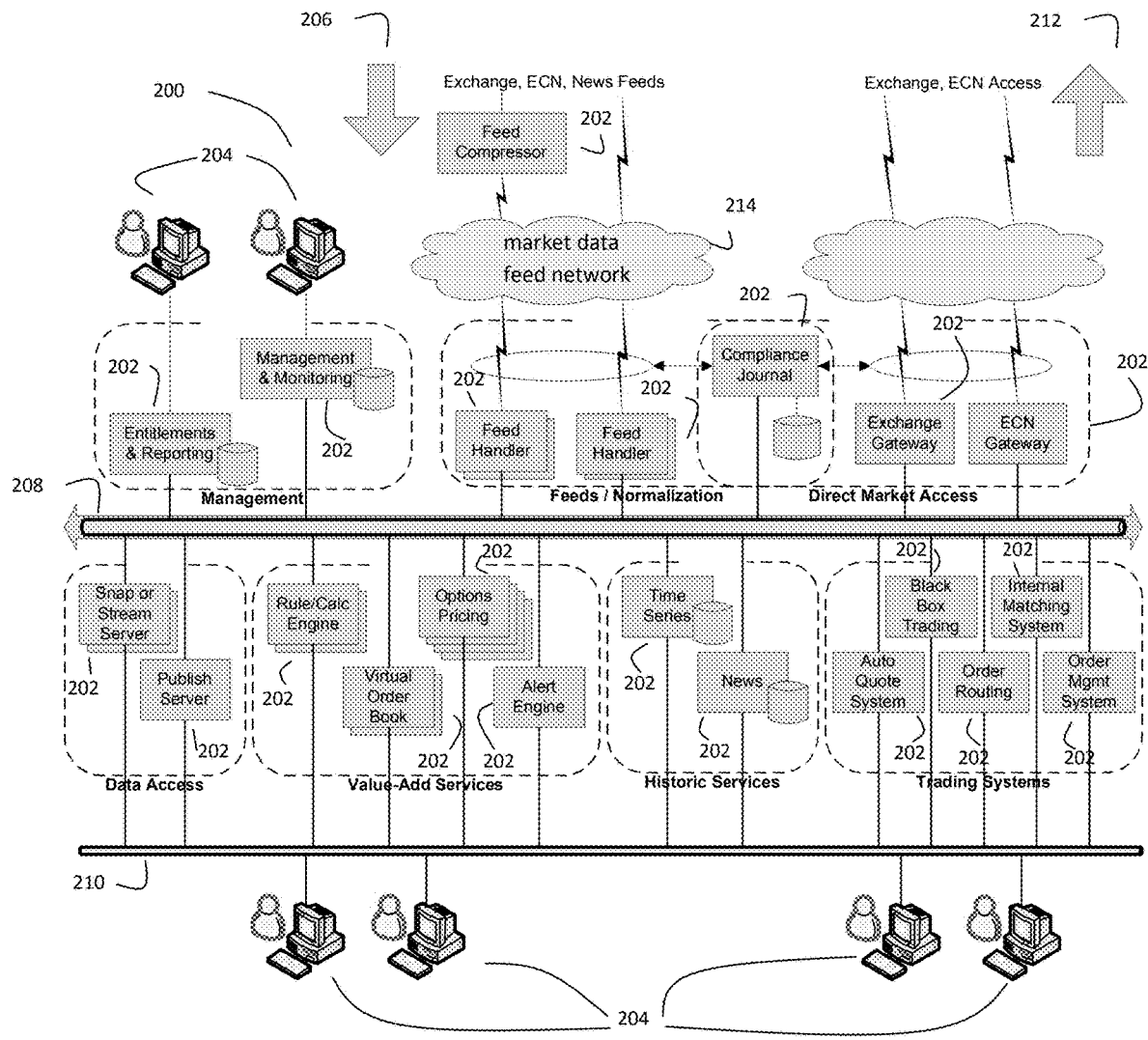
FIG. 2 illustrates an exemplary electronic trading platform.
Figure 3:
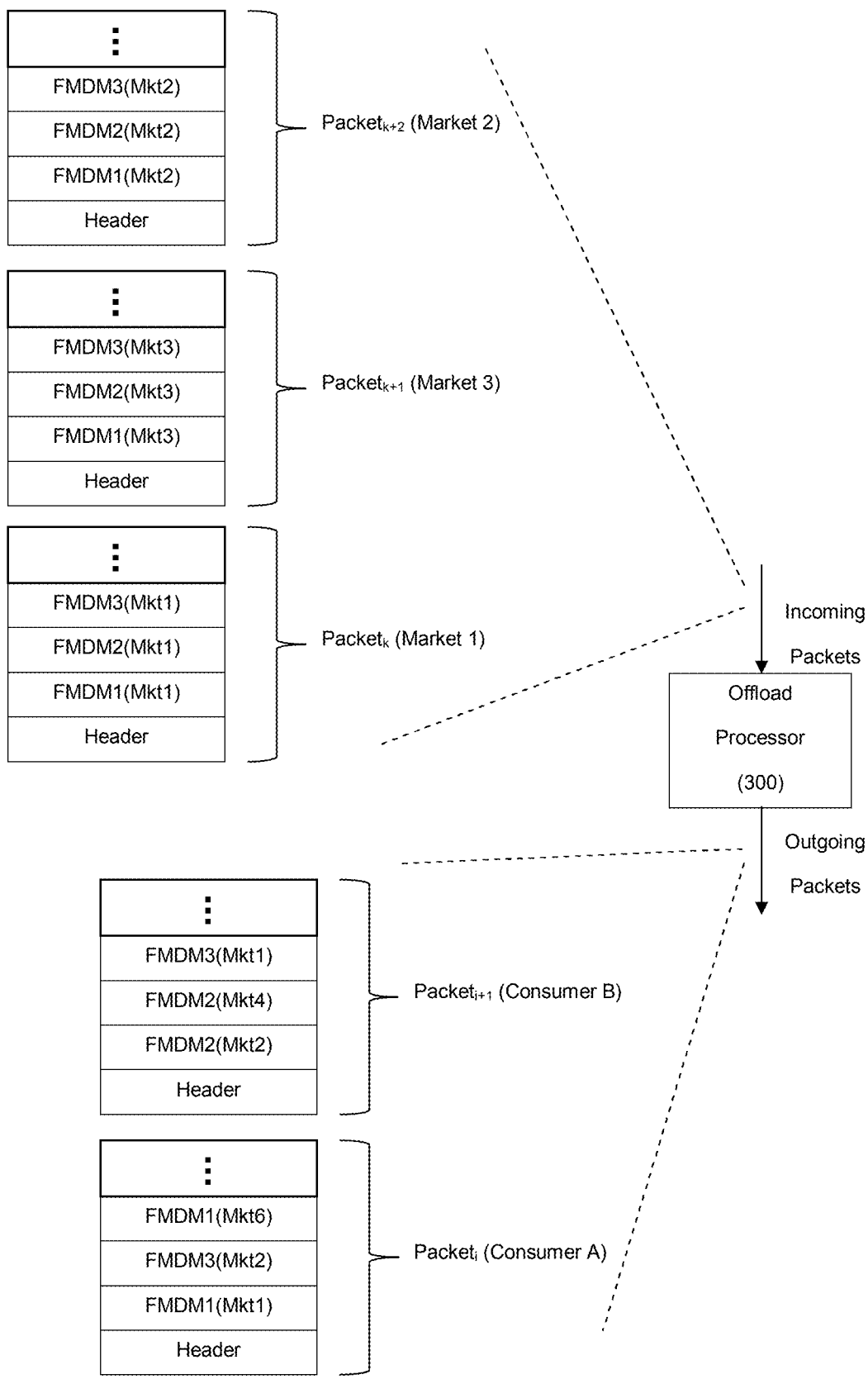
FIGS. 3-6 illustrate exemplary embodiments for offload processors that provide repackaging functionality.

Examples of such an offload processor are shown in FIGS. 3-6. FIG. 3 depicts an exemplary offload processor 300 that is configured to receive as an input a consolidated (i.e., multiplexed) stream of incoming data packets from different financial markets. As shown in FIG. 3, each incoming data packet has a payload that contains multiple financial market data messages from the same financial market. Thus, a plurality of financial market data messages from the feed for Financial Market 1 (e.g., NYSE) are combined in the same packet (e.g., where financial market data message FMDM1 (Mkt 1) is a new offer to buy stock for Company A from the NYSE, FMDM2 (Mkt 1) is a new offer to sell stock for Company B from the NYSE, and where FMDM3 (Mkt 1) is a notification of a completed trade on stock for Company C from the NYSE), while a plurality of financial market data messages from the feed for Financial Market 2 (e.g., NASDAQ) are combined in the same packet, and so on. The offload processor 300 performs financial market data filtering and repackaging between incoming and outgoing data packets such that the outgoing financial market data packets contain financial market data messages that are organized using a different criterion. Thus, the offload processor filters and sorts the financial market data from the different markets by a criterion such as which downstream data consumers have expressed an interest in such financial market data. In this fashion, the offload processor 300 can mix payload portions of incoming data packets on a criterion-specific basis to generate outgoing data packets with newly organized payloads. For example, data consumer A may have an interest in all new messages relating a particular set of financial instruments (e.g., IBM stock, Apple stock, etc.) regardless of which market served as the source of the messages on such instruments. Another data consumer, Consumer B, may have similar interests in a different set of financial instruments. In such a case, the offload processor can be configured to re-group the financial market data into the outgoing data packets around the interests of particular downstream consumers. Thus, FIG. 3 also shows outgoing data packets that are consumer-specific. As can be seen, the payloads of these consumer-specific data packets comprise financial market data messages from different markets that arrived in different incoming data packets.

Exemplary processing pipelines that can be employed by the offload processor to provide such sorting and repackaging functions are described below in connection with FIGS. 13, 15, and 20.

In another exemplary embodiment, an offload processor can be configured to perform packet mapping functions on incoming data packets from various financial market data feeds.

Figure 4:
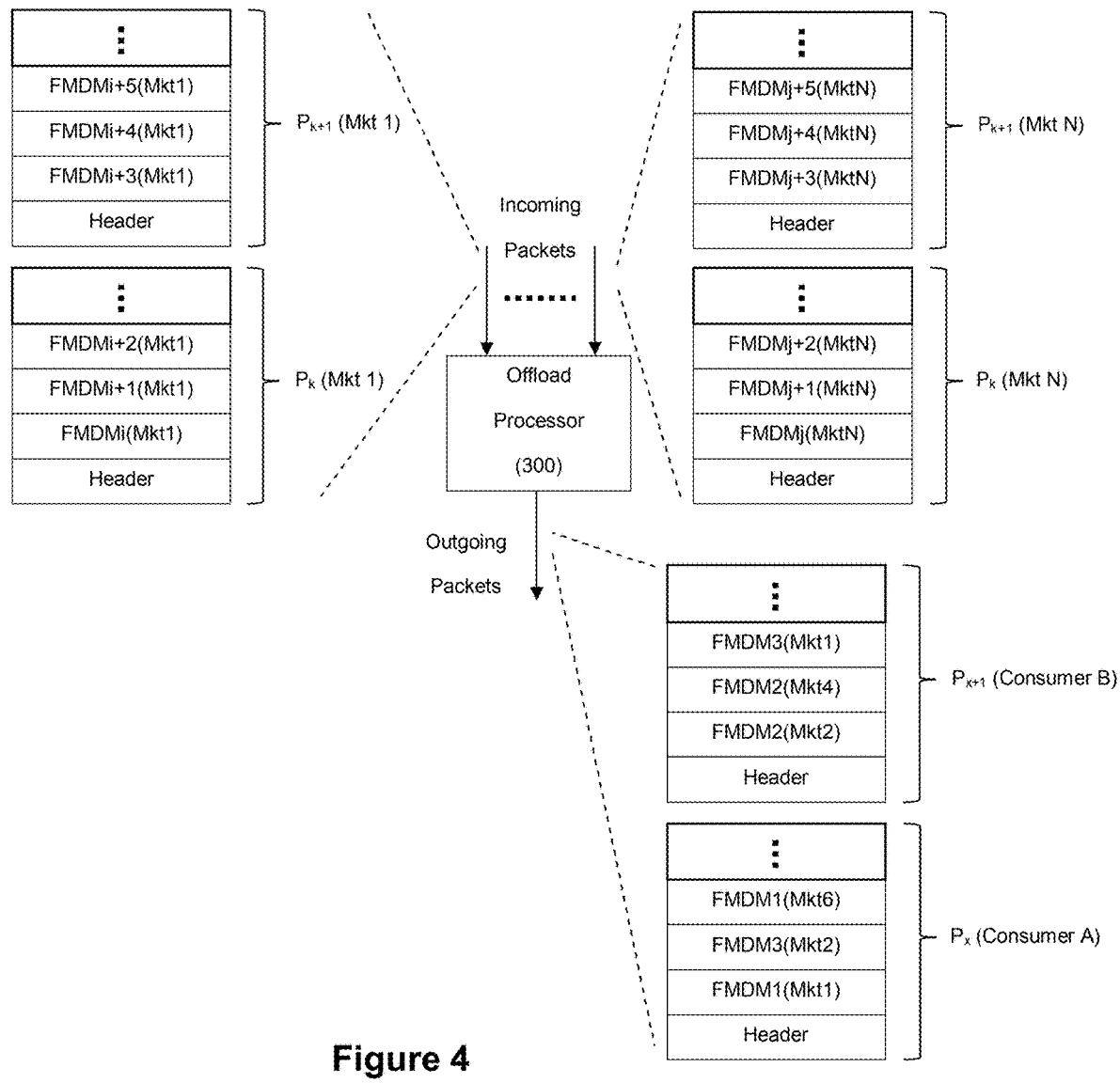

FIG. 4 depicts another exemplary embodiment of an offload processor 300 that provides repackaging functionality. In the example of FIG. 4, the offload processor receives a plurality of streams of incoming data packets, where each stream may be market-specific (e.g., an input stream of data packets from the NYSE on a first port and an input stream of data packets from NASDAQ on a second port). The offload processor 300 of FIG. 4 can then repackage the financial market data in these incoming data packets into outgoing data packets as previously discussed.

Figure 5:
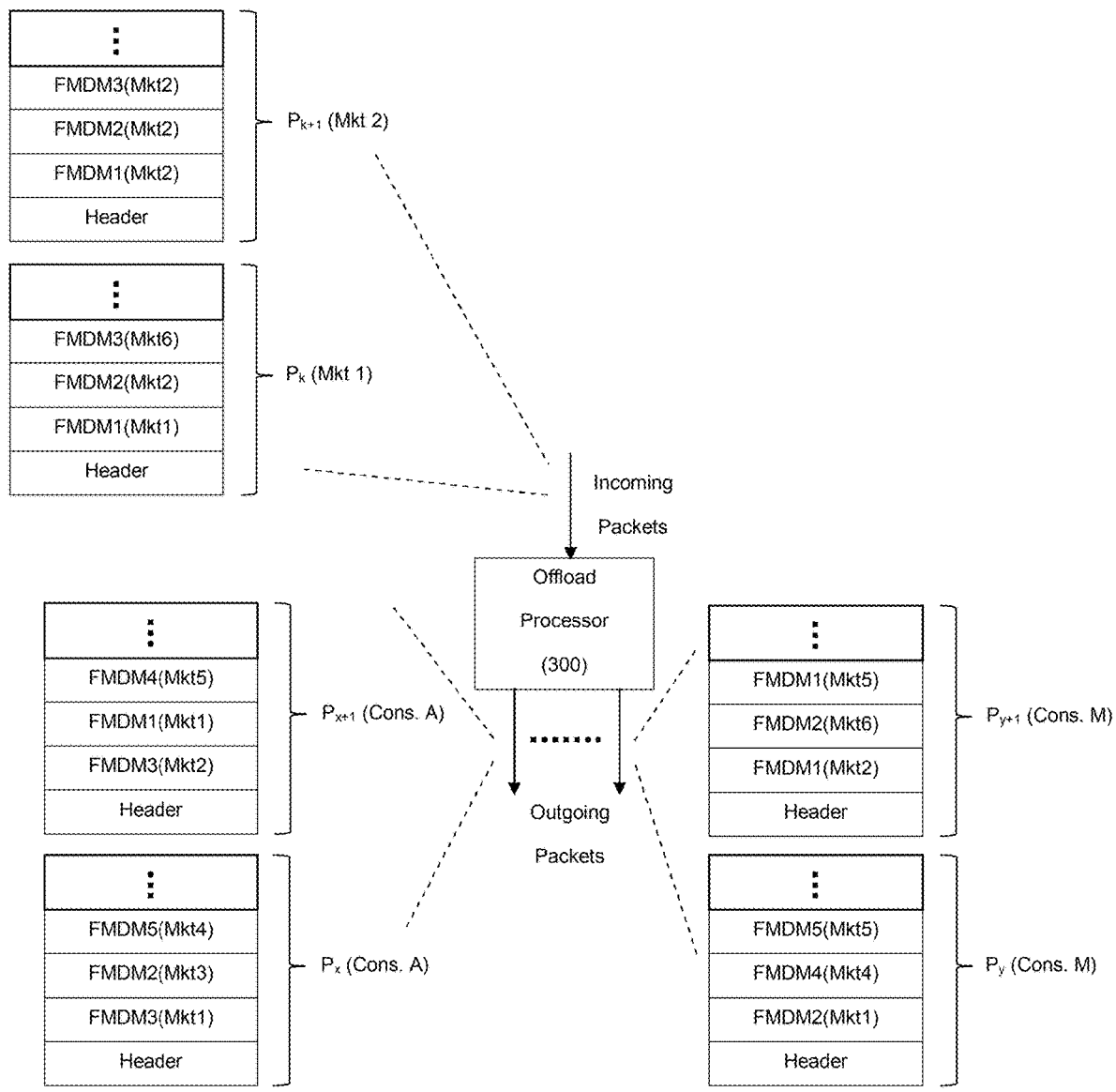

FIG. 5 depicts another exemplary embodiment of an offload processor 300 that provides repackaging functionality. In the example of FIG. 5, the offload processor produces multiple output streams of outgoing data packets, where each output stream may be criterion-specific (e.g., an output stream of data packets destined for Consumer A from a first port and an output stream of data packets destined for Consumer B from a second port, and so on). The stream of incoming data packets can be a consolidated stream as described in connection with FIG. 3.

Figure 6:
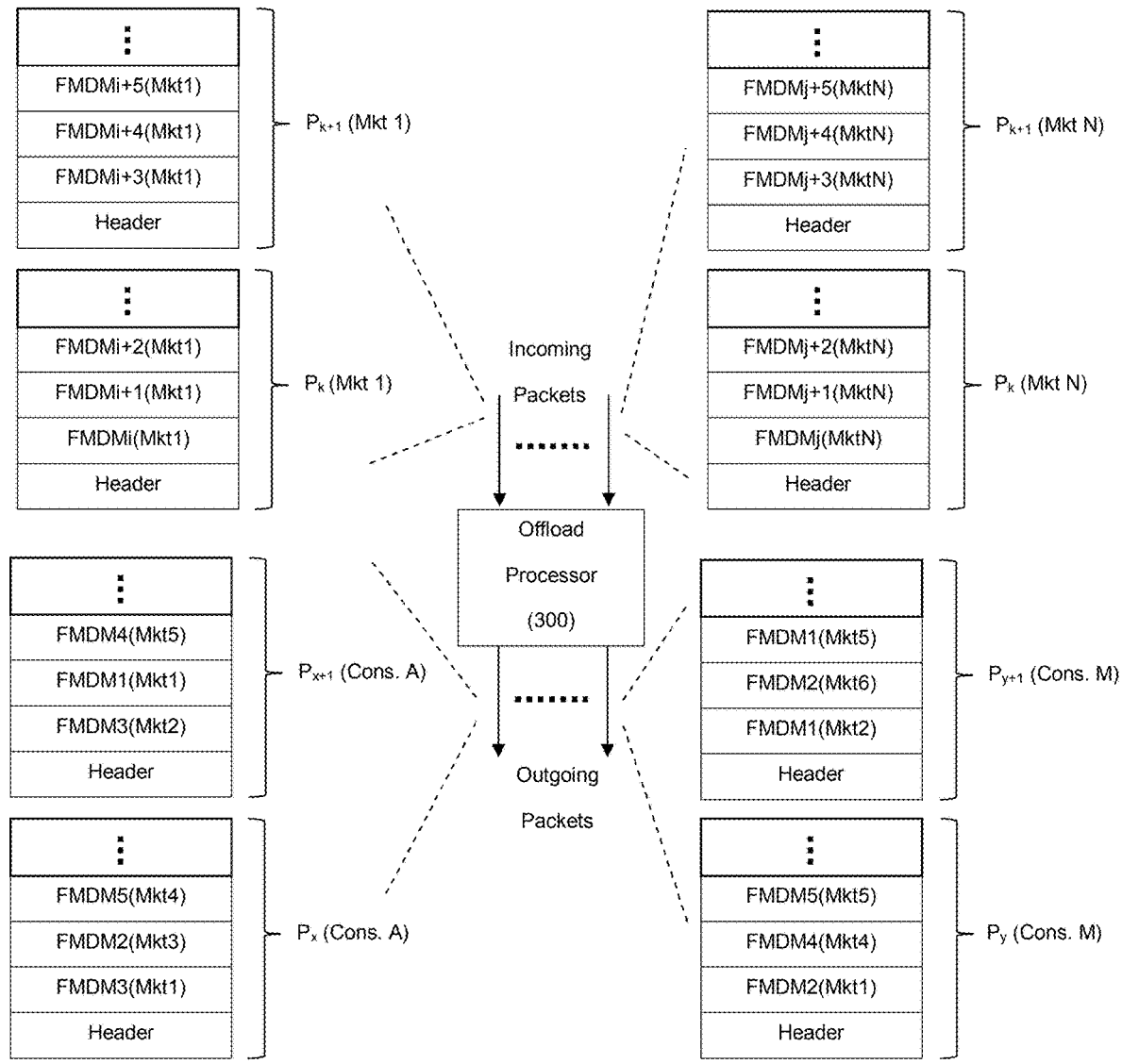

FIG. 6 depicts another exemplary embodiment of an offload processor 300 that provides repackaging functionality. In the example of FIG. 6, the offload processor produces multiple output streams of outgoing data packets from multiple input streams of incoming data packets, where the input streams can be like those shown in FIG. 4 while the output streams can be like those shown in FIG. 5.

The offload processor 300 can take any of a number of forms, including one or more general purpose processors (GPPs), reconfigurable logic devices (such as field programmable gate arrays (FPGAs), application-specific integrated circuits (ASICs), graphics processing units (GPUs), and chip multiprocessors (CMPs), as well as combinations thereof.

As used herein, the term "general-purpose processor" (or GPP) refers to a hardware device having a fixed form and whose functionality is variable, wherein this variable functionality is defined by fetching instructions and executing those instructions, of which a conventional central processing unit (CPU) is a common example. Exemplary embodiments of GPPs include an Intel Xeon processor and an AMD Opteron processor. As used herein, the term "reconfigurable logic" refers to any logic technology whose form and function can be significantly altered (i.e., reconfigured) in the field post-manufacture. This is to be contrasted with a GPP, whose function can change post-manufacture, but whose form is fixed at manufacture. Furthermore, as used herein, the term "software" refers to data processing functionality that is deployed on a GPP or other processing devices, wherein software cannot be used to change or define the form of the device on which it is loaded, while the term "firmware", as used herein, refers to data processing functionality that is deployed on reconfigurable logic or other processing devices, wherein firmware may be used to change or define the form of the device on which it is loaded.

Thus, in embodiments where the offload processor 300 comprises a reconfigurable logic device such as an FPGA, hardware logic will be present on the device that permits fine-grained parallelism with respect to the different operations that the offload processor performs, thereby providing the offload processor with the ability to operate at hardware processing speeds that are orders of magnitude faster than would be possible through software execution on a GPP. Moreover, by leveraging such fine-grained parallelism, processing tasks can be intelligently engineered into processing pipelines deployed as firmware in the hardware logic on the FPGA. With such a pipeline, downstream pipeline modules can perform a processing task on data that was previously processed by upstream pipelined modules while the upstream pipeline modules are simultaneously performing other processing tasks on new data, thereby providing tremendous throughput gains. Furthermore, other types of offload processors that provide parallelized processing capabilities can also contribute to improved latency and throughput.

Figure 7:
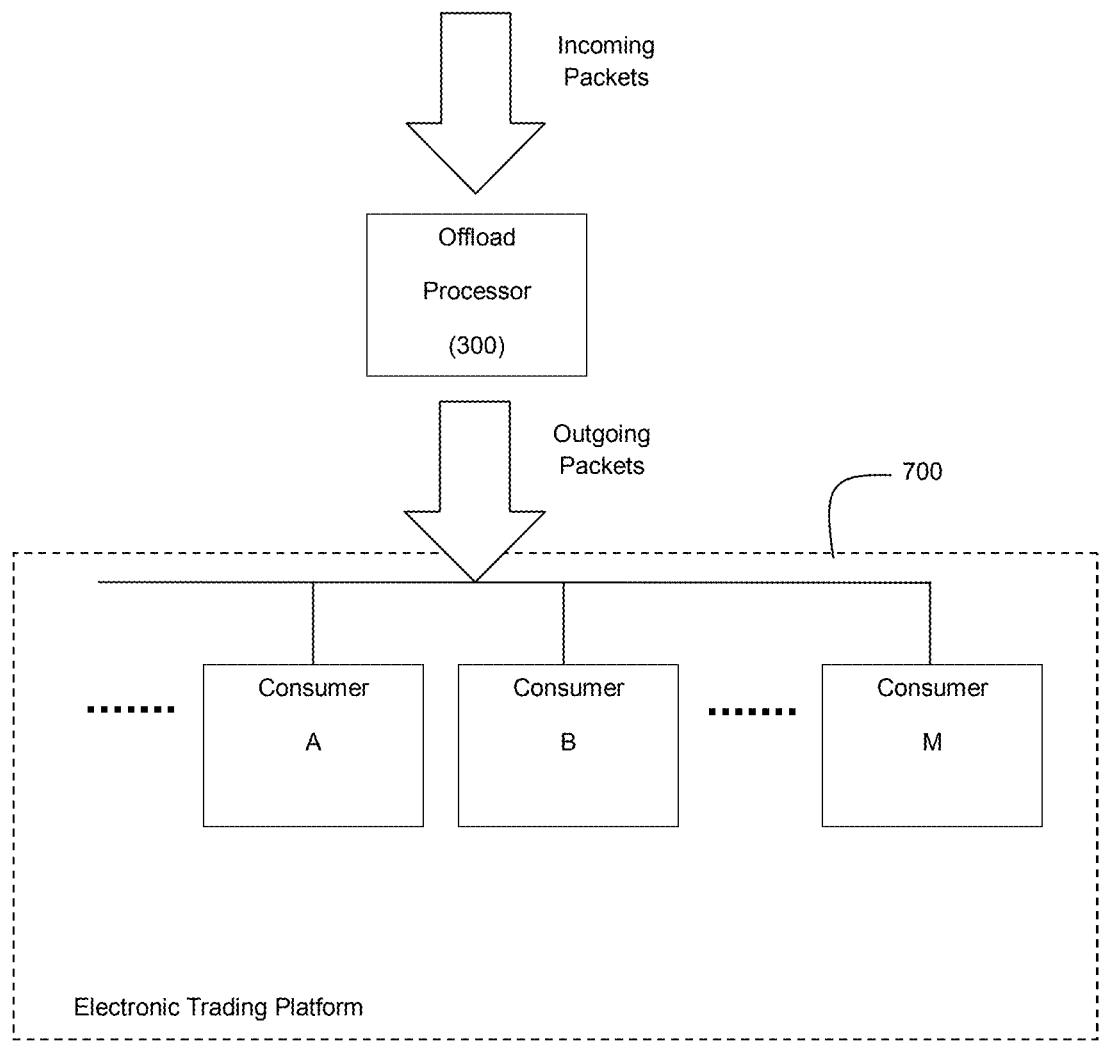
FIG. 7 illustrates an exemplary system where an offload processor is deployed upstream from one or more electronic trading platform(s).

FIG. 7 depicts an exemplary system where the offload processor 300 is deployed upstream from one or more electronic trading platform(s) (ETP(s)) 700. Each ETP 700 may include one or more data consumers within it, and the outgoing data packets from the offload processor 300 can be customized to each consumer.

Furthermore, in additional exemplary embodiments, the offload processor can perform other functions in addition to or instead of the repackaging operations illustrated by FIGS.

3-6. For example, the offload processor can be configured to perform packet mapping as described below in connection with FIG. 19.

As noted, when positioned upstream from an electronic trading platform, the offload processor can be employed in a network element resident in a data distribution network for financial market data. Examples of network elements include repeaters, switches, routers, and firewalls. A repeater embodiment, a single input port and single output port device, may be viewed as a "smart" link where data is processed as it flows through the network link. In a preferred embodiment, such a network element can be a network switch. As such, the inventors disclose various embodiments of a network switch that offloads various processing tasks from electronic trading platforms, including embodiments of an intelligent feed switch and embodiments of an intelligent distribution switch, as described below.

B. Intelligent Feed Switch:

A common practice in financial exchange and electronic trading platform architecture is to achieve greater scale by "striping the data" across multiple instances of the platform components responsible for data transmission, consumption, and processing. If the data is imagined to flow vertically through a depiction of the overall system, then this approach to scale is often termed "horizontal scaling". This approach is accepted in the industry as the most viable approach from an overall platform perspective, as the escalating rate of market data messages (doubling every 6 to 11 months) is outpacing the technology improvements available to individual components in the platform.

In order to facilitate data striping, some feed sources (typically exchanges) divide a market data feed into multiple "lines" where a given line caries a proper subset of the market data published by the financial exchange. Typically, all of the market data updates associated with a given financial instrument is transmitted on a single line. The assignment of a given financial instrument to a line may be static or dynamic. Static assignments typically partition the set of instruments by using the starting characters in an instrument symbol and assigning an alphabet range to a given line. For example, consider a feed partitioned into four lines. Line 0 carries updates for financial instruments whose symbol begins with letters "A" through "F"; line 1 carries updates for symbols beginning with letters "G" through "M"; line 2 carries updates for symbols beginning with letters "N" through "S"; line 3 carries updates for symbols beginning with letters "T" through "Z". Dynamic line assignments are typically performed as follows. A static mapping line transmits information to feed consumers communicating the number of data lines, the address(es) of the data lines, and the mapping of financial instruments to each data line.

Similarly, financial exchanges typically enforce striping across the ports provided for order entry. A financial exchange provides multiple communication ports to which market participants establish connections and enter orders to electronically buy and sell financial instruments. Exchanges define the subset of financial instruments for which orders are accepted on a given port. Typically, exchanges statically define the subset of financial instruments by using the starting character(s) in the instrument symbol. They assign an alphabet range to a given port. For example, consider an exchange that provides four ports to a given participant. Port 0 accepts orders for financial instruments whose symbol begins with letters "A" through "F"; port 1 accepts orders for symbols beginning with letters "G" through "M"; port 2 accepts orders for symbols beginning with letters "N" through "S"; port 3 accepts orders for symbols beginning with letters "T" through "Z".

The striping of data by exchanges, across multiple market data feed lines as well as multiple order entry ports, dictates a horizontally scaled architecture for electronic trading platforms. Trading applications are typically responsible for trading a subset of the financial instruments. Each application consumes the market data updates associated with its subset of financial instruments and generate orders for those instruments. Implementing a horizontally scaled system is straightforward for a platform that receives data from and transmits orders to a single market. The design task is significantly complicated when the trading platform receives data from multiple exchanges, computes pan-market views of financial instruments, and transmits orders to multiple exchanges.

Each market data feed source implements its own striping strategy. Note that some market data feeds are not striped at all and employ a single line. The subsets of financial instruments associated with the lines on one market data feed may be different from the subsets of financial instruments associated with the lines on another market data feed. Therefore, the updates associated with financial instruments processed by a given component can be sourced from different sets of lines from each market data feed. These factors significantly complicate the market data processing and distribution components that are responsible for delivering normalized market data to downstream applications, especially when composite, pan-market views of financial instruments are required.

Disclosed herein are multiple variants of an Intelligent Feed Switch (IFS) that offloads numerous market data consumption, normalization, aggregation, enrichment, and distribution functions from downstream components such as feed handlers, virtual order books, or more generally, ticker plants. The specific functions performed by variants of the IFS are described in the sections below. As previously mentioned, utilizing an IFS in the market data feed network provides performance, efficiency, functionality, and scalability benefits to electronic trading platforms.

1. IFS Architecture:

The IFS can be implemented on a wide variety of platforms that provide the necessary processing and memory resources, switching resources, and multiple physical network ports. Just as network switches can be built at various scales, two ports up to thousands of ports, the IFS can be scaled to meet the needs of electronic trading platforms of varying scale. In the embodiment shown in FIG. 21, the IFS provides multiple ports of 10 Gigabit Ethernet connectivity, in addition to a 10/100/1000 Ethernet port for management and control. An FPGA that is resident within the switch can provide fine-grained parallel processing resources for offload engines as previously noted. The memory cache provides dedicated high-speed memory resources for the offload engines resident on the FPGA. The memory cache may be implemented in Synchronous Dynamic Random Access Memory (SDRAM), Synchronous Random Access Memory (SRAM), a combination of the two, or other known memory technologies. A dedicated Ethernet switch ASIC increases the port count of the IFS using existing, commodity switching devices and allows traffic to bypass the offload engines in the FPGA. The FPGA is directly connected to the switching device by consuming one or more ports on the switching device. The amount of communication bandwidth between the FPGA and switching device can be scaled by increasing the number of ports dedicated to the interface.

The FPGA may also provide one or more ports for external connectivity, adding to the total number of ports available on the IFS. In addition to providing standard protocol connectivity, e.g. Ethernet, the ports that are directly connected to the FPGA can be leveraged to implement custom protocols. For example, if multiple Intelligent Feed Switches are interconnected, the FPGAs inside the switches may implement a custom protocol that eliminates unnecessary overhead. Similarly, if a custom Network Interface Card (NIC) containing an FPGA directly connected to the physical network port(s) is used in a server connected to the IFS, a custom protocol can be employed between the IFS and the server. The control processor provides general purpose processing resources to control software. A standard operating system (OS) such as Linux is installed on the control processor. Configuration, control, and monitoring software interfaces with the FPGA device via a standard system bus, preferably PCI Express. The control processor also features a system bus interface to the switch device.

Figure 22:
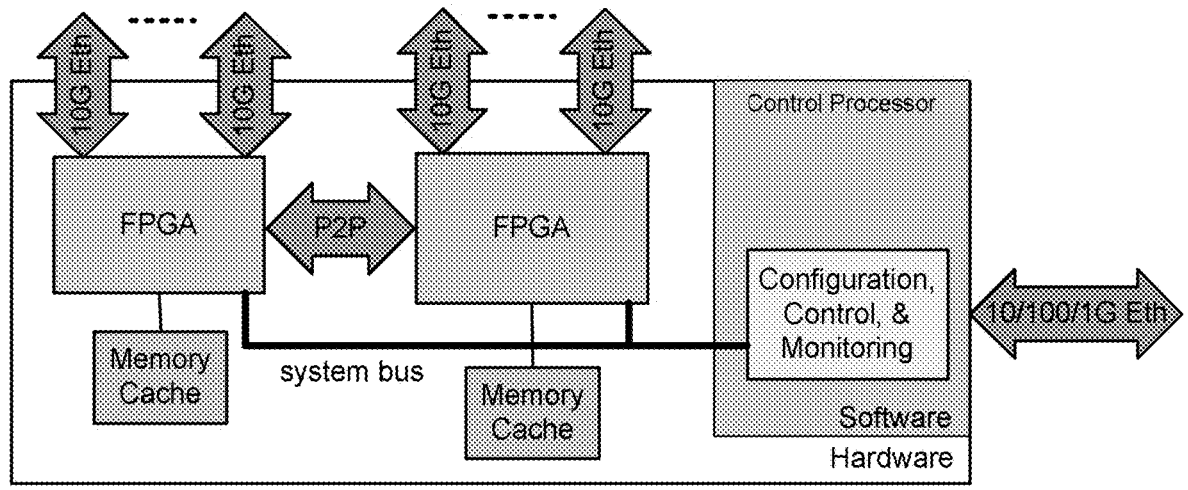
FIG. 22 illustrates an exemplary intelligent feed switch wherein the switch device is replaced by another FPGA device with a dedicated memory cache.

FIG. 22 shows another embodiment of the IFS wherein the switch device is replaced by another FPGA device with a dedicated memory cache. Note that the peer-to-peer (P2P) interface between the FPGA devices need not utilize a standard network protocol, such as Ethernet, but may use a low-overhead protocol for communicating over high speed device interconnects. This architecture increases the amount of processing resources available for offload functions and allows custom network protocols to be supported on any port. Also note that additional FPGAs can be interconnected to scale the number of external ports provided by the IFS.

Figure 23:
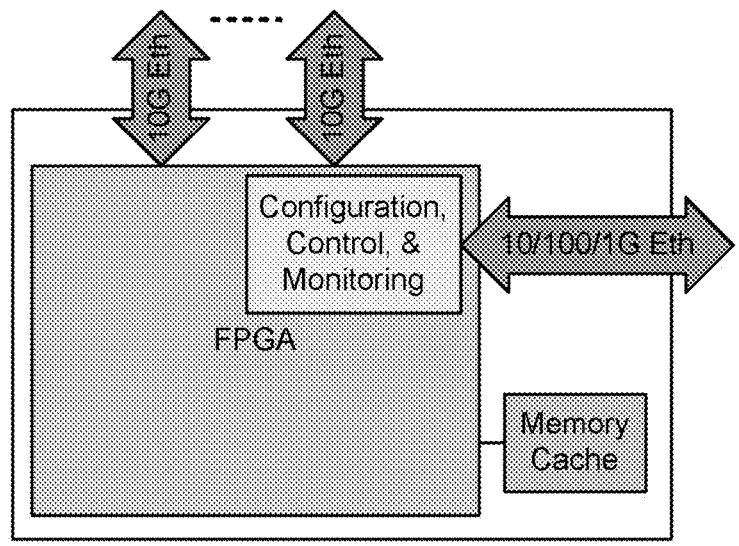
FIG. 23 illustrates an exemplary intelligent feed switch wherein a single FPGA device is utilized.

FIG. 23 shows another embodiment of the IFS wherein a single FPGA device is utilized. This architecture can minimize cost and complexity. The number of physical ports supported is subject to the capabilities of the selected FPGA device. Note that some devices include embedded general purpose processors capable of hosting configuration, control, and monitoring applications.

Note that other processing resources such as chip multiprocessors (CMPs), graphics processing units (GPUs), and network processing units (NPUs) may be used in lieu of an FPGA. An example of a network switch platform that may suitable for use as an intelligent switch to process financial market data is the Arista Application Switch 7124FX from Arista Networks, Inc. of Santa Clara, CA.

Figure 8:
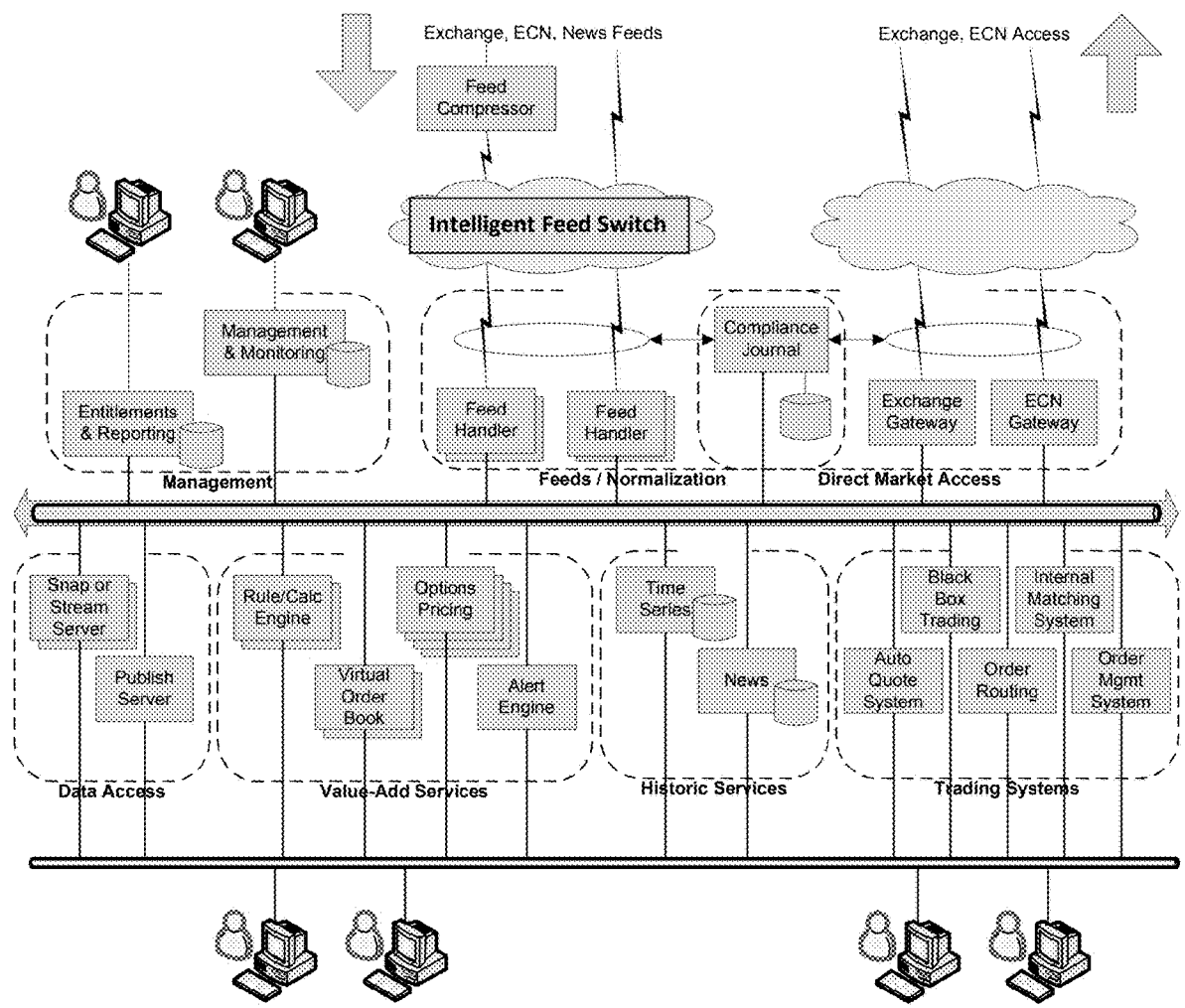
FIG. 8 illustrates an exemplary system where an intelligent feed switch is positioned within the market data feed network of an electronic trading platform.

2. Platform Architecture with IFS:

As shown in FIG. 8, the IFS can be positioned within the market data feed network of the electronic trading platform. In some market data networks, a single IFS may be capable of providing the required number of switch ports, processing capacity, and data throughput. The number of switch ports required depends on the number of physical network links carrying input market data feeds and the number of physical network links connecting to downstream platform components. The amount of processing capacity required depends on the tasks performed by the IFS and the requirements imposed by the input market data feeds. The data throughput depends on the aggregate data rates of input market data feeds and aggregate data rates of output streams delivered to platform components.

Figure 9:
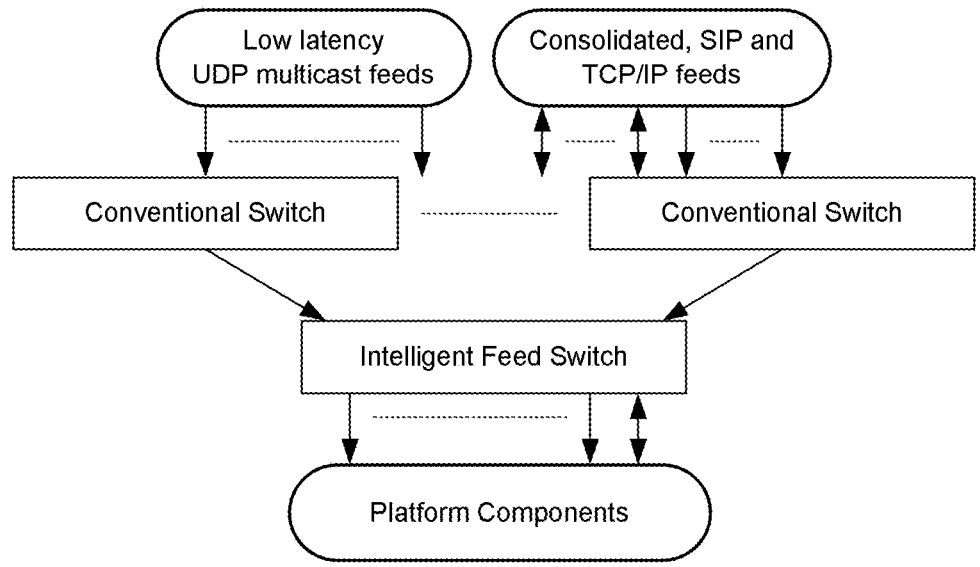
FIG. 9 illustrates an exemplary system where conventional switches are used to aggregate financial market data feeds for delivery to an intelligent feed switch.
Figure 10:
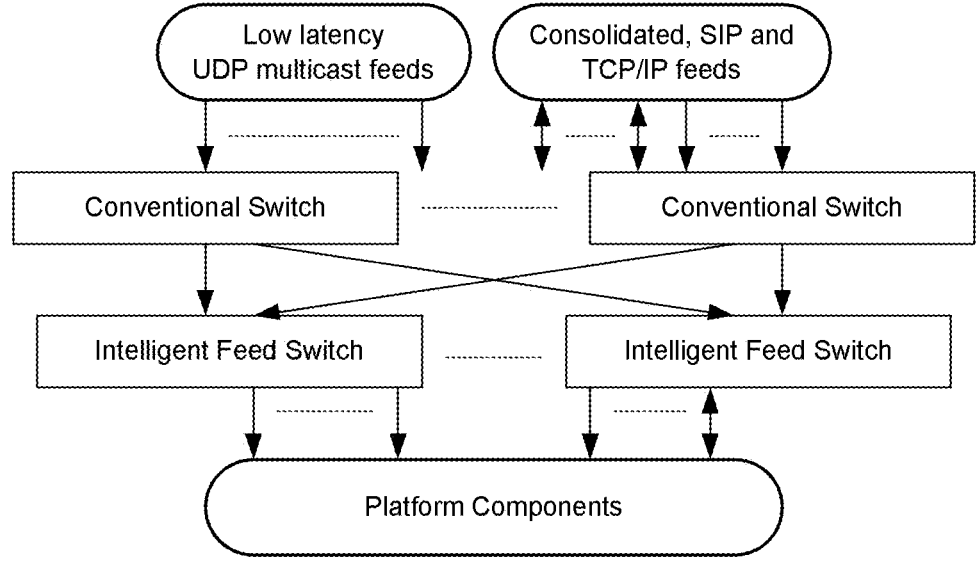
FIG. 10 illustrates an exemplary system where conventional switches are used to aggregate financial market data feeds for delivery to multiple intelligent feed switches.

If the aforementioned requirements exceed the capacity of a single IFS, then a multi-element network can be constructed that includes the IFS. As shown in FIG. 9, multiple conventional switch elements can be used to aggregate the data from the physical network links carrying market data feeds. For example, a conventional switch could be used to aggregate data from forty (40) 1 Gigabit Ethernet links into four (4) 10 Gigabit Ethernet links for transfer to the IFS. This reduces the number of upstream ports required by the IFS. As shown in FIG. 10, multiple Intelligent Feed Switches can be used if the requirements exceed the capacity of a single IFS. In this example, multiple IFS elements consume aggregated data from upstream conventional switches, then distribute data to downstream platform elements. The network architectures in FIGS. 9 and 10 are exemplary but not exhaustive. The IFS can be combined with other switch elements to form large networks, as is well-known in the art.

Figure 11:
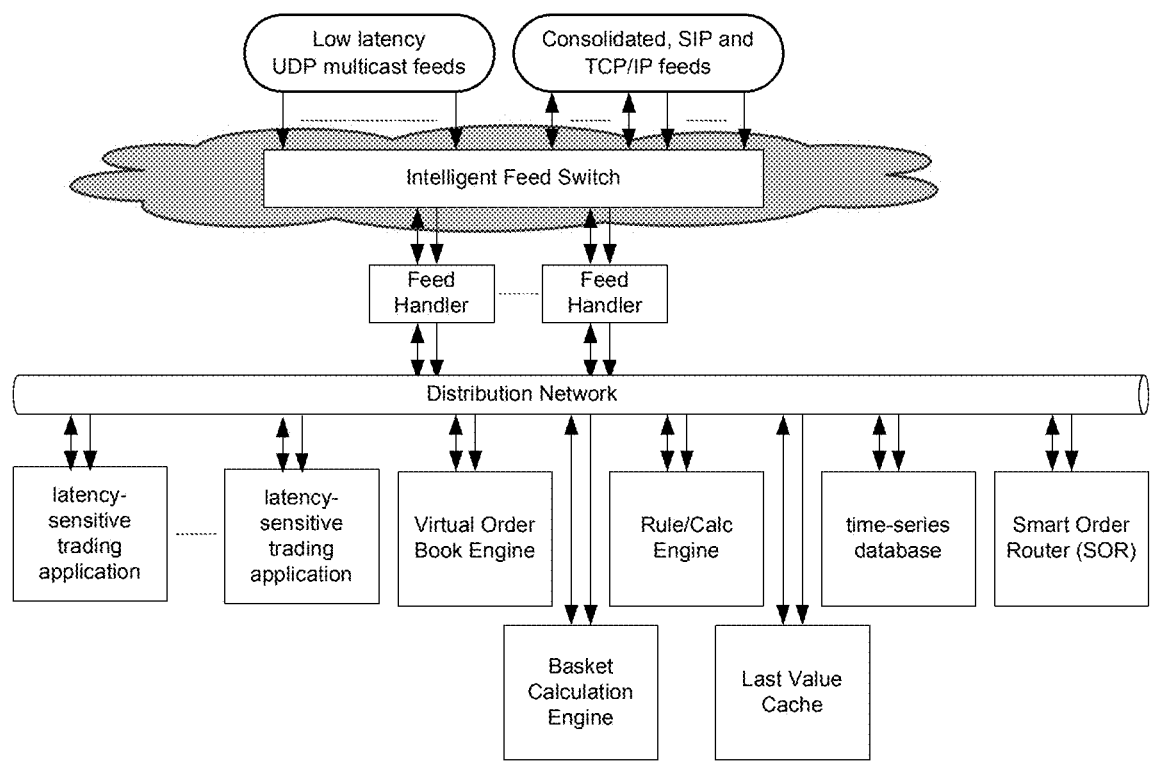
FIG. 11 depicts an exemplary electronic trading platform with an intelligent feed switch deployed in the market data network.
Figure 12:
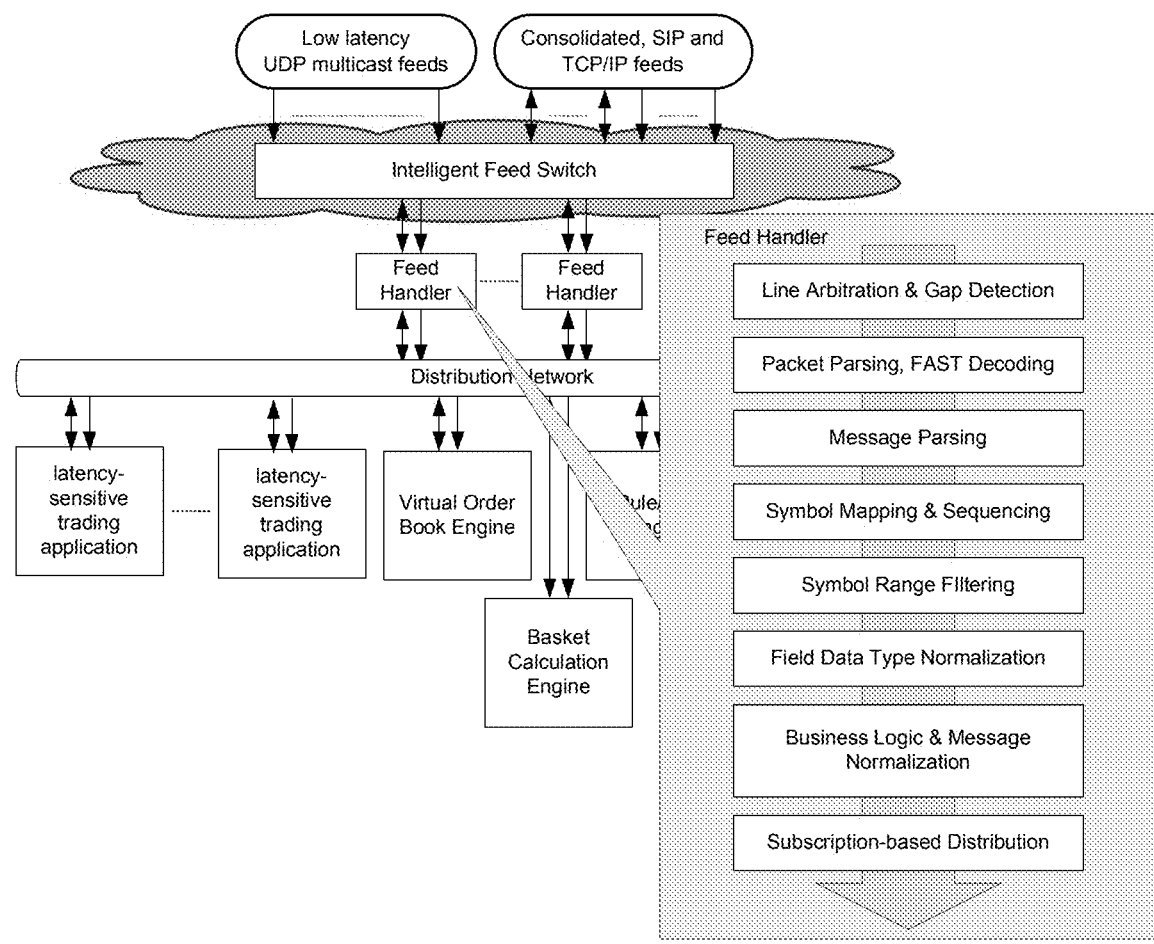
FIG. 12 illustrates the system of FIG. 11 including a logical diagram of functions performed by a typical feed handler in an electronic trading platform.

FIG. 11 presents a simplified diagram of a conventional electronic trading platform with an IFS deployed in the market data network. In this arrangement, the IFS offloads one or more functions from the downstream feed handler components. FIG. 12 provides a logical diagram of the functions performed by a typical feed handler in a conventional electronic trading platform. A description of the specific functions and how they can be offloaded to the IFS are described in detail in the sections below. FIG. 13 provides a logical diagram of a conventional electronic trading platform with numerous feed handler function performed by the IFS. Note that the only remaining functions performed by the feed handler components are message parsing, business logic and message normalization, and subscription-based distribution. Note that we later describe an embodiment capable of further offloading the feed handler components from subscription-based distribution. With a substantially reduced workload, feed handler components can be re-engineered to be more simple, efficient, and performant. As a result the number of discrete feed handler components required by the electronic trading platform can be substantially reduced. The latency associated with market data normalization and distribution can be substantially reduced, resulting in advantages for latency-sensitive trading applications. Furthermore, the amount of space and power required to host the electronic trading platform can be substantially reduced, resulting in simplified system monitoring and maintenance as well as reduced cost.

Figure 13:
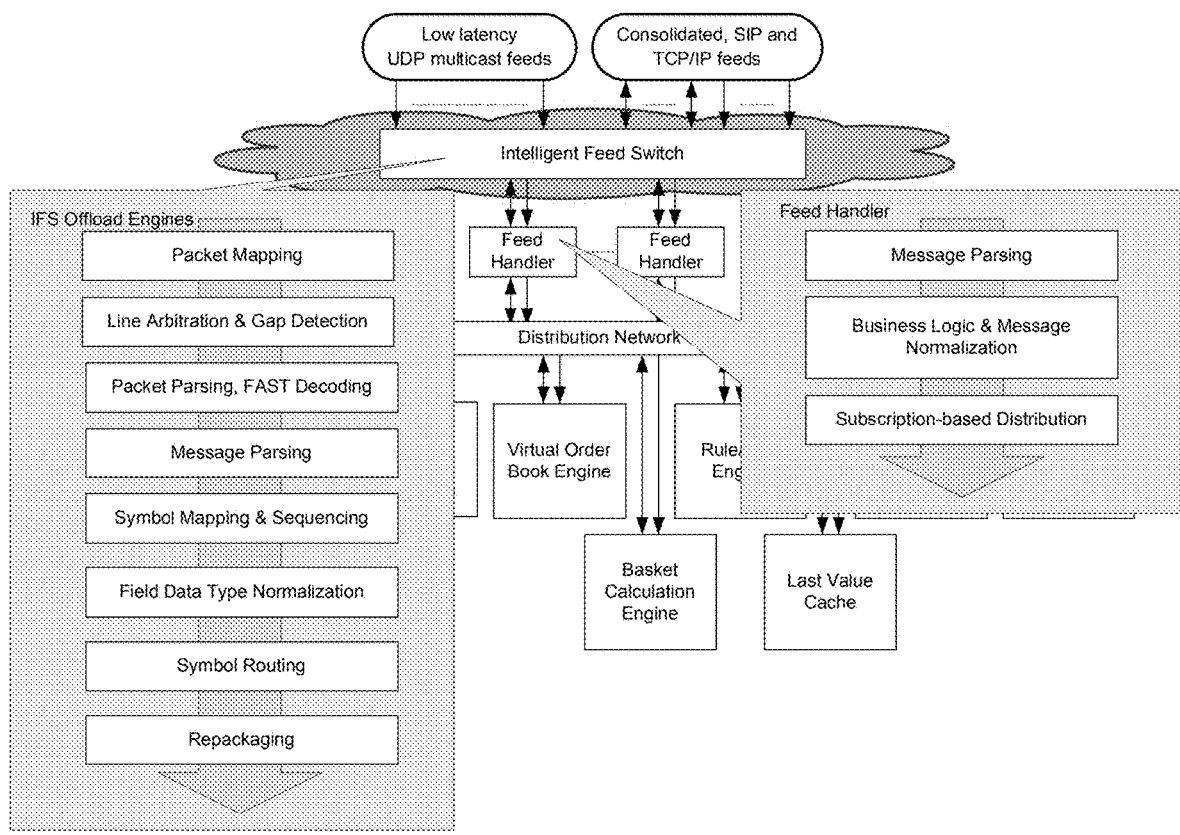
FIG. 13 illustrates the system of FIG. 11 but where several functions are offloaded from the feed handler to the intelligent feed switch.
Figure 14:
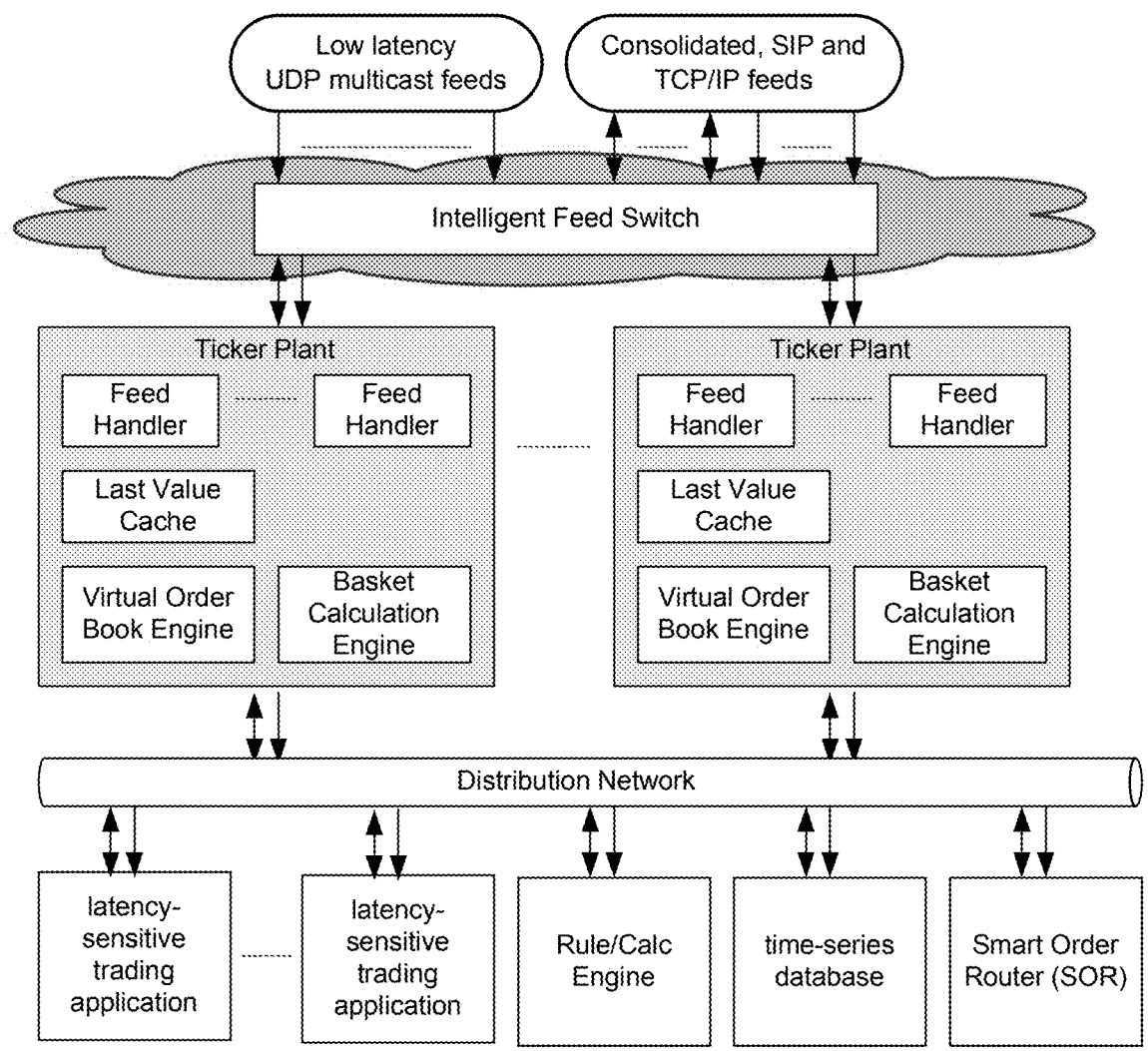
FIG. 14 illustrates an exemplary electronic trading platform that includes one or more ticker plant components.

FIG. 14 presents a simplified diagram of an electronic trading platform that includes one or more ticker plant components that integrate multiple components in the conventional electronic trading platform. An example of an integrated ticker plant component that leverages hardware acceleration and offload engines is described in the above-referenced and incorporated patents and patent applications (see, for example, U.S. Pat. No. 7,921,046, U.S. Pat. App. Pub. 2009/0182683, and WO Pub. WO 2010/077829). Even integrated ticker plant components such as these can benefit from offloading functions to an IFS. As shown in FIG. 15, the IFS can offload the feed handling tasks reflected in FIG. 13, as well as additional functions such as price aggregation, event caching, top-of-book quote generation, and data quality monitoring. A description of these functions and how they can be offloaded to an IFS is provided in subsequent sections. Offloading these functions can boost the capacity of an integrated ticker plant component, reducing the need to horizontally scale. An IFS can also simplify the task of horizontally scaling with multiple integrated ticker plant components. For example, consider a platform architecture where three ticker plant components are used and horizontal scaling is achieved by striping the symbol range across the ticker plant components. The first ticker plant is responsible for processing updates for instrument symbols beginning with characters "A" through "H". The IFS is capable of ensuring that the first ticker plant only receives updates for the assigned set of instruments by performing the symbol routing and repackaging functions depicted in FIG. 15. Note that other functions predicate the symbol routing function as described subsequently. Striping the data in this way allows each ticker plant component to retain the ability to compute composite, or pan-market, views of financial instruments. Examples of hardware-accelerated processing modules for computing composite quote and order book views are described in the above-referenced and incorporated U.S. Pat. No. 7,921,046 and WO Pub. WO 2010/077829.

Figure 16:
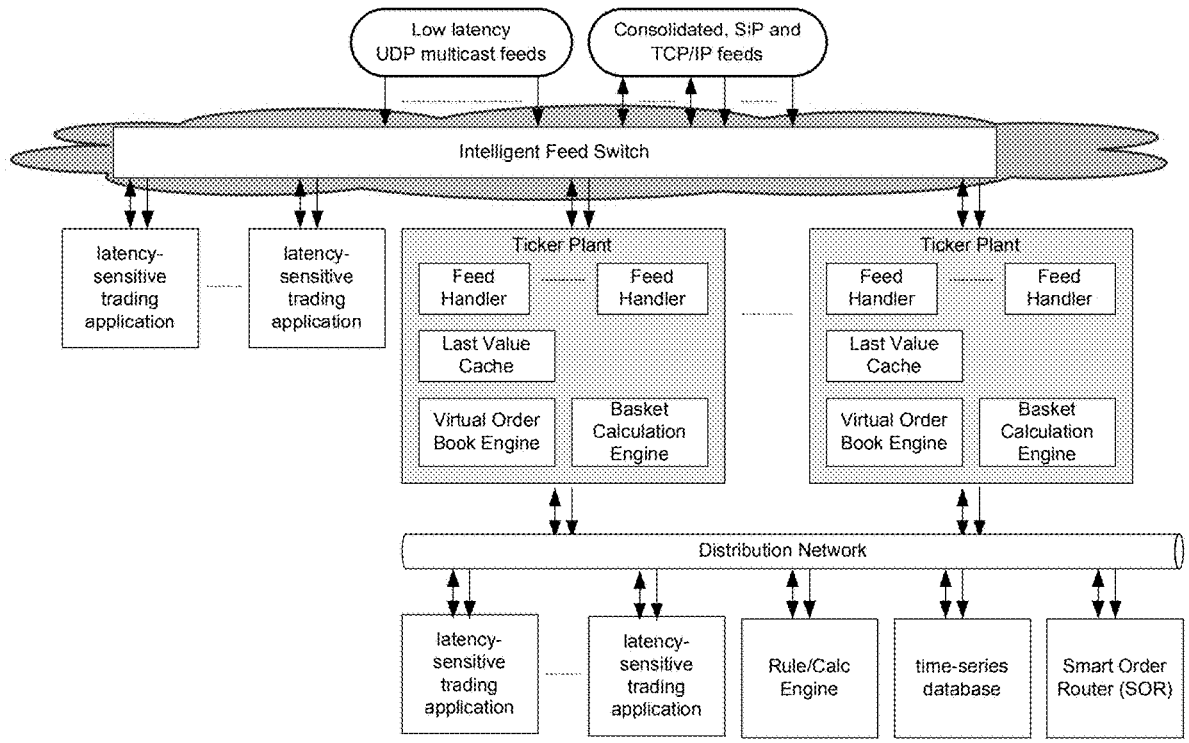
FIG. 16 illustrates an exemplary system where latency-sensitive trading applications consume data directly from an intelligent feed switch.

Some latency-sensitive trading applications require minimal data normalization in order to drive their trading strategies. Some of these applications may be able to directly consume data from an IFS, as shown in FIG. 16. This eliminates additional network hops and processing from the datapath, thus reducing the latency of the data delivered to the applications. This latency reduction can provide advantages to these latency-sensitive trading applications.

As shown in FIG. 8, the IFS is positioned within the market data feed network, and represents the physical embodiment of that network.

Figure 15:
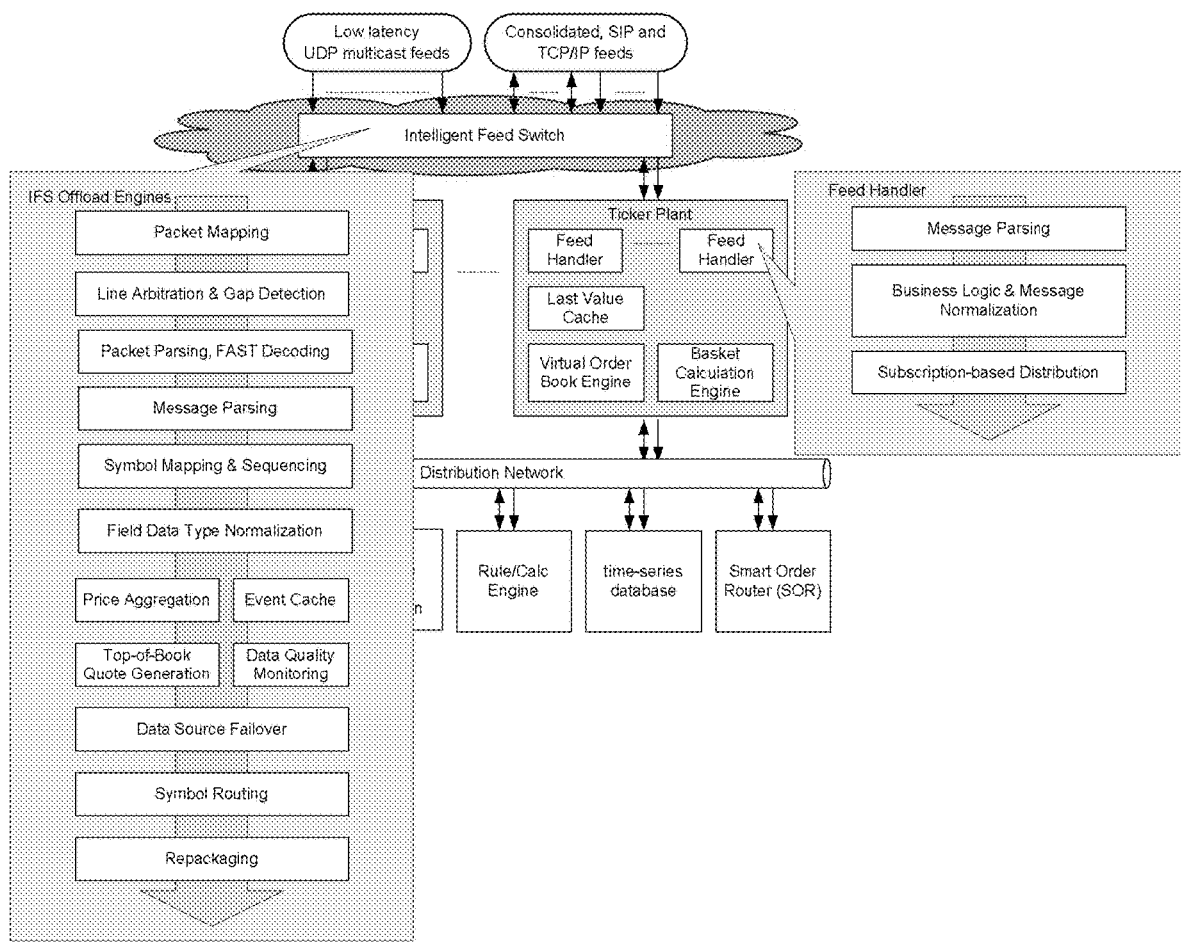
FIG. 15 illustrates the system of FIG. 14 but where several functions are offloaded from a ticker plant to the intelligent feed switch.

3. Packet Mapping:

As shown in FIGS. 13 and 15, the IFS may be configured to offload one or more functions from downstream feed consumers. The same set of functions may not be performed for every feed flowing through the IFS. Furthermore, the way in which each function is performed may vary by feed, as feed sources employ different message formats, field identifiers, datatypes, compression schemes, packet formats, transmission protocols, etc. In order to correctly perform the prescribed functions on a given packet, the IFS must first identify the feed to which a given packet belongs, then retrieve the necessary information about how packets belonging to the given feed are to be handled. In order to do so, the IFS preferably maintains a mapping table using a tuple such as the IP<source address, destination address, protocol> tuple to identify the feed to which a packet belongs (additional optional members of the tuple may include a source port number, a destination port number, and a transport protocol port number). Preferably, the embedded processor in the IFS utilizes a hash table, where the <source address, destination address, protocol> tuple is used as input to the hash function. Preferably, a control processor in the IFS configures the hash function and maintains the hash table. At minimum in this example, the entry in the table contains a feed identifier. The additional information about how packets belonging to the feed should be handled may be stored directly in the hash table, or in a separate table indexed by the feed identifier. The additional information may include one or more of the following pieces of meta-data:

Market identification code (MIC); a unique identifier for the exchange/market. Preferably, this code would be a binary enumeration of the ISO 10383 market identification codes (MIC) for the markets supported by the IFS. For example, XNYS is the MIC for the New York Stock Exchange which may be assigned an enumerated value in order to consume minimal space in the meta-data table and pre-normalized messages.

Data source identification code (DSIC); a unique identifier for the specific feed. Note that multiple feeds may carry market updates for the same market. For example, updates for equities traded on the NYSE are reported by multiple feeds: the Consolidated Quote System (CQS), Consolidated Tape System (CTS), NYSE Quotes, NYSE Trades, NYSE OpenBook Ultra, etc. Each feed, or data source, is assigned a unique tag. Similar to the market codes, the data source codes are assigned an enumerated value in order to consume minimal space in the meta-data table and pre-normalized messages.

Line identification code (LIC); a unique identifier for the specific line within the feed. Similar to the MIC and DSIC, each unique line is assigned a unique tag. The line identifiers configured on the IFS are preferably assigned an enumerated value in order to consume minimal space in the meta-data table and pre-normalized messages.

A flag indicating if the feed utilizes FIX/FAST encoding

FAST decoding templates (if necessary), or template specifying how to parse the packet into messages.

FIX decoding templates, or template specifying how to parse messages into fields.

Template specifying field datatype conversions to perform.

Field identifiers and/or offsets for fields comprising the instrument symbol.

Field identifier or offset for message sequence number (if necessary)

Figure 19:
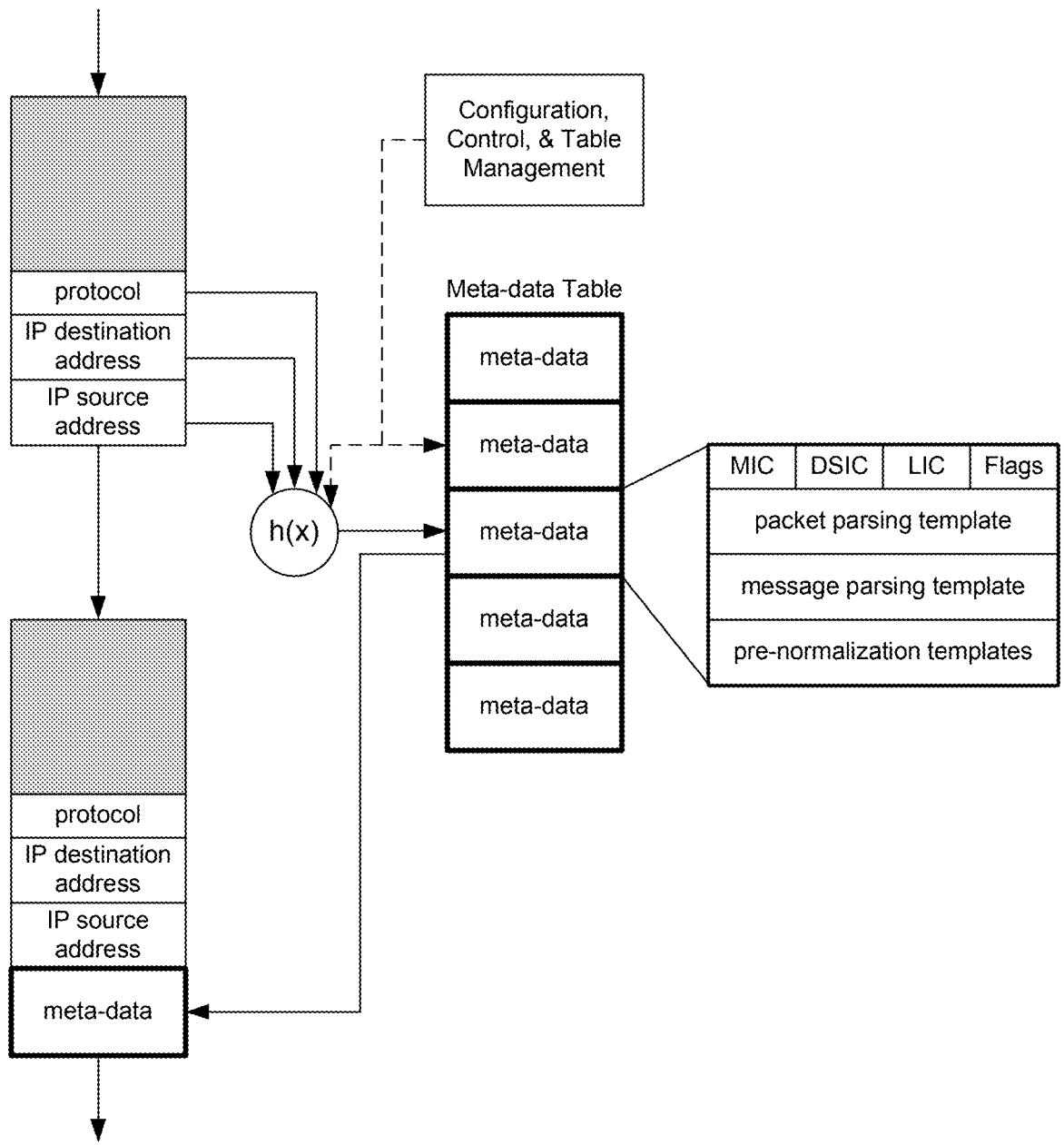
FIG. 19 illustrates an example of a packet mapping offload engine.

This meta-information can be propagated to downstream offload engines in the IFS, along with the packet, as shown in FIG. 19. The configuration, control, and table management logic configures the hash function and table entries. This logic is preferable hosted on a co-resident control processor, preferably as a pipelined processing engine.

4. Redundant Feed Arbitration:

In order to allow a market data feed to be routed across multiple networks, the Internet Protocol (IP) is ubiquitously used as the network protocol for market data feed distribution. Feed sources typically employ one of two transport protocols: Transmission Control Protocol (TCP) or Unreliable Datagram Protocol (UDP). TCP provides a reliable point-to-point connection between the feed source and the feed consumer. Feed consumers initiate a connection with the feed source, and the feed source must transmit a copy of all market data updates to each feed consumer. Usage of TCP places a large data replication load on the feed source, therefore it is typically used for lower bandwidth feeds and/or feeds with a restricted set of consumers. UDP does not provide reliable transmission, but does include multicast capability. Multicast allows the sender to transmit a single copy of a datagram to multiple consumers. Multicast leverages network elements to perform the necessary datagram replication. An additional protocol allows multicast consumers to "join" a multicast "group" by specifying the multicast address assigned to the "group". The sender sends a single datagram to the group address and intermediary network elements replicate the datagram as necessary in order to pass a copy of the datagram to the output ports associated with consumers that have joined the multicast group.

While providing for efficient data distribution, UDP multicast is not reliable. Datagrams can be lost in transit for a number of reasons: congestion within a network element causes the datagram to be dropped, a fault in a network link corrupts one or more datagrams transiting the link, etc. While there have been numerous reliable multicast protocols proposed from academia and industry, none have found widespread adoption. Most market data feed sources that utilize UDP multicast transmit redundant copies of the feed, an "A side" and a "B side". Note that more than two copies are possible. For each "line" of the feed, there is a dedicated multicast group, an "A" multicast group and a "B" multicast group. Typically, the feed source ensures that each copy of the feed is transmitted by independent systems, and feed consumers ensure that each copy of the feed transits an independent network path. Feed consumers then perform arbitration to recover from data loss on one of the redundant copies of the feed.

Note that a packet may contain one or more market data update messages for one or more financial instruments. Typically, feed sources assign a monotonically increasing sequence number to each packet transmitted on a given "line". This simplifies the task of detecting data loss on a given line. If the most recently received packet contains a sequence number of 5893, then the sequence number of the next packet should be 5894. When using redundant UDP multicast groups, feed sources typically transmit identical packets on the redundant multicast groups associated with a line. For example, packet sequence number 3839 on the A and B side of the feed contains the same market data update messages in the same order. This simplifies the arbitration process for feed consumers.

Figure 17:
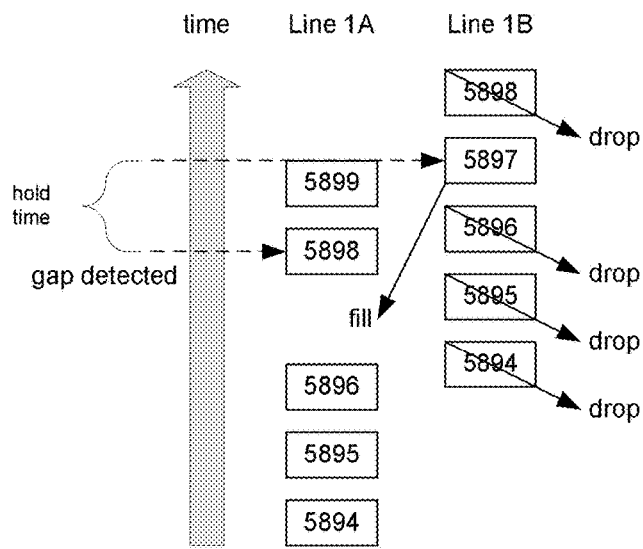
FIG. 17 illustrates an example of redundant feed arbitration.

FIG. 17 provides a simple example of redundant feed arbitration. The sequence of packets for a single pair of redundant lines is shown. Time progresses vertically, with packet 5894 received first from line 1A, packet 5895 received second from line 1A, etc. A line arbiter forwards the packet with the next sequence number, regardless of which "side" the packet arrives on. When the redundant copy of a packet is received on the other side, it is dropped. As depicted in FIG. 17, one of the redundant sides typically delivers a packet consistently prior to the other side. If the arbiter receives a packet with a sequence number greater than the expected sequence number, it detects a gap on one of the redundant lines. The arbiter can be configured to wait a configured hold time to see if the missing packet is delivered by the other side. The difference between the arrival times of copies of the same packet on the redundant lines is referred to as the line skew. In order to be effective, the hold time can be configured to be greater than the average line skew. If the missing packet does arrive on the redundant side prior to the expiration of the hold time, then a gap is registered for the particular feed line.

When line gaps occur there are a number of recovery and mitigation strategies that can be employed. The arbiter typically reports the missing sequence numbers to a separate component that manages gap mitigation and recovery. If the feed provides retransmission capabilities, then the arbiter may buffer packets on both sides until the missing packets are returned by the gap recovery component.

Some feeds sequence updates on a per-message basis or a per-message/per-instrument basis. In these cases, a packet sequence number may not be monotonically increasing or may not be present at all. Typically, arbitration is performed among one or more copies of a UDP multicast feed; however, arbitration can occur among copies of the feed delivered via different transmission protocols (UDP, TCP, etc.). In these scenarios, the content of packets on the redundant copies of the feed may not be identical. The transmitter of packets on the A side may packetize the sequence of market data update messages differently from the transmitter on the B side. This requires the IFS to parse packets prior to performing the arbitration function.

The line identification code (LIC) provided in the metadata associated with the packet allows the IFS to perform the appropriate line arbitration actions for a given packet. If the packet belongs to an unarbitrated TCP flow, then the packet may bypass the line arbitration and gap detection engine. If the line requires dictates arbitration at the message-level as opposed to the packet level, then the IFS first routes the packet to parsing and decoding engines. The line arbitration and gap detection function may be performed by multiple parallel engines. The LIC may also be used to the route the packet to the appropriate engine handling arbitration for the associated feed line. Furthermore, the LIC is used to identify the appropriate arbitration buffer into which the packet should be inserted.

Figure 18:
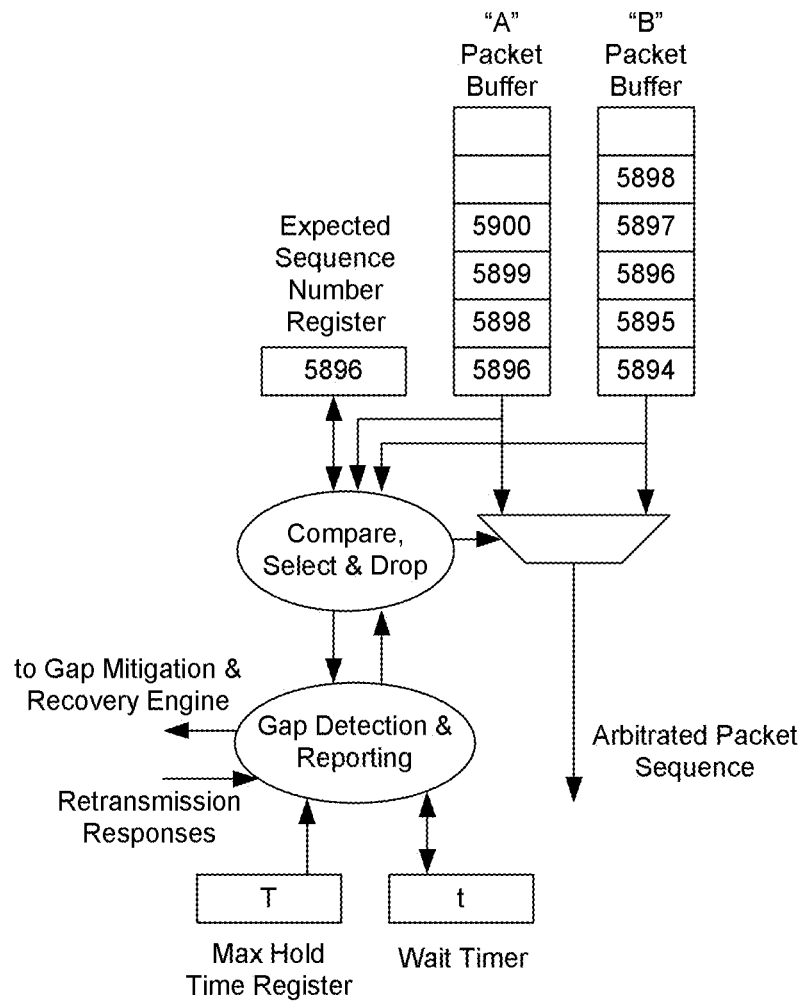
FIG. 18 illustrates an example of a line arbitration offload engine.

FIG. 18 provides an example of a line arbitration offload engine, which is preferably implemented in a pipelined processing engine. For each input line, the arbiter maintains a packet buffer to store the packets received from the redundant sides of the feed line. The example in FIG. 18 demonstrates two-arbitration; additional buffers are provisioned if multi-way arbitration is performed. For feeds transmitted via UDP, it is possible for packets on a given multicast group to be delivered in out-of-sequence, if the packets traverse different paths through the network. The packet buffers in the arbiter may optionally provide for resequencing by inserting each new packet in the proper sequence in the buffer. Typically market data networks are carefully designed to minimize latency and tightly control routing, thus out-of-sequence delivery is typically not a problem. Thus, arbiter functions typically omit resequencing to reduce overhead and complexity.

The compare, select and drop logic in the arbiter performs the core arbitration function as previously described. A register is used to maintain the next expected sequence number. The logic compares the sequence number of the packet residing at the head of each packet buffer. If a matching sequence number is found, the packet is forwarded. If the sequence number is less than the expected sequence number, the packet is dropped. If the sequence number is greater than the expected sequence number, the other buffer or buffers are examined for the required packet. Note that this may require that multiple packets be read until a match is found, the buffer is empty, or a gap is detected. If a gap is detected the gap detection and reporting logic resets then starts the wait timer. If the expected packet sequence number does not arrive before the wait timer exceeds the value in the max hold time register, then a gap is reported to the gap mitigation and recovery engine with the missing packet sequence number range. Note that the gap detection and reporting logic may also report gap information to a control processor or to downstream monitoring applications via generated monitoring messages. If the gap mitigation and recovery engine is configured to request retransmissions, then the arbiter pauses until the gap mitigation and recovery engine passes the missing packet or packets to the arbiter or returns a retransmission timeout signal. The gap mitigation and recovery engine may be hosted on the same device as the arbiter, or it may be hosted on a control processor within the IFS.

5. Feed Pre-Normalization:

In addition to performing line arbitration and gap detection, mitigation, and recovery, the IFS can perform one or more "pre-normalization" functions in order to simplify the task of downstream consumers. Following line arbitration, the IFS preferably decomposes packets into discrete messages. As previously described, feed sources typically pack multiple update messages in a single packet. Note that each feed may employ a different packetization strategy, therefore, the pre-normalization engine in the IFS utilizes the packet parsing templates retrieved by the packet mapping engine. Packet parsing techniques amenable to implementation in hardware and parallel processors are known in the art as described in the above-referenced and incorporated U.S. Pat. No. 7,921,046. If the feed associated with the packet utilizes FAST compression, then the pre-normalization engine must utilize the FAST decoding template in order to decompress and parse the packet into individual messages, as described in the above-referenced and incorporated U.S. Pat. No. 7,921,046.

Once the packet is parsed into discrete messages, specific fields may be extracted from the messages in order to enable additional pre-normalization functions. Template-based parsing in offload engines is also addressed in the above-referenced and incorporated U.S. Pat. No. 7,921,046. Discrete messages and message fields are passed to downstream functions. Note that the message parsing engine may only extract specific fields required for downstream functions, as dictated by the templates included in the meta-data for the packet. For example, the parser may only extract the symbol field in order to enable symbol-based routing and repackaging. For some feeds, the symbol mapping function may require extraction of the order reference number in book update events. This can also be specified by the parsing template.

Note that the message parsing logic can be configured to preserve the original structure of the message. Extracted fields, such as symbols and order reference numbers, can be added to the meta-data that accompanies the packet as it propagates through the IFS. By preserving the message structure, downstream consumer applications need not be changed when an IFS is introduced in the market data network. For example, an existing feed handler for the NASDAQ TotalView feed need not change, as the format of the messages it processes still conforms to the feed specification. If the symbol-routing and repackaging function is applied, the existing feed handler will simply receive packets with messages associated with the symbol range for which it is responsible, but the message formats will conform to the exchange specification. This function is described in more detail below.

The pre-normalization logic can also be configured to offload normalization logic from downstream consumers. For example, the parsing logic can be configured to perform FAST decompression and FIX parsing. Per the parsing templates in the meta-data, the fields in each message can be configured to a prescribed native data type. For example, an ASCII-encoded price field can be converted into a signed 32-bit integer, an ASCII-encoded string can be mapped to a binary index value, etc. The type-converted fields can then be aligned on byte or word boundaries in order to facilitate efficient consumption by consumers. The pre-normalization logic can maintain a table of downstream consumers capable of receiving the pre-normalized version of the feed. For example, the IFS may transmit pre-normalized messages on ports 3 through 8, but transmit the raw messages on ports 9 through 12.

For some feeds, the IFS can be configured to append fields to the raw message, allowing consuming applications to be extended to leverage the additional fields to reap performance gains, without disrupting the function of existing consumers. For example, the IFS may append the MIC, DSIC, LIC, and binary symbol index to the message. Additional appended fields may include, but are not limited to, message-based sequence numbers and high-resolution IFS transmit timestamps.

As previously mentioned, the IFS can be configured to perform a symbol mapping function. The symbol mapping function assigns a binary symbol index to the financial instrument associated with the update event. This index provides a convenient way for downstream functions and consuming applications to perform processing on a per symbol basis. An efficient technique for mapping instrument symbols using parallel processing resources in offload engines is described in the above-referenced and incorporated U.S. Pat. No. 7,921,046. Note that some feeds provide updates on a per-order basis and some update events do not contain the instrument symbol, but only an order reference number. Feed consumers must map the order reference number to the associated symbol. An efficient technique for mapping order reference numbers to the mapped symbol index using parallel processing resources in offload engines is described in the above-referenced and incorporated WO Pub. WO 2010/077829. In order to perform the symbol mapping function, the computational resources in the IFS can include dedicated high-speed memory interfaces.

As part of the pre-normalization function, the IFS may also assign one or more high-precision timestamps. For example, a timestamp may be assigned when the IFS receives a packet, a timestamp may be assigned immediately prior to transmitting a packet, etc. The high-precision timestamp preferably provides nanosecond resolution. In order to provide synchronized timestamps with downstream consumers, the time source used to assign the timestamps should be disciplined with a high-precision time synchronization protocol. Example protocols include the Network Time Protocol (NTP) and the Precision Time Protocol (PTP). The protocol engine can be co-resident with the offload engines in the IFS, but is preferably implemented in a control processor that disciplines a timer in the offload engines. As part of the pre-normalization function, the IFS may also assign additional sequence numbers. For example, the IFS may assign a per-message, per-symbol sequence number. This would provide a monotonically increasing sequence number for each instrument. These additional timestamps and sequence numbers may be appended to raw message formats or included in the pre-normalized message format, as described above.

6. Symbol-Based Routing and Repackaging:

The symbol-based routing allows the IFS to deliver updates for a prescribed set of symbols to downstream components in the electronic trading platform. As shown in FIG. 16, the IFS can act as a subscription based routing and filtering engine for latency-sensitive applications that consume the raw or pre-normalized updates directly from the IFS. Similarly, the IFS can facilitate a horizontal scaling strategy by striping the incoming raw feed data by symbol within the market data feed network itself. This allows the IFS to deliver the updates for the prescribed symbol range to downstream feed handler or ticker plant components, without having to rely on additional processing capabilities in those components to perform this function. This can dramatically reduce data delivery latency and increase the processing capacity of those components.

Figure 20:
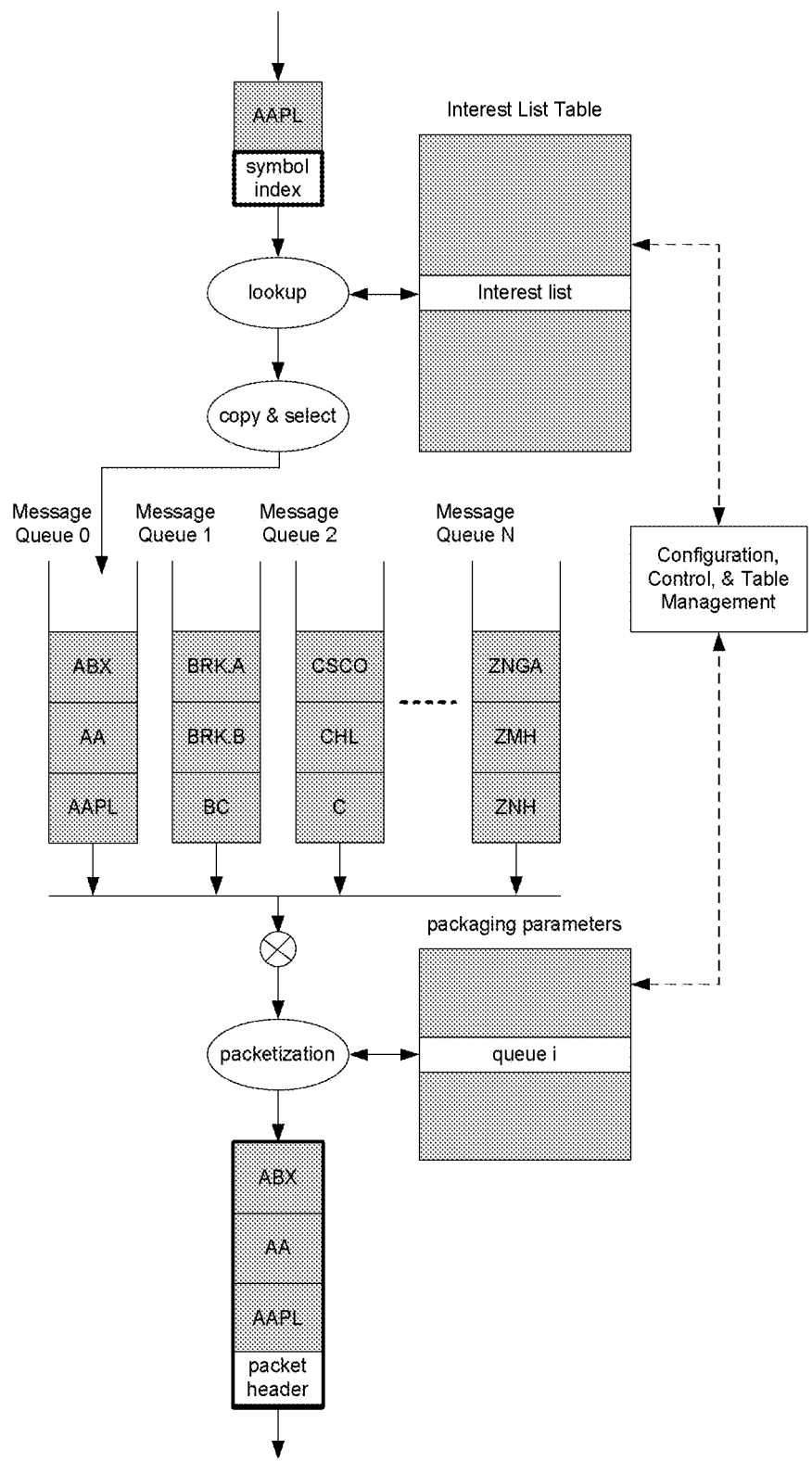
FIG. 20 illustrates an exemplary processing module configured to perform symbol-routing and repackaging.

FIG. 20 depicts an exemplary processing module configured to perform symbol-routing and repackaging. Such a module is preferably implemented as a pipelined processing engine. As shown in FIG. 20, the symbol-routing and repackaging function first utilizes the symbol index to lookup an interest list in the interest list table. Note that additional fields such as the market identification code (MIC) and data source identification code (DSIC) may be used in addition to the symbol index to lookup an interest list. Similar to the interest-based filtering and replication discussed in the above-referenced and incorporated U.S. Pat. No. 7,921,046, the interest list is stored in the form of a bit vector where the position of each bit corresponds to a downstream consumer. For the IFS, a downstream consumer may be a physical output port, a multicast group, a specific host or server, a specific application (such as a feed handler), etc. The scope of a "consumer" depends on the downstream platform architecture. Associated with each consumer is a message queue that contains the messages destined for the consumer. A fair scheduler ensures that each of the message queues receives fair service. Packetization logic reads multiple updates from the selected message queue and packages the updates into a packet for transmission on the prescribed output port, using the prescribed network address and transport port. Messages can be combined into an outgoing Ethernet frame with appropriate MAC-level, and optionally IP-level headers.

Preferably, the packetization logic constructs maximally sized packets: the logic reads as many messages as possible from the queue until the maximum packet size is reached or the message queue is empty. Note that packetization strategy and destination parameters may be specified via packaging parameters stored in a table. The packetization logic simply performs a lookup using the queue number that it is currently servicing in order to retrieve the appropriate parameters. The interest list and packaging parameter tables are preferably managed by configuration, control, and table management logic hosted on a co-resident control processor.

Note that the messages in the newly constructed packets may have been transmitted by their concomitant feed sources in different packets or in the same packet with other messages that are now excluded. This is an example of the IFS constructing a customized "feed" for downstream consumers.

If downstream consumers are equipped with network interface devices that allow for custom protocol implementation, e.g. an FPGA connected directly to the physical network link, then additional optimizations may be implemented by the packetization logic. For example, the Ethernet MAC-level (and above) headers and CRC trailer may be stripped off any packet. By doing so, unnecessary overhead can be removed from packets, reducing packet sizes, reducing data transmission latency, and reducing the amount of processing required to consume the packets. As shown in FIG. 16, this optimization may apply to latency-sensitive trading applications, feed handlers, or ticker plants.

7. Depth Price Aggregation and Synthetic Quotes:

With sufficient processing and memory resources, additional data normalization functions may be performed by the IFS, and thus offloaded from platform components such as feed handlers, virtual order book engines, and ticker plants. One such function is price-normalization for order-based depth of market feeds. As described in the above-referenced and incorporated U.S. Pat. No. 7,921,046, WO Pub. WO 2010/077829, and U.S. patent application Ser. No. 13/316, 332, a number of market data feeds operate at the granularity of individual orders to buy or sell a financial instrument. The majority of real-time updates represent new orders, modifications to existing orders, or deletions of existing orders. As described in these incorporated references, a significant number of market data applications choose to consume the order-based depth of market feeds simply due to the reduced data delivery latency relative to top-of-book or consolidated feeds. However, the applications typically do not require visibility into the individual orders, but rather choose to view pricing information as a limited-depth, price-aggregated book, or as a top-of-book quote. In the above-referenced and incorporated U.S. Pat. No. 7,921,046, WO Pub. WO 2010/077829, and U.S. patent application Ser. No. 13/316,332, a number of techniques are disclosed for efficiently performing price aggregation in parallel processing elements such as reconfigurable hardware devices. The same methods can be applied in the context of an intelligent feed switch to offload price aggregation from downstream consumers. For example, rather than consuming the NASDAQ Totalview feed in its raw order-referenced format, downstream consumers can consume price-aggregated updates reflecting new price points, changes to existing price points, and deletions of price points from the book. This can reduce the number of update events to downstream consumers.

Note that price aggregation may be performed on a per-symbol, per-market basis (e.g. NASDAQ market only), or on a per-symbol, pan-market basis (e.g. NASDAQ, NYSE, BATS, ARCA, Direct Edge) to facilitate virtual order book views.

A further reduction in the number of updates consumed by downstream consumers can be achieved by performing size filtering. Size filtering is defined as the suppression of an update if the result of the update is a change in aggregate volume (size) at a pre-existing price point, where the amount of the change relative to the most recent update transmitted to consumers is less than a configured threshold. Note that the threshold may be relative to the current volume, e.g. a change in size of 50%.

Again, if sufficient processing and memory resources are deployed within the IFS, a synthetic quote engine can be included. As described in the above-referenced and incorporated U.S. Pat. No. 7,921,046, WO Pub. WO 2010/077829, and U.S. patent application Ser. No. 13/316,332, price-aggregated entries can be sorted into a price book view for each symbol. The top N levels of the price-aggregated represent a top-of-book quote. Note that N is typically one (i.e. only the best bid and offer values), but N may be set to be a small value such as three (3) to enhance the quote with visibility into the next N-1 price levels in the book. The techniques described in these incorporated referenced can be used to efficiently sort price-aggregated updates into price books and generate top-of-book quotes when an entry in the top N levels changes using parallel processing resources.

8. Event Caching:

As previously described, the IFS is capable of only transmitting updates for symbols for which downstream consumers are interested using the symbol-based routing described above. If a consumer wishes to add a symbol to its set of interest, the consumer would need to wait until a subsequent quote event is transmitted by the feed source in order to receive the current pricing for the associated financial instrument. A simple form of a cache can be efficiently implemented in the IFS in order to allow downstream consumers to immediately receive current pricing data for a financial instrument if its symbol is dynamically added to its set of interest during a trading session. For feeds that provide top-of-book quote updates and last trade reports, the IFS can maintain a simply last event cache that stores the most recent quote and most recent trade event received on a per-symbol, per-market basis. Specifically, a table of events is maintained where an entry is located using the symbol index, MIC, and MSIC. When the set of interest changes for a given downstream consumer, the current quote and trade events in the event cache are transmitted to the consumer. This allows the consumer to receive the current bid, offer, and last traded price information for the instrument.

If sufficient processing resources exist in the IFS, a full last value cache (LVC) can be maintained as described in the above-referenced and incorporated U.S. Pat. No. 7,921,046.

9. Data Quality Monitoring:

The IFS can be also be configured to monitor a wide variety of data quality metrics on a per-symbol, per-market basis. A list of data quality metrics includes but is not limited to:

Line gap: packet loss experienced on the line carrying updates for the symbol.

Line dead: the input feed line is detected to be in a "dead" state where no data is being received.

Locked market: the best bid and offer prices for the instrument on the given market are identical.

Crossed market: the best bid price is larger than the best offer price for the instrument on the given market The data quality can be reflected in an enumerated value and included in messages transmitted to downstream consumers as an appended field, as previously described. These enumerated data quality states can be used by the IFS and/or downstream consumers to perform a variety data quality mitigation operations.

10. Data Source Failover:

An example of a data quality mitigation operation is to provide data source failover. As previously described, there may be multiple data sources for market data updates from a given market, hence the need for a data source identification code (DSIC). Rather specify a specific <symbol, market, data source> tuple when establishing interest in an instrument, downstream consumers may specify a <symbol, market> tuple where the "best" data source is selected by the IFS. A prioritized list of data sources for each market is specified in the control logic. When the data quality associated with the current preferred data source for a market transitions to "poor" quality state, the IFS automatically transitions to the next highest-priority data source for the market. The data quality states that constitute "poor" quality are configured in the control logic. When a data source transition occurs, the control logic alters the interest list entries associated with affected instruments and downstream consumers. Note that if a higher-priority data source transitions out of a "poor" quality state, the IFS automatically transitions back to the higher-priority data source. Preferably, the IFS is configured to apply hysteresis to the data source failover function to prevent thrashing between data sources. Note that data source failover may rely on the presence of other functions within the IFS such as synthetic quote generation if failover is to be supported between depth of market feeds and top-of-book quote feeds.

11. Monitoring, Configuration, and Control:

The monitoring, configuration, and control logic described is preferably hosted on a co-resident processor in the IFS. This logic may interface with applications in the electronic platform or remote operations applications. In one embodiment of the IFS, control messages are received from an egress port. This allows one or more applications in the electronic trading platform to specify symbol routing parameters, packet and message parsing templates, prioritized lists of data sources, gap reporting and mitigation parameters, etc.

In addition, a variety of statistics counters and informational registers are maintained by the offload engines that can be accessed by the control logic in the IFS such as per-line packet and message counters, packet and message rates, gap counters and missing sequence registers, packet size statistics, etc. These statistics are made available to the external world via common mechanisms in the art, including SNMP, HTML, etc.

12. Feed Generation:

The IFS can also be used by feed sources (exchanges and consolidated feed vendors) to offload many of the functions required in feed generation. These tasks are largely the inverse of those performed by feed consumers. Specifically, the IFS can be configured to encode updates using prescribed encoding templates and transmit the updates on specified multicast groups, output ports, etc. Other functions that are applicable to feed generation include high-resolution timestamping, rate monitoring, and data quality monitoring.

Figure 24:
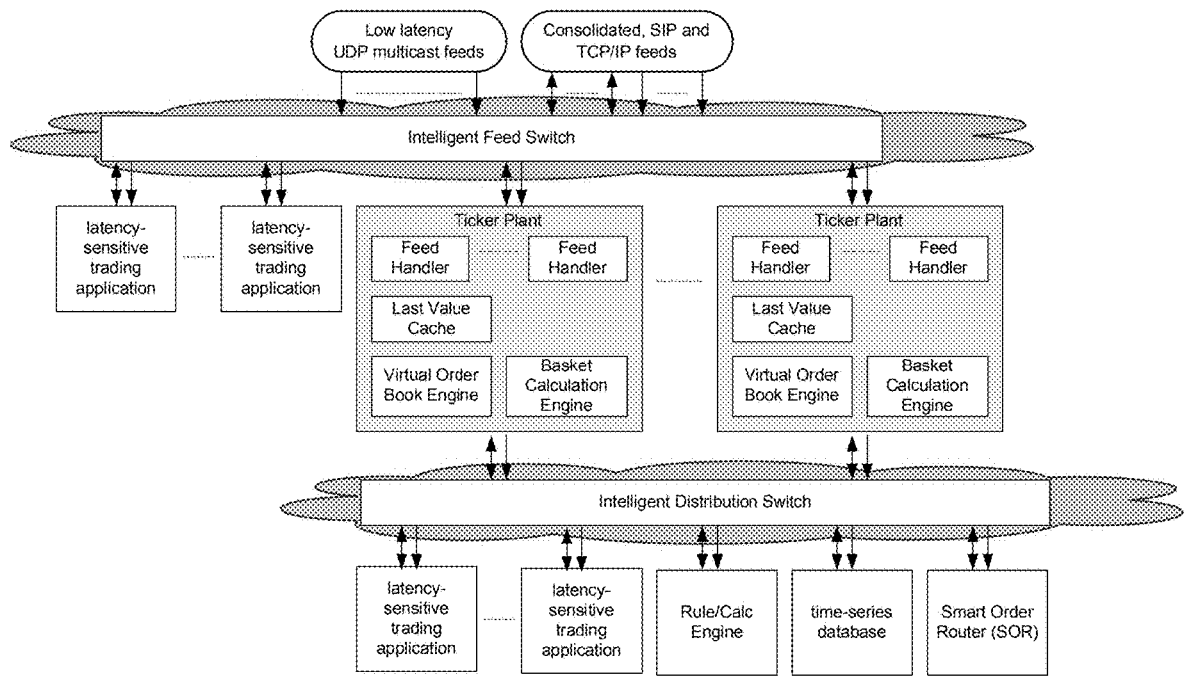
FIG. 24 illustrates an exemplary intelligent distribution switch positioned downstream of market data normalization components in an electronic trading platform.

C. Intelligent Distribution Switch:

The same methods and apparatuses can be applied to the task of distributing data throughout the electronic trading platform. As shown in FIG. 24, an Intelligent Distribution Switch (IDS) can be positioned downstream of market data normalization components in the electronic trading platform. The IDS can be used to offload distribution functions from normalization components such ticker plants, to offload data consumption and management functions from downstream consumers such as trading applications, and to introduce new capabilities into the distribution network in the electronic trading platform. Examples of distribution capabilities are described in the above-referenced and incorporated U.S. Pat. App. Ser. No. 61/570,670.

Figure 21:
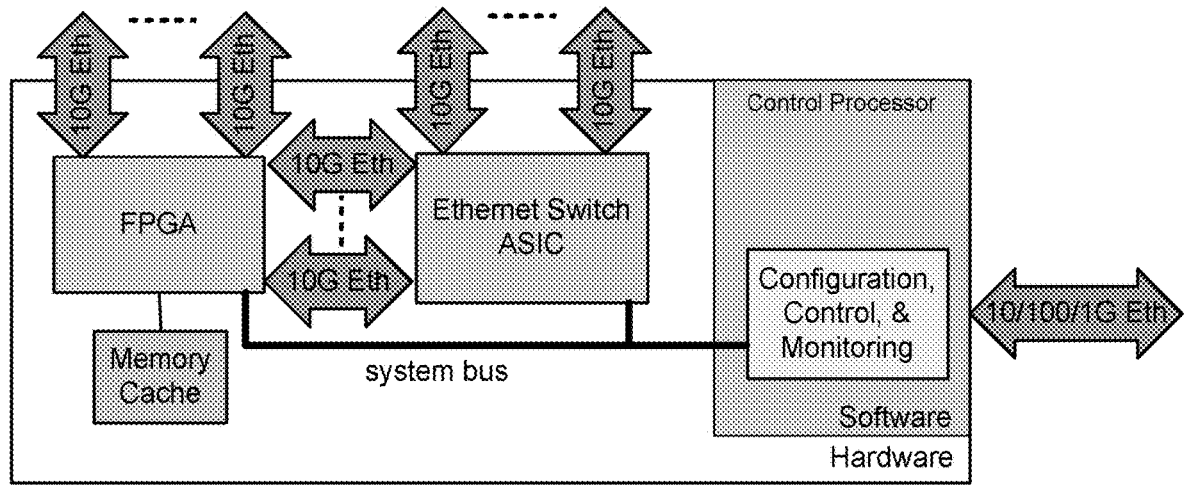
FIG. 21 illustrates an exemplary intelligent feed switch that provides multiple ports of 10 Gigabit Ethernet connectivity.

The IDS architecture can be one of the previously described variants shown in FIGS. 21, 22, and 23. Note that the number of switch ports and amount of interconnect bandwidth between internal devices (FPGAs, switch ASICS, memory, etc.) may be provisioned differently for an IDS application, relative to an IFS application.

Figure 25:
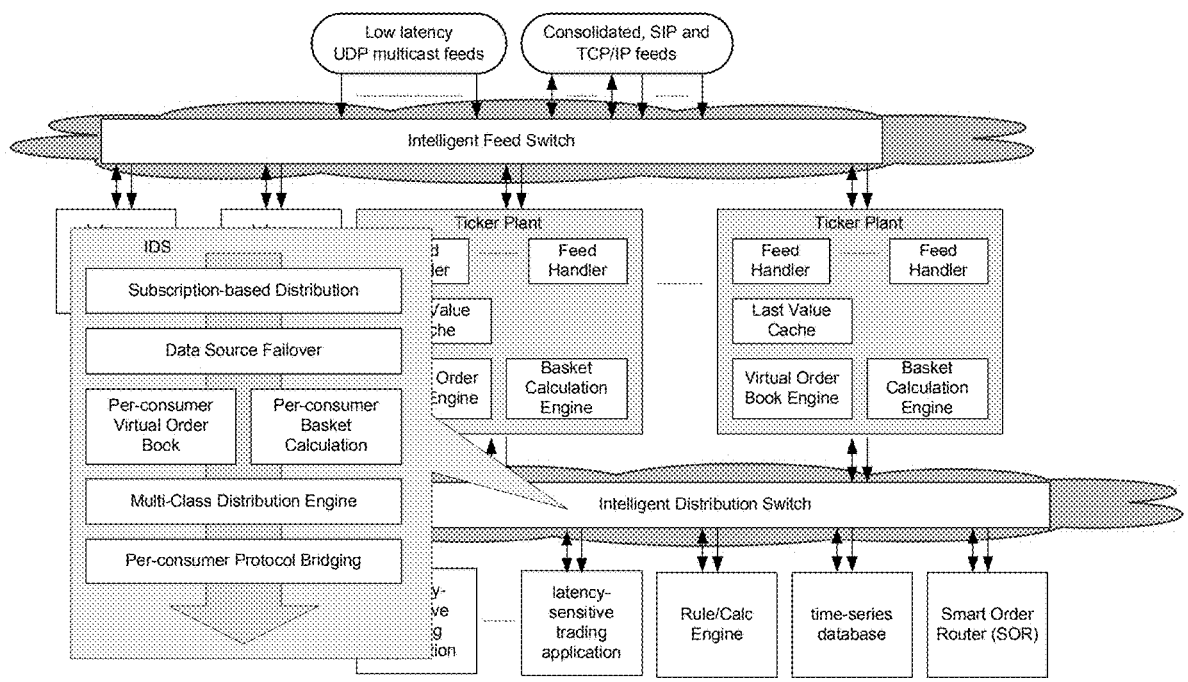
FIG. 25 illustrates an exemplary intelligent distribution switch that hosts one or more distribution functions.

As shown in FIG. 25, the IDS may host one or more distribution functions. The IDS can be used to offload the task of interest-based distribution. The IDS can maintain a mapping from instrument symbol to interest list, an example of such a mapping being described in the above-referenced and incorporated U.S. Pat. No. 7,921,046. If point-to-point transmission protocols are in use, then the IDS makes the requisite copies of the update event and addresses each event for the specified consumer. By offloading this function, upstream components such as ticker plants only need to propagate a single copy of each update event. This reduces the processing resource requirement, or allows the processing resources previously dedicated to interest list maintenance and event replication to be redeployed for other purposes.

Data source failover may also be performed by the IDS. Like the previously described data source failover function performed in the IFS, the IDS allows downstream consumers to specify a prioritized list of normalized data sources. When the preferred source becomes unavailable or the data quality transitions to an unacceptable state, the IDS switches to the next highest priority normalized data source.

The IDS may also perform customized computations a per-consumer basis. Example computations include constructing user-defined Virtual Order Books, computing basket computations, computing options prices (and implied volatilites) and generating user-defined Best Bid and Offer (BBO) quotes (see the above-referenced and incorporated U.S. Pat. Nos. 7,840,482 and 7,921,046, U.S. Pat. App. Pub. 2009/0182683, and WO Pub. WO 2010/077829 for examples of hardware-accelerated processing modules for such tasks). By performing these functions in an IDS at the "edge" of the distribution network allows the functions to be customized on a per consumer basis. Note that a ticker plant distributing data to hundreds of consumers may not have the processing capacity to perform hundreds of customized computations, one for each consumer. Examples of other customized per consumer computations include: liquidity target Net Asset Value (NAV) computations, future/spot price transformations, and currency conversions.

Additionally, the IDS may host one or more of the low latency data distribution functions described in the above-referenced and incorporated U.S. Pat. App. Ser. No. 61/570, 670. In one embodiment, the IDS may perform all of the functions of an Edge Cache. In another embodiment, the IDS may perform all of the functions of a Connection Multiplexer. As such, the IDS includes at least one instance of a multi-class distribution engine (MDE) that includes some permutation of Critical Transmission Engine, Adaptive Transmission Engine, or Metered Transmission Engine.

Like the customized per consumer computations, the IDS may also perform per consumer protocol bridging. For example, the upstream connection from the IDS to a ticker plant may use a point-to-point Remote Direct Memory Access (RDMA) protocol. The IDS may be distributing data to a set of consumers via point-to-point connections using the Transmission Control Protocol (TCP) over Internet Protocol (IP), and distributing data to another set of consumers via a proprietary reliable multicast protocol over Unreliable Datagram Protocol (UDP).

1. Low Overhead Communication Protocols:

Note that if intelligent FPGA NICs are used in the consuming machines, then a direct FPGA-to-FPGA wire path exists between FPGA in the Switch and the FPGA in the NIC. This eliminates the need for Ethernet frame headers, IP headers, CRCs, inter-frame spacing and other overhead, and allows the FPGA in the switch to communicate directly with the FPGA in the NIC, without being constrained to specific communication protocols.

While the present invention has been described above in relation to exemplary embodiments, various modifications may be made thereto that still fall within the invention's scope, as would be recognized by those of ordinary skill in the art. Such modifications to the invention will be recognizable upon review of the teachings herein. As such, the full scope of the present invention is to be defined solely by the appended claims and their legal equivalents.

What is claimed is:

1. A system for processing a plurality of data packets from a plurality of financial market data feeds, wherein each of a plurality of the data packets comprises (1) a destination address that identifies a destination for the data packet, (2) a source address that identifies a source for the data packet, (3) a protocol identifier that identifies a protocol for the data packet, and (4) a packet payload, the packet payload comprising plurality of financial market data messages, the financial market data messages comprising a plurality of fields of financial market data pertaining to a plurality of financial instruments, the system comprising:
a network element of a data distribution network through which data packets are communicated to an electronic trading platform, wherein the network element comprises a packet switch, a repeater, a router, or a firewall, the network element comprising a processor, the processor configured to:
receive the data packets; and
for each of a plurality of the received data packets, (1) map the received data packet to parsing metadata applicable to the received data packet based on the received data packet's destination address, source address, and protocol identifier and (2) append a field to the received data packet, wherein the appended field comprises the parsing metadata; and
wherein the network element is configured to communicate the data packets to the destinations corresponding to the destination addresses of the data packets, wherein the communicated data packets include the appended fields, the network element thereby being configured to offload tasks for mapping parsing metadata to data packets from the electronic trading platform.

2. The system of claim 1 wherein the parsing metadata includes an identifier for the financial market data feed for the data packet to which the parsing metadata is applicable.

3. The system of claim 2 wherein the parsing metadata further includes an identifier for a line within the financial market data feed for the data packet to which the parsing metadata is applicable.

4. The system of claim 1 wherein the parsing metadata includes an identifier for an exchange that pertains to the data packet to which the parsing metadata is applicable.

5. The system of claim 1 wherein the parsing metadata includes a packet parsing template that identifies how the data packet is to be parsed.

6. The system of claim 1 wherein the parsing metadata includes a message parsing template that identifies how the financial market data messages of the data packet are to be parsed into their constituent fields of financial market data.

7. The system of claim 1 wherein the processor is further configured to, for each of a plurality of the received data packets, map the received data packet to its corresponding parsing template using a hash key and a hash table, wherein the hash key is based on the destination address, the source address, and the protocol identifier of the received data packet.

8. The system of claim 1 wherein the processor comprises a field programmable gate array (FPGA).

9. The system of claim 1 wherein the processor comprises an application-specific integrated circuit (ASIC).

10. The system of claim 1 wherein the processor comprises a graphics processing unit (GPU).

11. The system of claim 1 wherein the processor comprises a chip multi-processor (CMP).

12. The system of claim 1 wherein the network element comprises the packet switch, wherein the packet switch comprises (1) a plurality of ports for receiving and communicating the data packets, (2) a switching fabric, and (3) the processor.

13. The system of claim 12 wherein the packet switch provides 10 Gigabit Ethernet connectivity for receiving and communicating the data packets via a plurality of the ports.

14. The system of claim 1 further comprising:
a ticker plant configured to receive the communicated data packets and parse the received communicated data packets into a plurality of parsed fields based on the parsing metadata included in the appended fields, wherein the ticker plant comprises a field programmable gate array (FPGA), the FPGA configured to generate composite views of a plurality of financial instruments based on a plurality of the parsed fields.

15. The system of claim 1 further comprising:
a ticker plant configured to receive the communicated data packets and parse the received communicated data packets into a plurality of parsed fields based on the parsing metadata included in the appended fields, wherein the ticker plant comprises a field programmable gate array (FPGA), the FPGA configured to perform last value cache (LVC) updates for a plurality of financial instruments based on a plurality of the parsed fields.

16. A method for processing a plurality of data packets from a plurality of financial market data feeds, the method comprising:
receiving a data packet by a processor within a network element of a data distribution network through which data packets are communicated to an electronic trading platform, wherein the network element comprises a packet switch, a repeater, a router, or a firewall, wherein the received data packet comprises (1) a destination address that identifies a destination for the data packet, (2) a source address that identifies a source for the data packet, (3) a protocol identifier that identifies a protocol for the data packet, and (4) a packet payload, the packet payload comprising plurality of financial market data messages, the financial market data messages comprising a plurality of fields of financial market data pertaining to a plurality of financial instruments;

the processor mapping the data packet to parsing metadata applicable to the data packet based on the data packet's destination address, source address, and protocol identifier;

the processor appending a field to the data packet, wherein the appended field comprises the parsing metadata; and the network element communicating the data packet to the destination corresponding to the destination address of the data packet, wherein the communicated data packet includes the appended field, the network element thereby offloading tasks for mapping parsing metadata to data packets from the electronic trading platform; and performing the (1) receiving step, (2) the mapping step, (3) the appending step, and (4) and communicating step for a plurality of data packets from a plurality of financial market data feeds.

17. The system of claim 1 wherein the network element comprises the repeater.

18. The system of claim 1 wherein the network element comprises the router.

19. The system of claim 1 wherein the network element comprises the firewall.

* * * * *